(12) United States Patent
Gamble

(10) Patent No.: US 7,630,906 B2
(45) Date of Patent: Dec. 8, 2009

(54) MARKET SYSTEM AND METHOD FOR PROMOTION OF INNOVATIONS TO EFFICIENT PUBLIC POLICY

(76) Inventor: James L. Gamble, 610 Stillwater Rd., Gibson Island, MD (US) 21056

( * ) Notice: Subject to any disclaimer, the term of this patent is extended or adjusted under 35 U.S.C. 154(b) by 1139 days.

(21) Appl. No.: 11/007,422

(22) Filed: Dec. 8, 2004

(65) Prior Publication Data

US 2005/0203827 A1 Sep. 15, 2005

Related U.S. Application Data

(63) Continuation-in-part of application No. 09/565,354, filed on May 5, 2000, now Pat. No. 7,228,286.

(60) Provisional application No. 60/132,836, filed on May 6, 1999.

(51) Int. Cl.
*G06F 17/60* (2006.01)
(52) U.S. Cl. .................. 705/1; 705/30; 705/32
(58) Field of Classification Search .......... 705/1, 705/30, 32
See application file for complete search history.

(56) References Cited

U.S. PATENT DOCUMENTS 6,112,188 A * 8/2000 Hartnett ............... 705/36 R 6,243,691 B1 * 6/2001 Fisher et al. ............... 705/37

FOREIGN PATENT DOCUMENTS

JP 2005182587 A * 7/2005

* cited by examiner

Primary Examiner—Pierre E Elisca
(74) Attorney, Agent, or Firm—Ober / Kaler; Royal W. Craig

(57) ABSTRACT

A public policy auction system for providing a monetary incentive for the adoption of efficient public policies, which encourages constituents of multiple government houses (house, senate, committee, councils, etc.) at different levels (federal, state, local, international) to bid on attempts to persuade members of those government houses to vote on legislation. The system generally comprises a series of hierarchical negotiations and auctions for the proprietary right to receive a portion of the savings generated from the efficiency of a given public policy. The system is administered over the Internet by a series of software modules. The basic functions are registration of constituents and legislators; logon authorization; a password protected administrative section for setting up auctions and associated support functions; auction functions consisting of two phases, a bidding phase and a lobbying phase, including calculations; support, reporting and graphical views; and a public section for announcements and electronic mail.

22 Claims, 46 Drawing Sheets

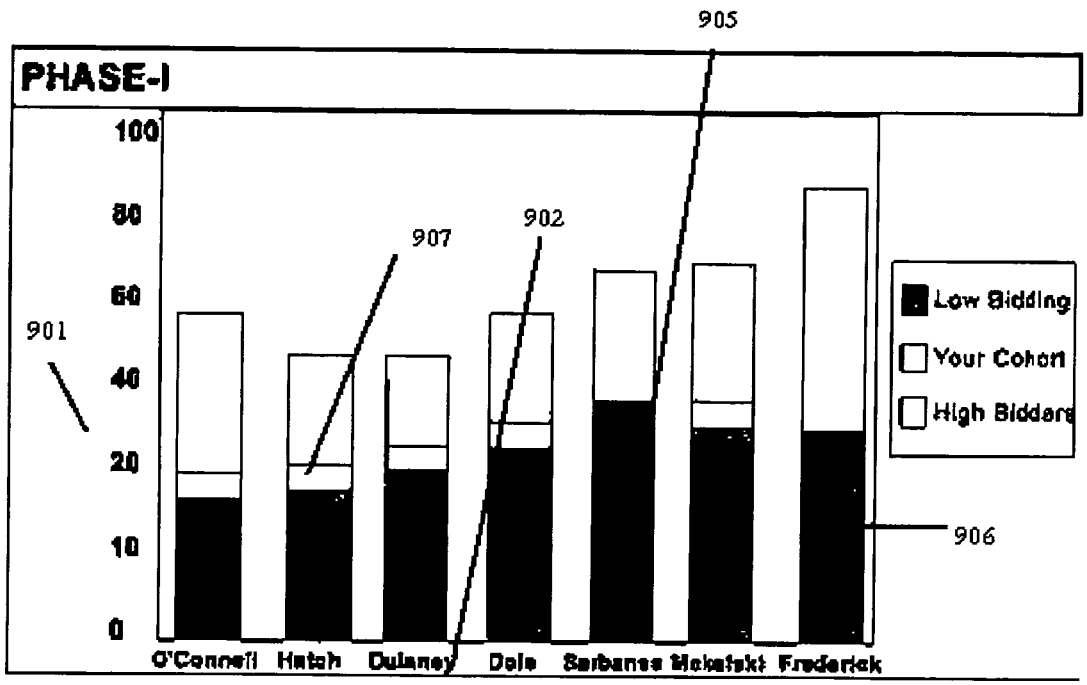

This slide exemplifies the first phase of an auction after you have registered, chosen this auction and submitted your first or later bids in the auction. Again, each bar represents the participating constituents of a candidate or a legislator and the height of a bar represents the sum of the ranked bids of the constituent for the candidate or legislator represented by that bar. The black portion of the fourth bar represents your bid and its position represents your rank for your legislator. As a result, the green portion of the bar represents the sum of the constituents, who have higher bids than your bid, and the blue portion of the bar represents the sum of the constituents, who have lower bids than your bid for your candidate or legislator. The white portion of the bars for the other legislators or candidates will represent the quantity of the bid for the bids of the same rank as your bid for the legislator of that bar. The graph ranks the bars according to the sum of the bids of the bidders represented by the white and blue areas.

FIG. 20

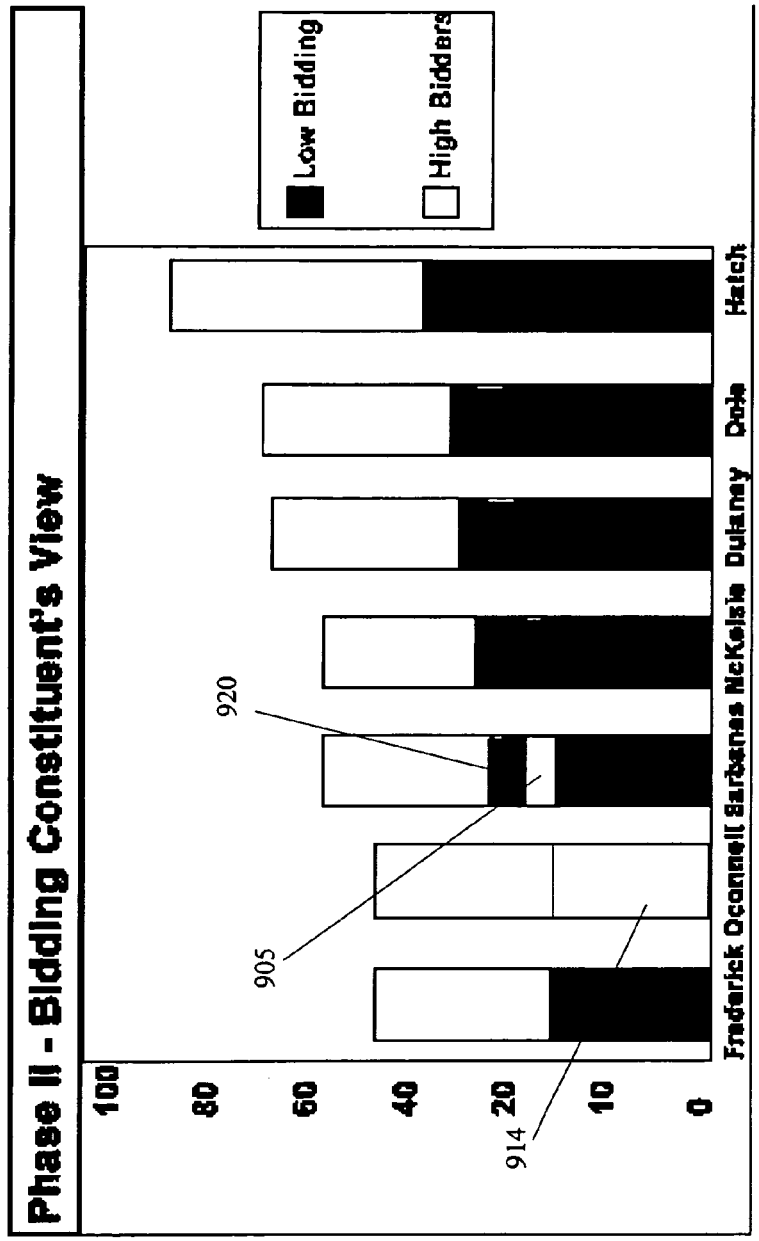

FIG. 27

This graph represents another of your possible views of the second phase of the auction at a later time than the previous side. At this time, you have lobbied and failed to gain the support of the legislator and you have become part of the blue, lower portion of the bar. Other higher bidders for your legislator have also failed and are represented by the blue color above your black space. In addition, there is a change in color from blue to yellow for the second legislator, indicating that the legislator for that bar clicked on his or her 'Support' button.

MARKET SYSTEM AND METHOD FOR PROMOTION OF INNOVATIONS TO EFFICIENT PUBLIC POLICY

CROSS-REFERENCE TO RELATED APPLICATIONS

The present application is a continuation-in-part of U.S. application Ser. No. 09/565,354, filed 5 May 2000, now U.S. Pat. No. 7,228,286 which application derives priority from the following provisional application: Ser. No. 60/132,836, filed 6 May 1999, entitled Market System and Method for Promotion of Innovations to Efficient Public Policy.

BACKGROUND OF THE INVENTION

1. Field of the Invention

The invention relates to a public policy auction system designed to provide a monetary incentive for the adoption of efficient public and other policies. More particularly, an online auction or an interrelated, communicating system of online auctions is implemented that valuates the benefit of public policy innovations and assigns rights in those innovations among innovators of the public policy as well as constituents who support the policy.

2. Description of the Background

Wars, alcoholism, drug addiction, corruption, unemployment, etc. are all inefficient conditions that waste resources. The inefficient use of resources causes numerous ills not the least of which is global warming. There has long been a great need to solve any of these enormous problems. A solution could save millions of lives, make the world a safer place, and possibly change the course of history. The advent of the Internet provides a platform and the present invention provides an auction exchange system of incentives to help solve these problems.

In addition, associations, corporations, lobbyists, individuals, etc., who might want to have constituents act as lobbyists to their legislators for a fee, as any other professional lobbyist may do, would not know who to pay or how much to pay to provide grassroots support for their agenda. The advent of the Internet provides a platform and the present invention provides an auction exchange system of incentives to help solve these problems.

The prior art reflects a number of electronic commerce systems (below) inclusive of auctions, but none so ambitious as to promote efficient public policy and the world's social welfare.

1. Systems and Methods for Electronic Commerce

The prior art is replete with descriptions of electronic systems and methods that facilitate the transfer of traditional goods and services.

In an online context, U.S. Pat. No. 5,285,383 entitled Method for Carrying Out Transactions Using Electronic Title, and U.S. Pat. No. 5,297,031 entitled Method and Apparatus for Order Management By Market Brokers, describe means of displaying merchandise for sale to a plurality of customers connected to a server computer and means of conducting sales and order transactions. These references are directed to goods and services that presently have an analogue outside of the online context, such as the sale of cars, of clothing, of memorabilia, or of financial products.

2. Systems and Methods for Electronic Auctions

A comprehensive description of the advantages of electronic auction systems and methods over traditional live auctions is presented in U.S. Pat. No. 5,835,896 to Fisher et al., and will only be summarized here. Electronic auctions facilitate remote participation whereby the bidders, the auctioneer, the seller, or the merchandise need not travel to the same location. The auctioneer is essentially a computer system instead of a person. Any number of auctions can occur simultaneously, limited only by computing power and communications bandwidth. Merchandise becomes available to a greater number of buyers, increasing their collective influence on price while decreasing transaction costs for the seller. Again, the '896 patent and like references only disclose the electronic auction sales of conventional goods and services.

3. Systems and Methods for Electronic Collaboration

There are references that expand upon prior art electronic commerce and electronic auction systems and methods. By way of example, U.S. Pat. No. 5,794,219 to Brown describes an online auction that permits individual bidders to pool bids during a bidding session. Bidding groups and their individual members are registered in the server computer. Total bids for all members of the bidding group are compared to find the winning bidder. However, with all of these prior art references and in the current state of the art in general, such systems and methods are specific to the sale of concrete goods and services. There are no known systems or methods capable of evaluating and capturing the economic benefit of innovative new policies, as conceived and expressed by innovators. Despite the intangible nature of such an enterprise, there is nothing to prevent the use of electronic systems and methods to do so.

By way of example in the greater portion of the economy, the relative uniqueness of an individual's contribution and the contribution of an individual's resources are the standard of fairness in market economies. The uniqueness of an individual's contribution and the contribution of an individual's resources is herein defined as the "unique marginal revenue product of the last unit." In the context of a traditional patent system the unique marginal revenue product of the last unit is not the standard of fairness. Instead, an exclusive patent grant for a set period of time presently is the fixed standard of fairness, and inefficiencies result. One reason for inefficiencies is that a competing innovator may only be minutes ahead of the competition, but he nevertheless receives the entirety of patent protection. In contrast, an individual whose contribution is a quantum step forward may be 30 or 50 years ahead of their competition, and yet they receive the same measure of patent protection. The latter case is not adequate reimbursement. Inadequate reimbursement is inefficient because it fails to provide the profit signals defining the importance of unique and valuable contributions. In the more abstract realm of public policy innovation, there currently are no proprietary rights for those who develop better policies.

It would be greatly advantageous to combine the advantageous aspects of electronic auction systems and methods, and collaborative electronic systems and methods, in a novel way to create a free market for public policies through valuation, establishment of proprietary rights, and assignment of such rights by auction. This will promote legislative adoption of more efficient public policies by creating a free market for the savings gained by such policies, thereby giving a monetary incentive for the research and development of more efficient public policies by allowing the public and the innovators of such policies to share in the resulting economic benefit.

SUMMARY OF THE INVENTION

In accordance with the present invention, it is an object to replicate closely competitive forces and incentives between buyers and sellers through the use of an electronic verification and auction system for innovators of new public policies. Such an auction between two or more innovators is useful for valuating proprietary rights in an efficient public policy, in a preferred embodiment of the present invention. If the commodity of the electronic verification and auction system is an efficient public policy, its cost is the unique marginal revenue product of the innovator for the innovation.

It is a further object of the present invention to replicate competitive forces and incentives between buyers and sellers of policy innovation through the use of an electronic verification and auction system between competing innovators as the holders of proprietary rights in efficient public policy. It is a further object of the present invention to replicate competitive forces and incentives between sellers and buyers of constituent lobbying services through the use of an electronic verification and auction system between competing and lobbying constituents and outside parties wishing to implement public policy, including but not limited to special interest groups, governmental bodies, and individuals. The present invention may also be used to sustain existing and future effective public policies, without the entry of innovators.

It is yet another object of the present invention to provide multiple dynamic graphical views of the status of the bidding process, with easy access to the participating legislators and constituents.

The above and other objects are fulfilled through a public policy auction system and method designed to provide a monetary incentive for the adoption of efficient public policies. The system generally comprises a series of negotiations and auctions for the proprietary right to receive a portion of the savings generated from the efficiency of a given public policy.

The method begins with a registration phase during which information is collected on legislators and the proponents of new public policies and is keyed into a central auction database. Using conciliation and arbitration based on previous publications, the initial innovators with various insights determine their relative share of the proprietary rights by participating in an innovator auction.

Once the approximate savings of the initial innovators are established, an active auction for constituents begins. The ownership distribution may occur independently as innovators identify themselves.

The auction process comprises two distinct phases, a bidding phase and a lobbying phase. In Phase I, the bidding phase, constituents bid a fair charge for their services relative to lobbying for the respective policy. In Phase II, the lobbying phase, the constituents lobby their respective legislator at their pre-assigned times. The bidding phase can occur for candidates during the election season for the primary and general election auctions or during the legislative session. The lobbying phase only occurs during or before legislative sessions. The two phase approach helps to maintain a reasonable level of bidding and simplifies the process.

Bidders currently exist as one of two varieties. Individual bidders are bidders who bid for themselves. Activist/organizers, sometimes referred to as activist/brokers are bidders who bid for a non-bidding voter who has chosen them to bid in their stead.

The current low bidder is the low bidder of an intra House Seat auction at that moment. An intra House Seat auction is a sub-auction in which the competing constituents of a single legislator compete to be in a pool of lowest bidders for that legislator. The low bidder may represent any bidders.

To win the auction, the bid from the lowest bidding constituent must meet the following conditions: (1) it is the lowest pool of bids in a legislator's district; (2) the bidder's legislator must support the policy, (3) the public policy must be enacted and enforced, and (4) the low bidder's representing legislator must be in the smallest group of legislators necessary to pass the legislation, who also represent the lowest pool of bidders.

The active auction (also known as the "constituent auction") has sub-auctions during the general and primary elections, which require contributions to participate. This requirement should encourage constituents to contribute to candidates who advocate efficient public policy. The active auction, therefore, creates grass roots funding for candidates who support efficient public policy.

The system comprises sets of software modules to accomplish the objectives of the present invention. The software includes the following major functions and features: 1) a public section that describes the system and how it works, including an electronic mail feature; 2) registration of constituents and legislators; 2) the innovator auction; 4) the two phase active auction process, which includes bidding and lobbying functions: 5) various views of the bidding and lobbying phases; and 6) administrative functions, such as auction set up, monitoring, etc.

The innovator guide index connects the innovator to sites that explain procedure and concepts, such as the initial contact through registration, verification of the efficiency of public policy, granting of preliminary intellectual property rights, experimentation, granting of monopolistic intellectual property rights, how to handle competitors, the duration of intellectual property rights, a valuation of innovators who improve innovations, handling of disputes with government over the duration of monopolistic intellectual property rights, initiation of a special interest group auction to support legislation, collections and a process to develop a market value for competing innovators, called the innovator auction.

BRIEF DESCRIPTION OF DRAWINGS

Other objects, features, and advantages of the present invention will become more apparent from the following detailed description of the preferred embodiment and certain modifications thereof when taken together with the accompanying drawings in which:

FIGS. 19-29 are exemplary bar graph displays from the online demonstration of the present invention.

FIG. 38 Reserved.

DETAILED DESCRIPTION OF THE PREFERRED EMBODIMENTS

Figure 1:
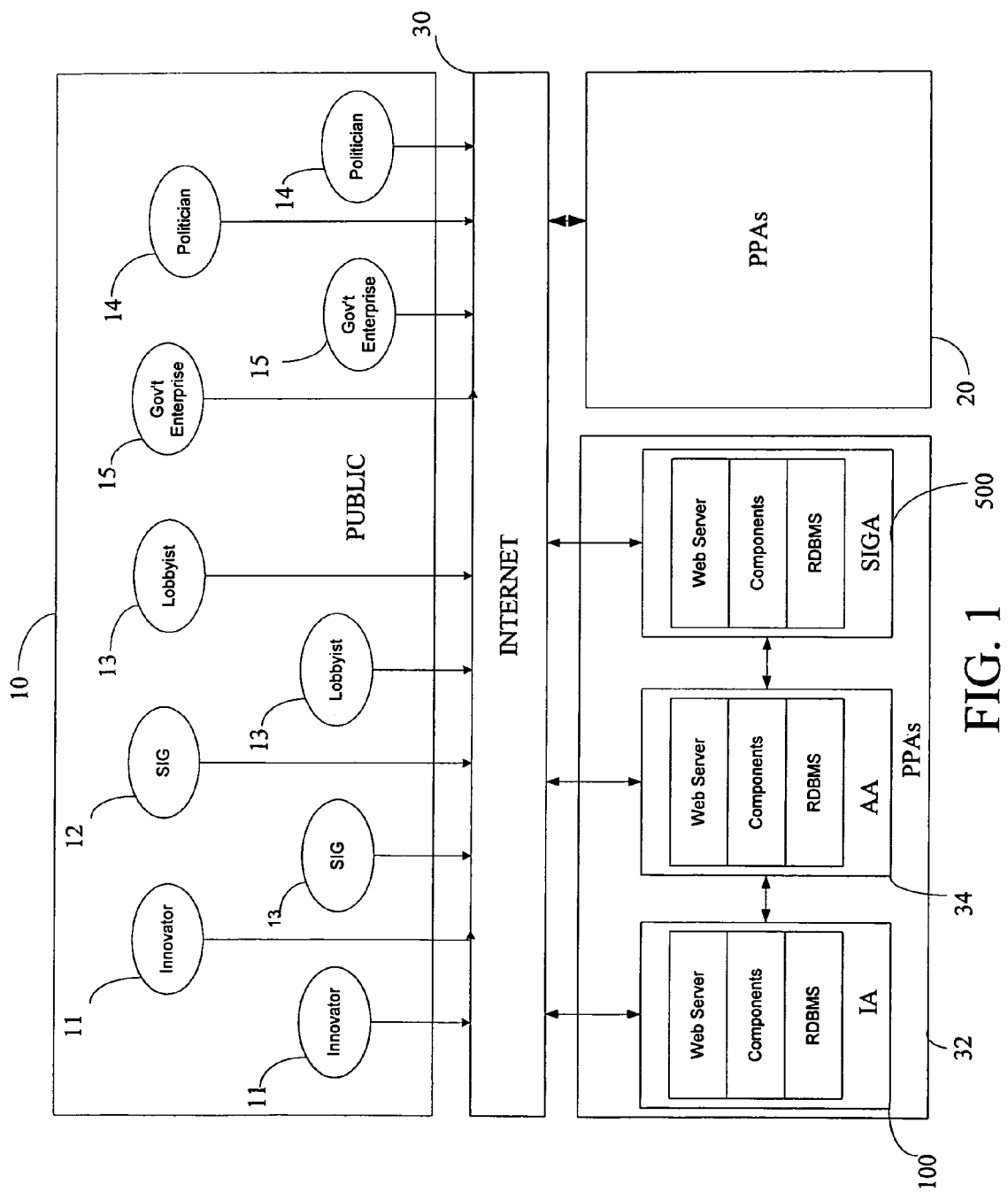
FIG. 1 is a schematic of an exemplary multiple computer system apparatus in which the present invention can be practiced.

The present invention, in the preferred embodiment, is a unique online auction method for incentivizing the legislative adoption of more efficient public policies. The present method comprises an online bidding process in which bids are cast for a portion of the estimated savings gained from a more efficient public policy. The auction method pairs citizens with originators of new public policies ("innovators") to offset the powerful influence of special interest groups that currently shape much of public policy. This approach promotes legislative adoption of more efficient public policies by creating a free market for the savings gained by such policies. This approach also creates a monetary incentive for the research and development of more efficient public policies by allowing the public and the innovators of such policies to share in the resulting economic benefit. A greater number of creative people in free societies that adapt the system disclosed herein will contribute their brain power to address tough, costly issues, such as corruption, the penal system, and a variety of other social ills.

A second embodiment is also disclosed in which the online bidding process is for a portion of funds provided by an individual, corporation, lobbyists, etc., to promote the agenda of the fund donor. In this second embodiment, funds are provided by an individual, corporation, lobbyist, etc., and not the government, and as a result, it does not have innovators of efficient public policy. The innovation is simply provided by the special interest group, when it produces a policy for their liking. It therefore does not have the need to estimate savings, an innovator auction to distribute savings, or an arbitration/ negotiation system to distribute savings among innovators. It only has the bidding and lobbying phases of the primary, general election and session level auctions for sponsorship, committee and floor votes. This embodiment is identical to the preferred embodiment, except for the innovators and innovation.

For purposes of description, the following definitions are herein provided:

"public policy" is defined as any concept that can be applied to a rule-based process, including but not limited to: a law, a regulation, an administrative rule, a rule of order or procedure, a compromise or settlement, an itinerary or schedule, or an agenda.

"efficient public policy" is a public policy that provides consumers and taxpayers as consumers the greatest total measurable, reasonably estimated benefit for the least cost.

"bidder" may be any individual bidding for self-interest or chosen by a special interest or other group to bid.

"innovator" is the inventor of an efficient public policy.

"promoter" is an individual, who initially develops and advocates a bill. A promoter may be an innovator, a special interest group, an individual or a corporation.

"special interest group" is one or more persons who can influence a politician to support a policy, inclusive of trade unions, professional groups, individuals, etc.

"activist/organizer" or "activist/broker" is an individual, who provides a service similar to that of a stock broker for a stock market. The activist/organizers or activist brokers may identify, recruit, and/or organize constituents who might be willing to lobby for a fee. They may bid for the constituent. They will do this for a fee obtained from the constituent. Activist/organizers can act as though they are special interest groups in FIG. 1.

"pool" consists of the lowest bidding constituent, who has not lobbied his or her legislator through a phase II auction, and all of the lower bidding constituents for that same legislator, who unsuccessfully and serially lobbied through our phase II auction.

"sum of the pooled bids" is the total sum of the bid of the lowest bidding constituent, who has not previously lobbied his or her legislator through a phase II auction process unsuccessfully, with all of the bids of the lower bidding constituents for that same legislator, who unsuccessfully and serially lobbied through a phase II auction process.

"initial applicant" is the initial innovator before another potential initial innovator made a claim.

1. The System Architecture

FIG. 1 is a system diagram of an exemplary computer network by which the present invention can be practiced. The public policy auction system 20 connects users, comprising one or more innovators 11, one or more special interest groups 12, their constituent or pooled constituents 13, one or more politicians 14, and one or more government enterprises 15, interface the public policy auction system 20 over a common data communications system 30 such as the Internet. The system 20 has three tiers: (1) a thin client front end in the form of an Internet World Wide Web (WWW) site, (2) relational database management system (RDBMS) back end of the type prevalent in the art and commercially available, and (3) a middle tier cooperating with the WWW front end and the RDBMS back end. The middle tier contains the operative software code that performs the auction method of the present embodiment. That software code includes a graphical user interface arranged under a URL file system and accessible via the internet (www.politicalsheepdog.com) through which the innovators 11, special interest groups 12, constituents 13, politicians 14, and government enterprises 15, all interface and take part in the public policy auction system 20.

2. General Structure of the Auction Methods

The method generally comprises a registration phase for each new public policy, followed by an initial valuation phase. In the preferred embodiment, the valuation phase assigns a value to a new public policy based on the innovator's forecasted savings generated from the improved efficiency of the given public policy. Once valued, a series of hierarchical negotiations occur, starting with agreements between the smallest contributors, who then combine to negotiate with the larger contributors. Following the valuation, various auctions take place. These auctions are for the right to receive a monetary incentive that is a portion of the savings generated from the improved efficiency of a given public policy. In a second embodiment, a corporation, special interest group, individual etc. simply provide funds and there is no need for negotiations, although members of an association may use the negotiation process of the preferred embodiment to determine how much members might contribute.

Figure 2:
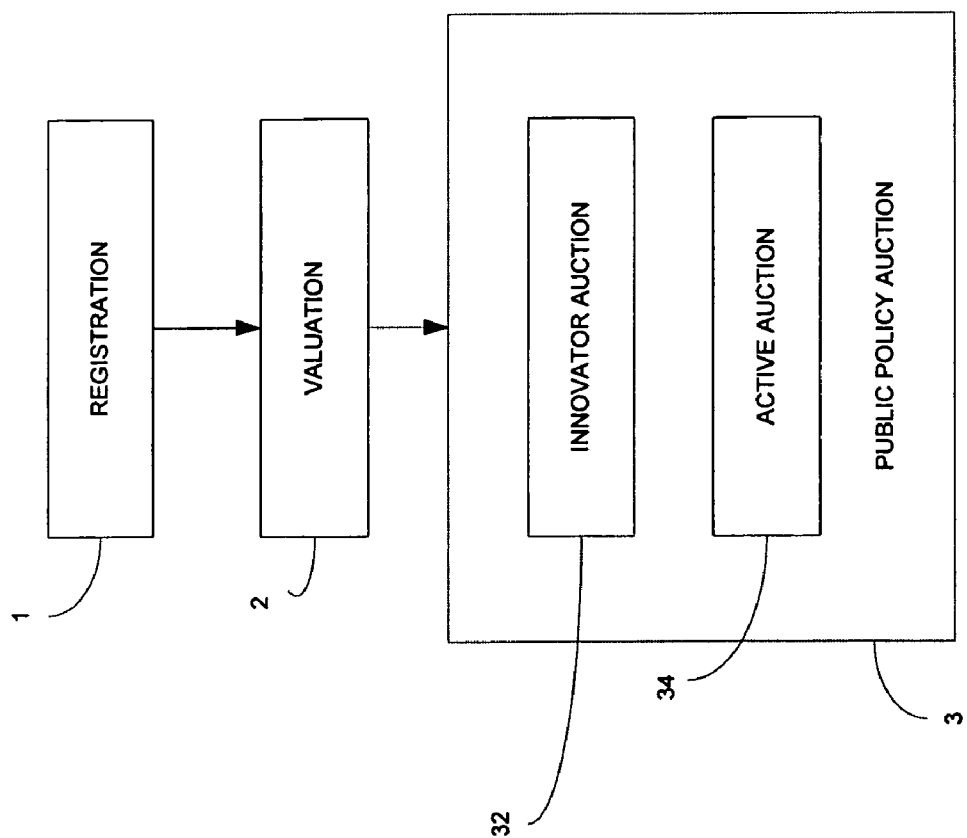
FIG. 2 is a block diagram overview of these three phases.

FIG. 2 is a block diagram overview of these three phases.

At step 1, during the registration phase for each new public policy, information is collected on the policy itself and the proponents of the new policy and is keyed into a central auction database.

At step 2, the new public policy is valued. The savings gained by implementation of the efficient public policy is forecast, and shares are established each representing a portion of the approximate savings.

At step 3, one or more auctions are held. The present public policy auction system and method includes a hierarchical series of auctions for the proprietary right to a portion of the savings generated from the efficiency of the public policy (as determined in step 2 above). The auction step 3 is comprised of two stages, beginning with an "innovator's auction" 32 that determines the initial innovators' relative distribution of shares of the savings. The purpose of the innovator auction 32 is to replicate competitive forces and incentives between a large number of buyers and sellers, when only a small number of either or both buyers and sellers exist and this small number would cause the market to crash or go to monopolistic levels. The problem with a small market, assuming two bidders, is that the bidders can bid so low that they have no chance of overcoming costs. Consequently, the market crashes and buyers get nothing. To prevent market crashing, the innovator auction 32 prevents an innovator from bidding if he or she wins a number of consecutive bids, which gives the other bidder a chance to recover their costs. The return for creative innovators is a substantial percentage of the estimated cost savings of the measure. Negotiation attempts to provide the innovator of the good law with pay equivalent to the fair market value (marginal revenue product of the last unit) of the savings created by the good law. After ownership distribution and the approximate savings for the initial innovators is established and the innovator auction is complete, the program starts one or more inter-related "active auctions" 34 for constituents. In this active auction 34 constituents bid for shares in the savings developed from the implementation of the policy. This motivates constituents to encourage politicians to enact these efficient public policies. A constituent or group wins a bid, if their bid is the lowest in their particular legislative district or area, if their politician supported the enactment of the policy, and if the policy is enacted and enforced.

By way of a specific example, let us suppose that an economist sees that the auctioning of airwaves could bring in $3 billion per year to the U.S. treasury. Employing the auction exchange of the present invention, the concept is registered (step 1) and valued (step 2) at $3 billion per year, and is subjected to the interrelated set of policy auctions (step 3). The constituents bid an average of 0.00033 of the savings or $100,000 apiece, and the special interest groups bid an average of $40,000 apiece or 0.000133 of the saving from the efficient policy. If we assume that there are 350 members of Congress, but only 175 are necessary to achieve a majority, then it would take $175 million for the constituents to save the "consumers $3 billion in reduced taxes."

The active auction 34 for quantifying and redistributing the marginal revenue product of public policy innovations is hereafter described in detail, and it is to be understood that all terms used herein unless defined above are intended to have the same meaning as commonly understood by one of ordinary skill in the art to which this invention belongs.

3. Innovator Auctions

Figure 4:
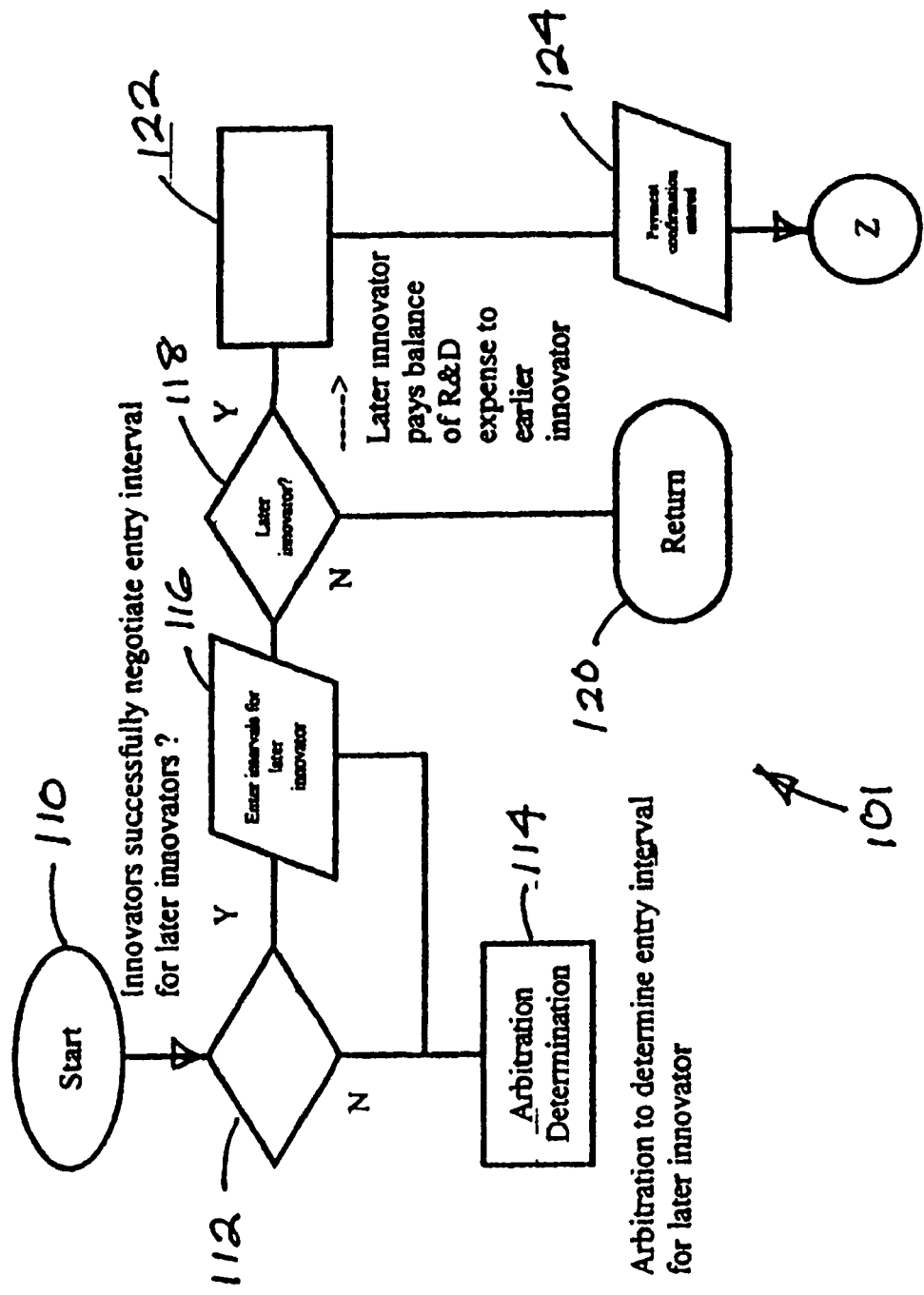
FIG. 4 is a chart depicting the entry interval negotiation method 101 supporting the innovator auction method 100.

Referring now to FIG. 4, at least one innovator encounters the entry interval negotiation method 101 at the start of the front end client in step 110. In step 112, innovators attempt to negotiate an appropriate entry interval (the interval of time before the next researching innovator can enter the market) for future innovators. The months of the duration of the entry intervals(s) are keyed in and stored for each innovator, and the extra amount of the research and development expenses are keyed in and stored for each innovator. Following this, the share of the research and development expenses that needs to be paid by each subsequent researching innovators is calculated as follows.

If E=expenses, and n=the number of the sequential order in which that innovator would have discovered the solution, then the nth innovator would pay=$E \times ([1/(n-1)]-[1/n])$.

If negotiation at step 112 is unsuccessful, an arbitration is conducted in step 114. The result of either negotiation in step 112 or arbitration in step 114 is entered in step 116. If there are no new innovators, the process restarts in step 120.

Each newly-entering innovator must pay the balance of research and development, capital, risk, and legal expenses to earlier innovators in step 122, in order to gain entry into the innovator auction. When the payment is received it is keyed in. At weekly to yearly intervals, the computer checks to see if the calculated payments for research and development cost had been paid and the date was one month to one year prior to the initial (appropriate) entry interval. Once proper payments are confirmed in step 124, the innovators enter the innovator auction at step 164.

In some cases, an initial innovator may invent a public policy innovation and a potential subsequent innovator may appear. When the potential subsequent innovator has copyrighted material that describes progress that could have lead to the invention, the potential subsequent innovator notifies the exchange. The potential subsequent innovator and the initial innovator(s) then negotiate to determine whether or not the potential subsequent innovator probably could have produced the public policy innovation. If the negotiations are successful in favor of the potential subsequent innovator, then the initial innovator(s) and the potential subsequent innovator enter negotiations to determine the duration of time before the initial innovator competes with the potential subsequent innovator.

If both the initial innovator(s) and the potential subsequent innovator agree that the potential subsequent innovator probably could not have produced the innovation, then the initial innovator(s) negotiates with the government concerning the duration of his or her monopoly protection.

If the negotiations to determine whether or not the potential subsequent innovator could have produced the policy innovation were unsuccessful, then, the initial innovator(s) and the potential subsequent innovator choose an arbitrator. Arbitration will be conducted in accordance with the American Arbitration Association.

4. Active Auctions 34

The active auctions are a series of hierarchical auctions in which constituents bid for shares in the savings developed from the implementation of the policy, thereby motivating constituents to encourage politicians to enact these efficient public policies. Active auctions consist of two general categories. The first category relates to whether or not the constituent gave money to the candidate during the campaign season. This category includes primary and general election auctions, which require contributions to a winning candidate during the respective primary and general election campaign seasons to participate in those auctions. The first phase of the primary and general elections occurs during the respective campaign season. Bids placed during the first phase of the primary and general election auctions apply to all bills, supported by the auction system, for the entire term of the successful candidate or his or her appointed replacement. If the candidate's replacement is elected, the bids would end.

No contribution is necessary to participate in the session level auctions, which can theoretically begin anytime, but will usually occur during the session of the legislature. These bids may be for all bills, but usually only for specific legislation.

The second auction category relates to the stage of legislation that requires constituent support. As a result, there are sponsorship auctions to find a sponsor for the bill. There are also committee and floor auctions to encourage the passage of a bill through each committee or through vote, which include the entire membership of a house of a legislature. As a result, if there is more than one house in a legislature, there may be a committee and floor auction for each house.

The committee and floor auctions are slightly different from the sponsorship auctions, because committee and floor auctions attempt to find the minimum number of lowest bidding pools of constituents necessary to get a bill passed by a majority of legislators. The sponsorship auction only needs the minimum number of lowest bidding pools of constituents necessary to get a bill sponsored. Since only a few legislators are necessary for sponsorship, these pools are likely to be fewer and smaller.

Since the two auction categories are combined in the active auction, there are primary, general or session level sponsorship auctions; primary, general or session committee vote auctions; and primary, general or session level floor vote auctions.

Only contributors for a candidate can enter the primary and general election sponsorship, committee and floor vote auctions, but anyone can enter the session level sponsorship, committee and floor vote auctions. There are, however, legal limits that would prohibit the employees of any government from participation.

Figure 3:
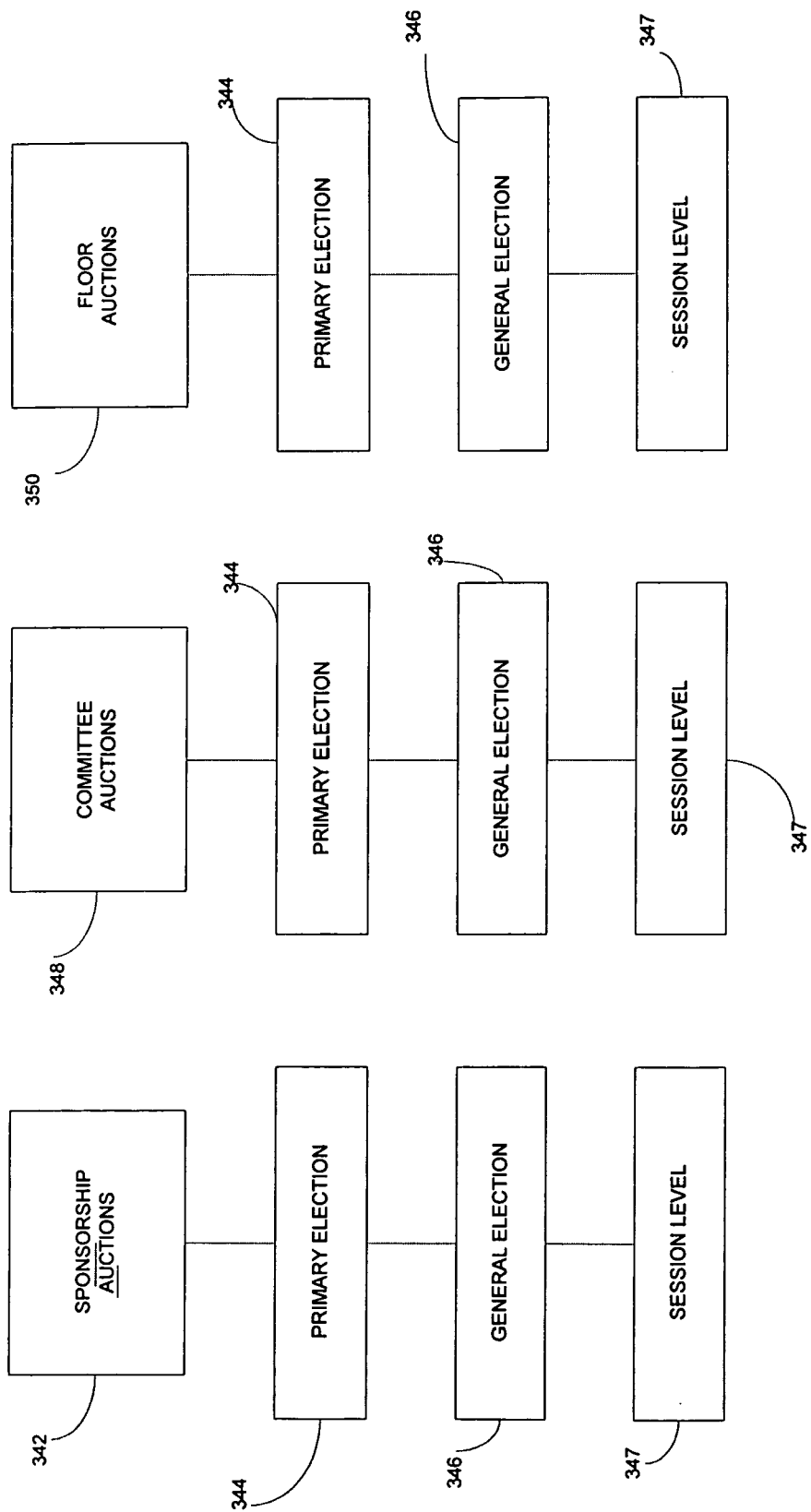
FIG. 3 is a block diagram showing the interrelated auctions comprising the active auction 34.

FIG. 3 is a block diagram showing the interrelated auctions comprising the active auction 34. The purpose of sponsorship 342 auctions is to find a sponsor for the bill. The purpose of the committee 348 and floor 350 auctions is to encourage the passage of a bill through each committee or through vote. The purpose of the primary 344 and general 341 election auctions is to provide an incentive for constituents, who want to increase inefficiency, to contribute to the campaigns of candidates for the purpose of reducing the influence of other special interest groups. The purpose of the session level 347 auction is to expand participation, since anyone can participate and contribution is not required, and thereby increase the power of the auction process. Up to nine types of auctions may run for any given bill. The actual number of auctions depends on the number of committees necessary to pass a bill and whether or not auctions are run at all levels or selectively, when deemed necessary.

5. Lobbying Phase

After the active auction bidding phase, the system enters a lobbying phase, during which the constituents lobby their respective legislator at pre-assigned times. The lobbying phase only occurs during, or possibly before, legislative sessions. During Phase I of an auction, the bidding phase, the system counts the participants in an auction and estimates the length of time to allow all of the participants to lobby their legislators. From that estimate, the system determines when to end Phase I and start Phase II of the auction. On the initiation of Phase II, live operators contact the three lowest bidding constituents for each legislator. The responding constituent with the lowest bid for each legislator lobbies their legislator, who will probably reject the constituent and the constituent drops into the pool of lowest bidding constituents for their legislator. This process continues for each legislator until: 1) the legislator has no more constituents in the auction, 2) the legislator commits to support the policy by pressing the support button, or 3) the program administrator ends the auction before the vote.

6. Web Layout

Figure 5:
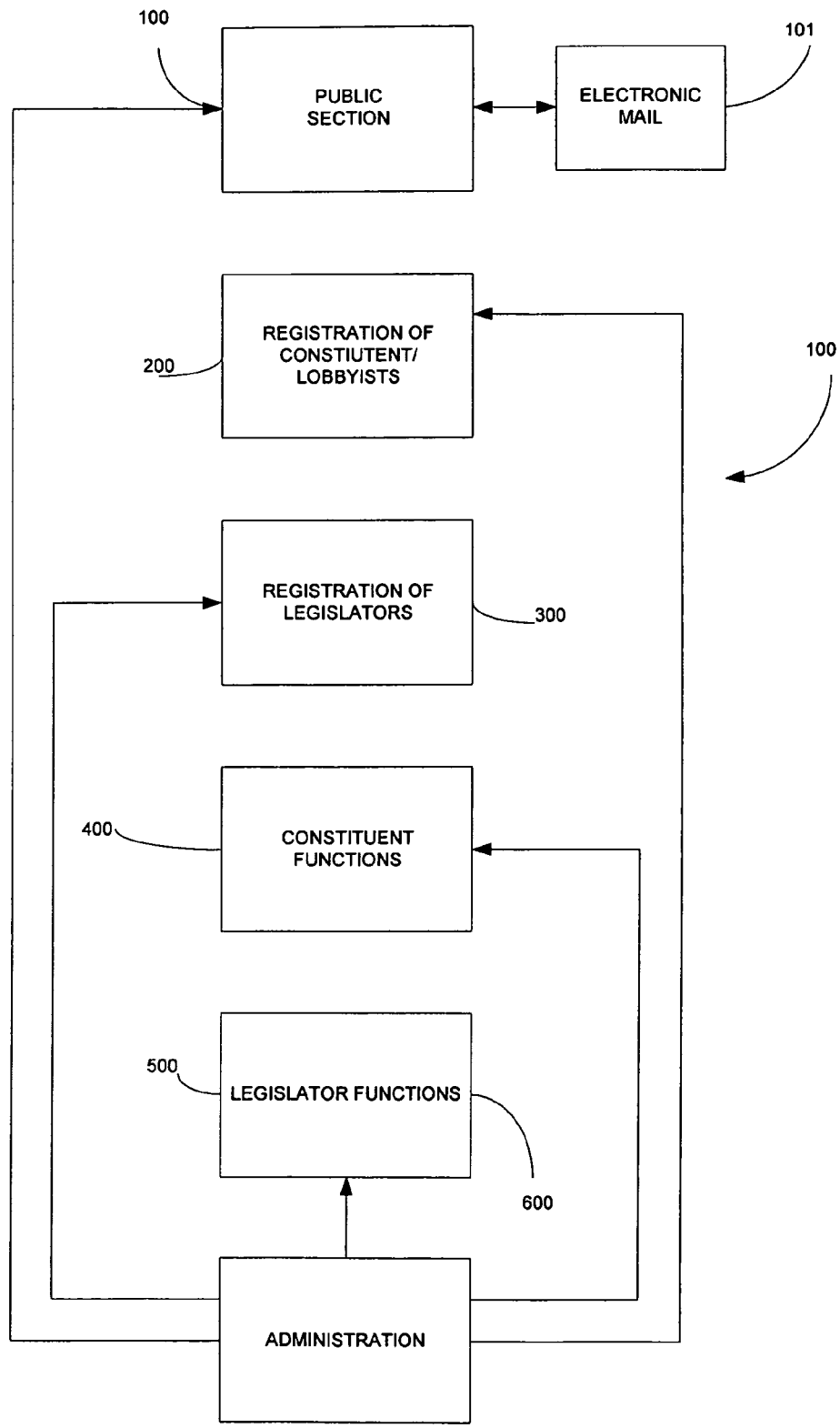
FIG. 5 is a chart depicting the major system functions of the present invention.

FIG. 5 is a chart depicting the URL system breakdown of the present invention, which includes different graphical interfaces for the different participants. The Public Section 100 includes a graphical user interface arranged under a URL file system accessible via the internet to the general public and may not require registration or login. This Public Section 100 includes general information about the system, specific information about governments and policies, and provides access to a message board.

Registration of constituent/lobbyists at 200 likewise employs a graphical user interface to deploy the steps necessary to register a constituent lobbyist for participation in auctions. These steps, as described in more detail below with regard to FIG. 8, include general information/restrictions, data collection and authorization, terms and conditions, and notification. Registration of legislators at 300 includes the steps necessary to register a legislator. These steps, as described in more detail in FIG. 9, include general information, data collection and authorization, and notification.

Figure 10:
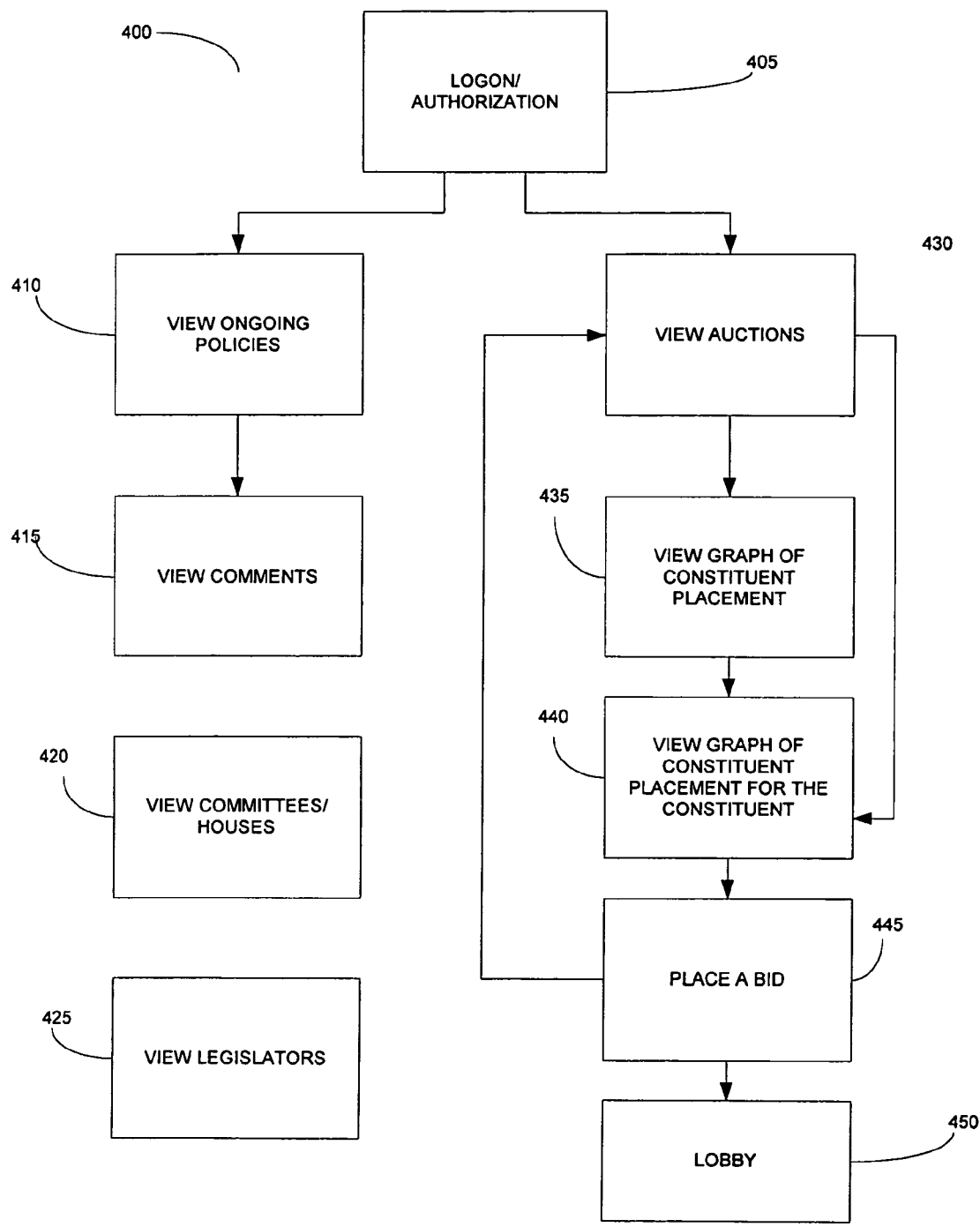
FIG. 10 is a chart depicting the constituent functions of the present invention.

Constituent functions at 400, and described in more detail in FIG. 10, include the steps necessary for a constituent to participate in auctions. These steps include login and authorization; various views of policies, legislators, legislative bodies, and comments; auction view; view graphs of auction process; placing a bid; and lobbying.

Figure 11:
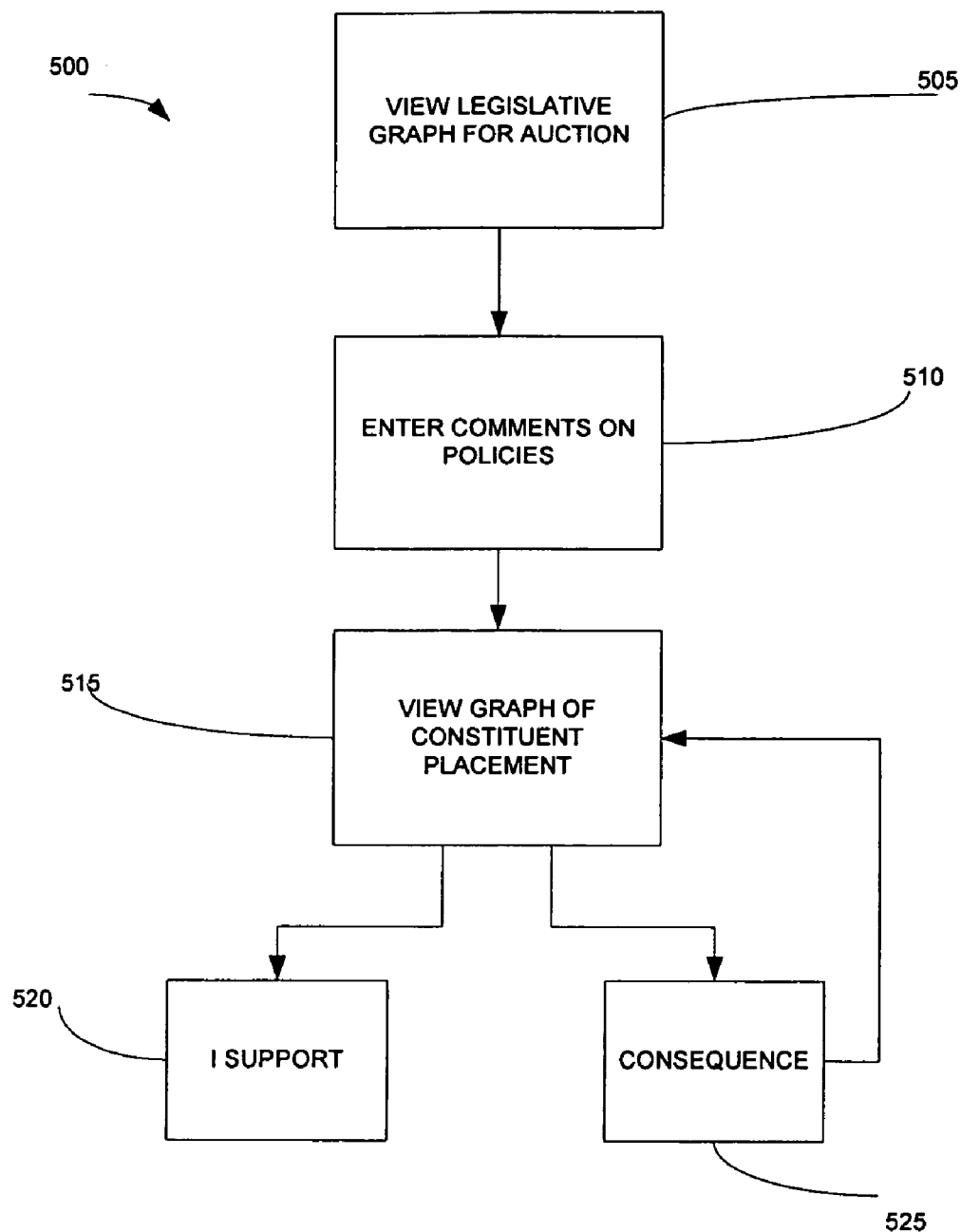
FIG. 11 is a chart depicting the legislator functions of the present invention.

Legislator functions at 500, and described in more detail in FIG. 11, include the steps necessary for a legislator to actively participate in the lobbying effort. These steps include viewing the status of an auction, recording comments on policy, and indicating support for the policy.

Figure 7:
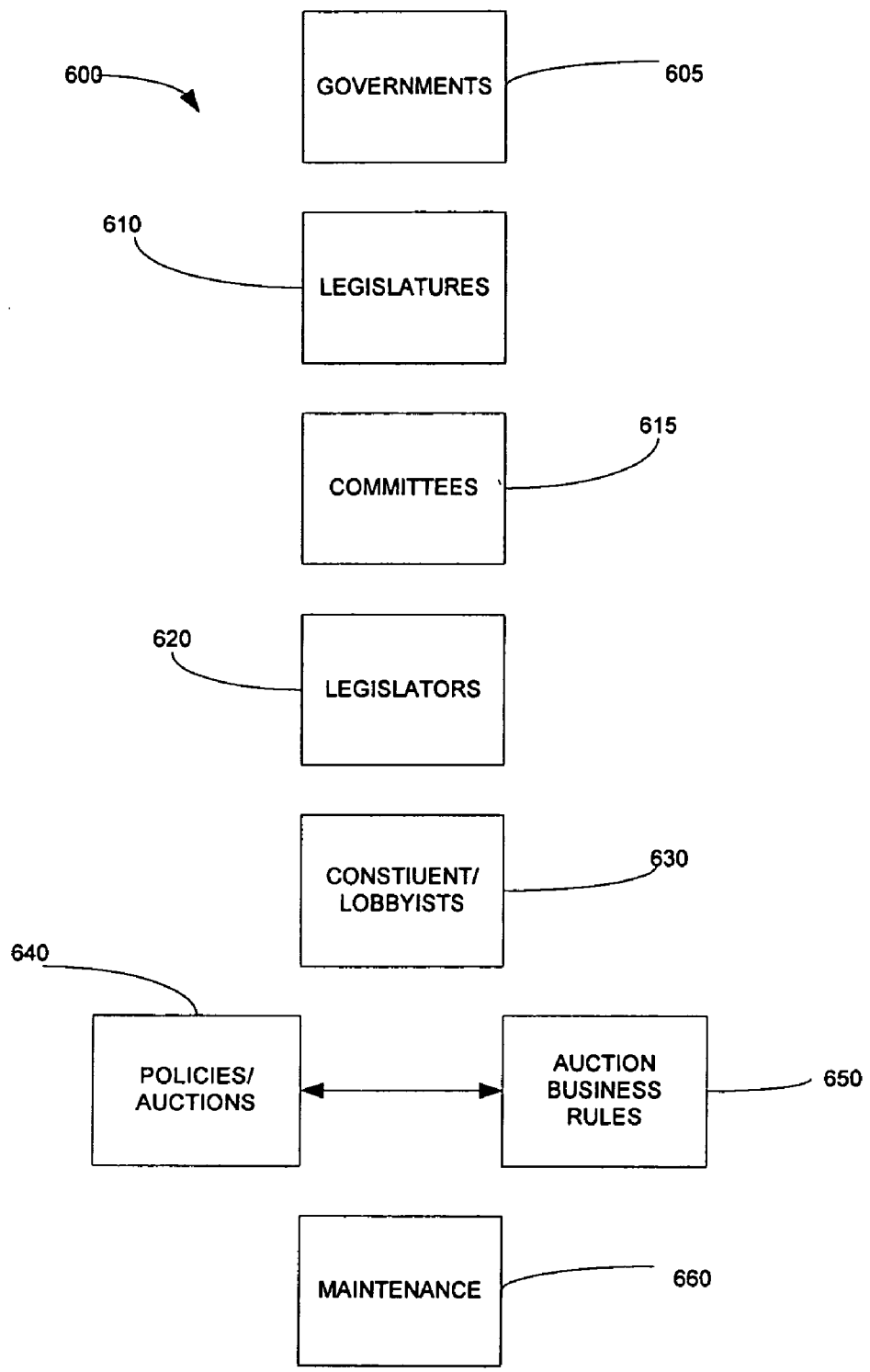
FIG. 7 is a chart depicting the administrative functions of the present invention.

Administrative functions at 600, and described in more detail in FIG. 7, include the steps necessary to establish and maintain the system. These administrative functions monitor, police and/or enable all of the other functions. These steps include setting up and maintaining legislatures, committees, governments, and legislators, and constituent lobbyists; establishing and maintaining policies and auctions; establishing and maintaining auction rules; and routine maintenance.

Figure 6:
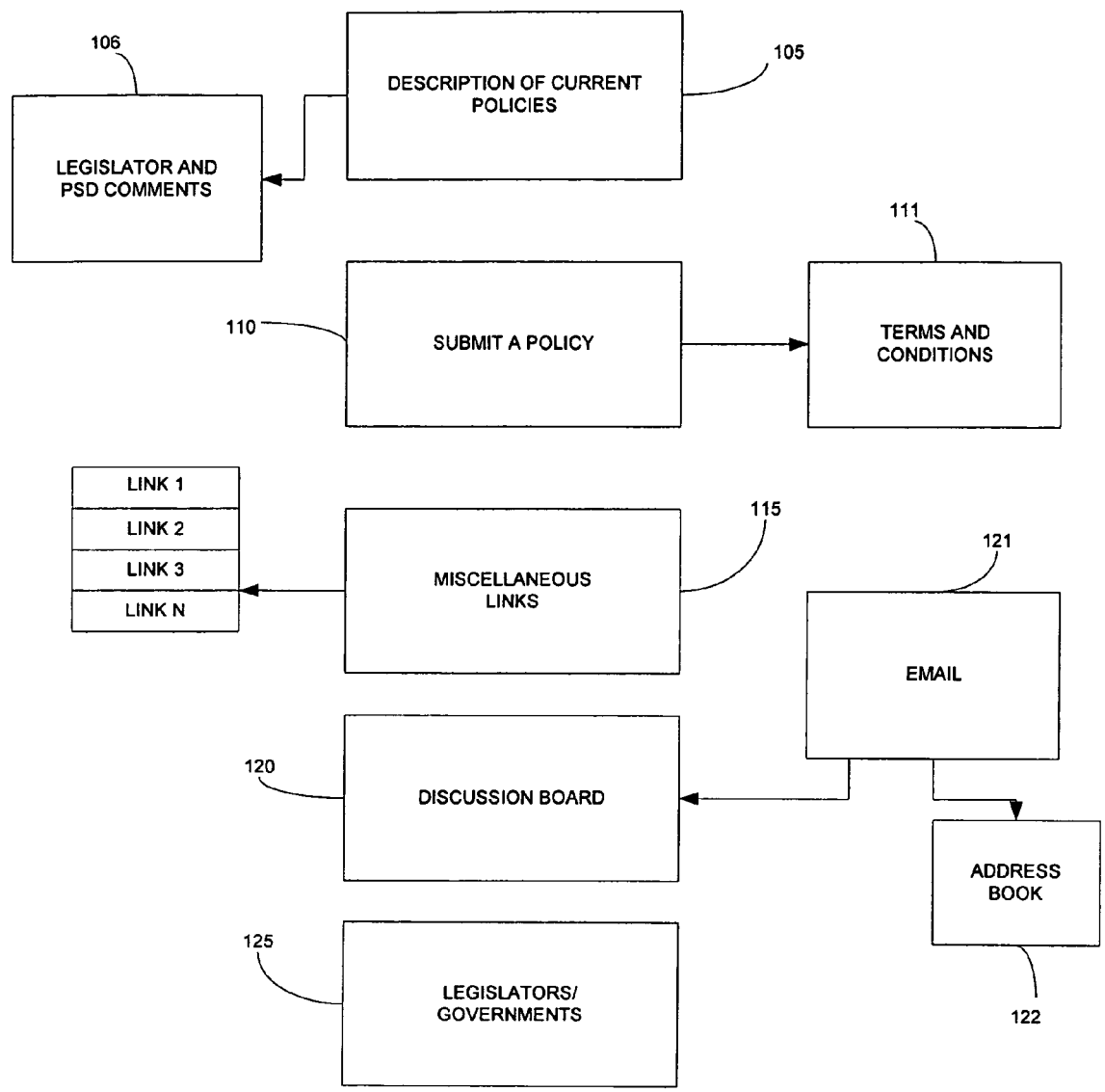
FIG. 6 is a chart depicting the public system functions of the present invention.

FIG. 6 is a chart depicting the Public Section 100 functions of the present invention. The public functions are accessible to the general public and do not require a unique system login. Because this is a non-secure section of the system, the information provided and available functions are general and limited in nature. At 105, a description of policies that are currently active in the system is provided. An individual reviewing this information may wish to know more about a specific policy and may select to link to legislator and system comments regarding the specific policy at 106. At 110, the innovator process is described and, if he or she elects to submit a policy as an innovation, a link is provided to the Terms and Conditions at 111. Other miscellaneous links to relevant material are provided at 115. The public user may also elect to view discussion boards at 120. Legislators for each government configured in the system are displayed at 125. This section includes information such as the legislator's government entity, committees, districts, and demographic information.

FIG. 7 is a chart depicting the administrative functions 600 of the present invention. The administrative functions are those tasks performed by a system administrator that are necessary to set up and maintain the system in a secure environment. At 605, names and levels of governments are set up and updated. At 610, legislature data, such as the legislature name, the associated government and the title used for members, are established and maintained. At 615, committee data, such as the committee name, the associated government and house, and the members, are established and maintained. At 620, legislator data, such as the name and contact information, the associated legislature, the associated committees, and policies supported, are established and maintained. At 630, constituent lobbyist data, such as identifying information, voter authentication, and auction history, are established and maintained. Policies and auctions are established and maintained at 640. These functions include policy information, such as policy name and description, innovator, sponsor, total and distributed payout for the policy, committees and legislatures associated with the policy, auction schedule, opening auctions, notification to constituents, and recording contacts. At 650, auction business rules are maintained. These functions include establishing and following auction schedules, closing auctions, monitoring lobbying and legislators, monitoring payouts, and contacts. Routine maintenance tasks, such as updating text of standard notifications and messages, maintaining mailboxes, and logon management are performed at 660.

Figure 8:
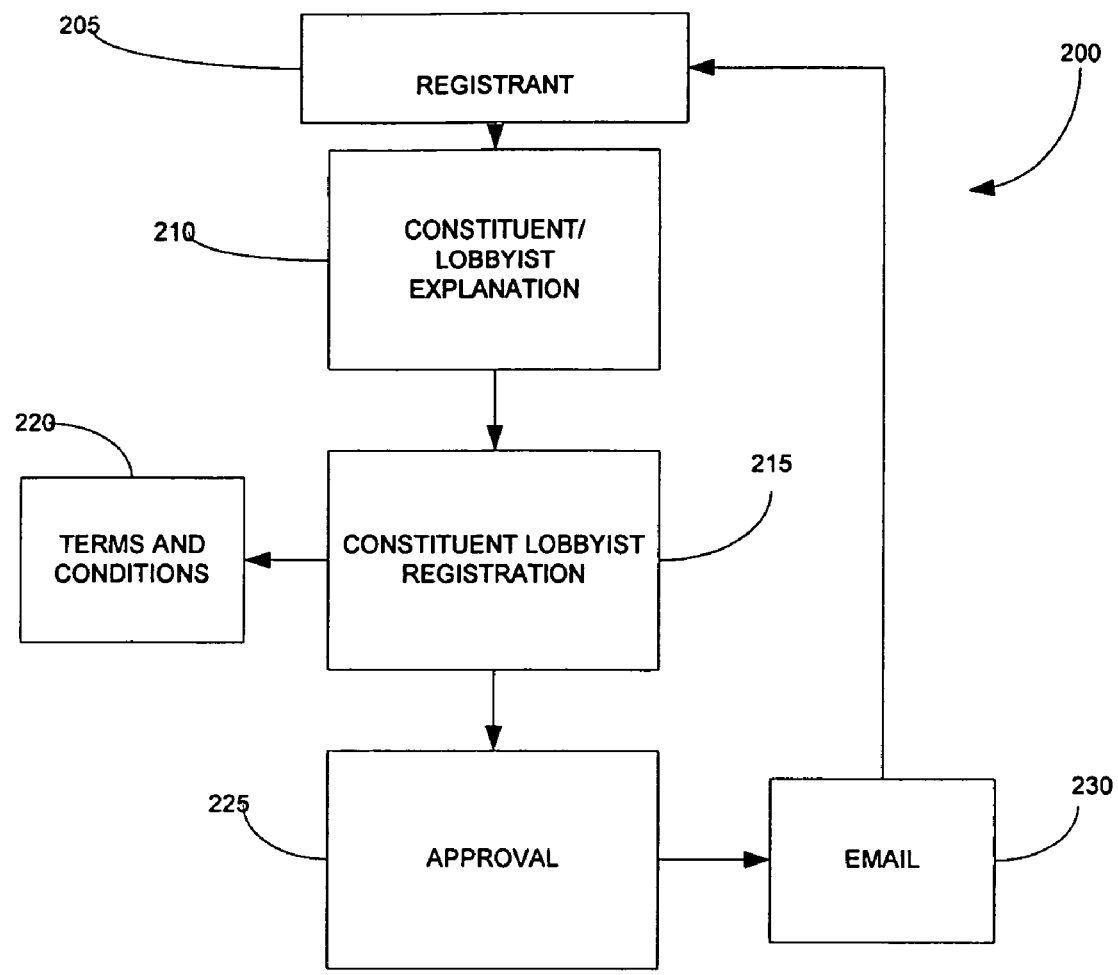
FIG. 8 is a chart depicting the constituent registration function of the present invention.

FIG. 8 is a chart depicting the constituent registration function 200 of the present invention. These functions include the steps necessary to register a constituent lobbyist for participation in auctions. The registrant 205 is any registered voter (who may or may not be a professional lobbyist or a government employee, depending on the current laws of applicable jurisdictions) who wishes to participate in one or more auctions. At 210, the registrant is provided general information about the constituent lobbyist process, including restrictions and limitations. At 215, the registrant provides identification information, including personal demographic information as well as voting district, and preferences on key issues. The registrant chooses a user id and password. All of the information provided is validated by the system and errors are returned as appropriate. If the user id is unique, the system assigns it to the registrant. Once the data is validated, the terms and conditions for constituent lobbyists 220 are displayed and the registrant must agree to accept the terms and conditions before the registrant is approved at 225. Once the registrant is approved by the system administrator, an email notification is sent to registrant at 230.

Figure 9:
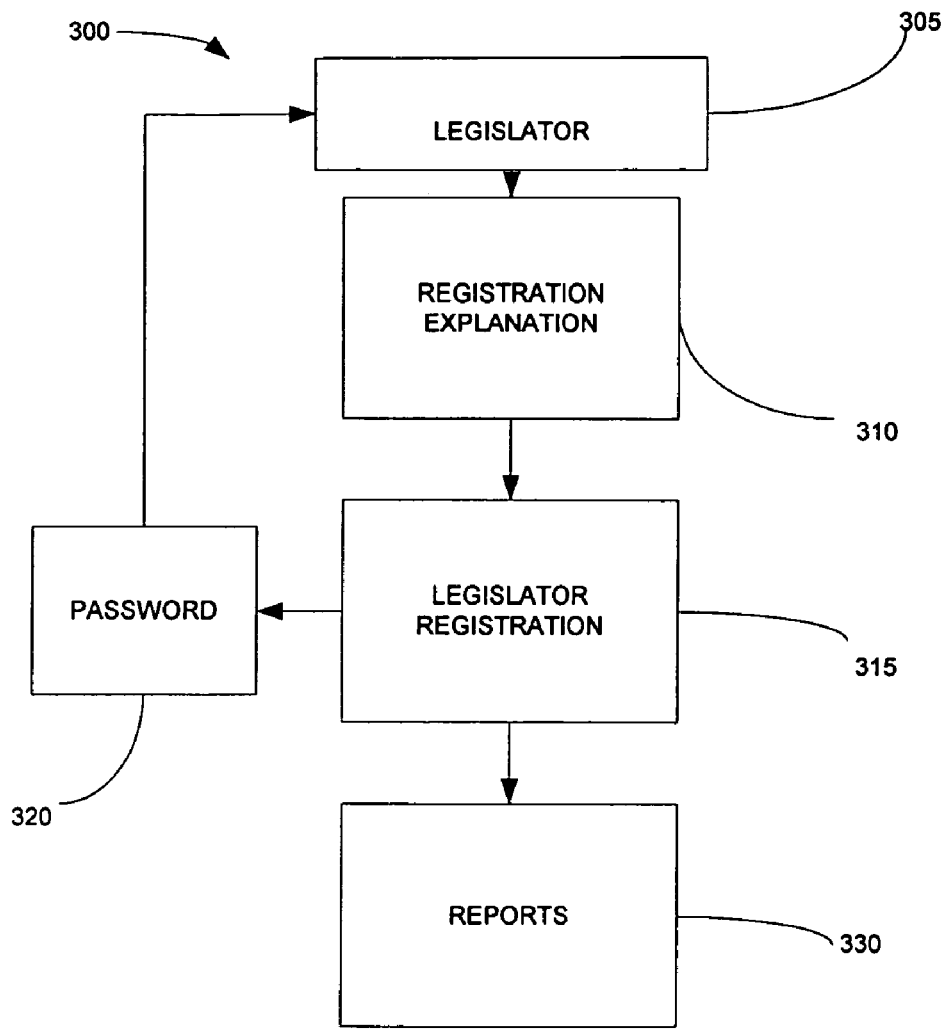
FIG. 9 is a chart depicting the legislator registration function of the present invention.

FIG. 9 is a chart depicting the legislator registration function 300 of the present invention. These functions include the steps necessary to register a legislator to participate, i.e., view auctions, view lobbying activity, enter support of a policy, etc. The legislator 305 is any elected legislator, who wishes to participate in the system for promotion of innovations to efficient public policy. At 310, the legislator is provided general information about the process, including registration and the need to do so. At 315, the legislator provides identification information, including demographic information, government entity, district represented, committees, and a requested user id. The system will assign a password at 320 and send it to the legislator. The data for all registered legislators are collected and assimilated and online reports with different views of aggregated legislator data are generated at 330.

FIG. 10 is a chart depicting the constituent functions 400 of the present invention. These functions include the steps necessary for a constituent to participate in an auction. At 405, the constituent logs on and the user id and password are validated. Once logged in the constituent has a number of informative views 410-425 that he or she may access for personalized information relative to the auction process. At 410, the constituent may view the current active policies that are available for the constituent, and by selecting a specific policy, they can view additional detail about the policy and any related auction. By selecting comments for a particular policy, at 415, the constituent may view legislator comments on the policy as well as comments of the system administrator and others. At 420, the constituent may view the houses or committees available to him or her. Only those houses and committees with legislators who represent the districts of the viewing constituent will be displayed. In addition, auction phase I and phase II schedules may also be displayed. At 425, the constituent may view the legislators and/or candidates who represent the viewing constituent and who are or will be associated with auctions on which the constituent is eligible to bid.

The functions related to the constituent's participation in auctions are depicted in 430-450. At 430, the constituent may view auctions for which this constituent has made a bid. The bidding details of the active auction, including the status and schedule are displayed. For completed auctions, the constituent may view information such as constituent's last bid, whether legislator supported the policy, was in the lowest percentile, and/or won the bid, and winnings. At 435, the constituent may view a bar graph of his or her biding placement. The graph shows a line for each legislator. The viewing constituent's bid is displayed on the graph in a unique color, for example, red; and the bids of other equally ranked constituents for other legislators are displayed in a different color bar, for example, yellow. The areas under the red and yellow sections represent the sum of bids lower than the bids of the constituents or their equivalents in other districts. These areas are represented in yet another color, for example, green. The area above the red/yellow represents the sum of the bids above the viewing bidder or his or her equivalent in other districts. Numerical and graphical zoom functions are also provided.

At 440, the constituent may view a bar graph of his or her placement for Phase II, the lobbying phase. The bid of the viewing constituent is shown in a unique color, for example, red. The total "pool" of the legislator for the viewing constituent includes the sum of the bids of the constituents in the pool or rejected lobbying constituents with the bid of the currently lobbying constituents in another color, such as yellow. The total pools of the other legislators may be shown in yet another color, for example, green. The area above the yellow and green represents the sum of the bid of constituents, who have not lobbied yet, and this area is shown in yet another color, for example gray. A zoom feature is also included. At 445, the constituent places a bid. The highest and lowest bids for the constituent's legislator, as well as the constituent's last bid, are shown. A bid-up button gives the constituent the next highest available bid and a bid-down button gives the constituent the next lowest available bid. This feature forces all bids to be unique. Bids may be rejected if over certain predefined limits. A zoom feature is also provided. The constituent can continue to view the auction and repeatedly change bids until the bidding phase is closed by the administrator. At 450, during Phase II, the constituent lobbies his or her legislator during the pre-assigned lobbying time period.

FIG. 11 is a chart depicting the legislator functions 500 of the present invention. At 505, the legislator may view any ongoing auction for a policy only during phase II that requires his or her vote. The legislator can select a policy and drill down to the auction graph associated with the particular policy. At 510, the legislator may enter any comments and opinions on a particular policy that he or she is required to vote on. At 515, the legislator views the graph of his or her constituent placement. The graph may show the total pool of the viewing legislator in a unique color, for example, yellow, and the total bids for the other legislators in another color, such as green, or distinguish the viewing legislator's column in other ways. The areas in yellow should include the sum of all of the bids of the viewing legislator's constituents in the pool of that legislator's rejected lobbying constituents and the bid of the currently lobbying constituent. The areas in green should include the sum of all of the bids of the equivalent to the viewing legislator's constituents in the pool of those legislators' rejected lobbying constituents and the bid of the currently lobbying constituent for those legislators. The areas above the yellow and green represent the sums of the bids of constituents, who have not lobbied yet, and are shown in yet another color, for example, gray. Under the graph, the page has an "I Support" button at 520. The legislator clicks on the "I Support" button to show support of the policy/bill. Once the legislator clicks on the "I Support" button, the legislator stops the lobbying and the yellow might change to another color or might become a checkered board pattern or striped.

In addition to the "I Support" button, the legislator is provided another button, the "Consequences" button, at 525. The purpose of the consequence button is to show the legislator the consequence of failing to push the "I Support" button and the relationship of his pool to the pools of other legislators for the next round of lobbying constituents with bids in the auction. If the legislator pushes the "Consequences," the screen will show another graph. The graph to the viewing legislator shows the total pool of the viewing legislator in a specific color, such as yellow, and the total pools of the other legislators in another color, such as green, for the next round of lobbying constituents with bids in the auction. The areas in yellow include the sum of all of the bids of the viewing legislator's constituents in the pool of that legislator's rejected lobbying constituents, the bid of the currently lobbying constituent and the next highest bid for the next constituent to lobby. The areas in green include the sum of all of the bids of the equivalent to the viewing legislator's constituents in the pool of those legislators' rejected lobbying constituents, the bid of the currently lobbying constituent for those legislators and the next highest bid for the next constituent to lobby. The areas above the yellow and green will represent the sum of the bid of constituents, who have not lobbied yet, excluding the bid of the lowest bidder, who has not lobbied. The areas above the yellow and green are yet another color, for example, gray. After viewing the "consequences", the legislator may return to the constituent placement graph at 515. Once the legislator clicks on the "I Support" button, the legislator stops the lobbying and the graph changes attributes to show that lobbying has stopped. This graph also has a zoom feature.

Figure 12:
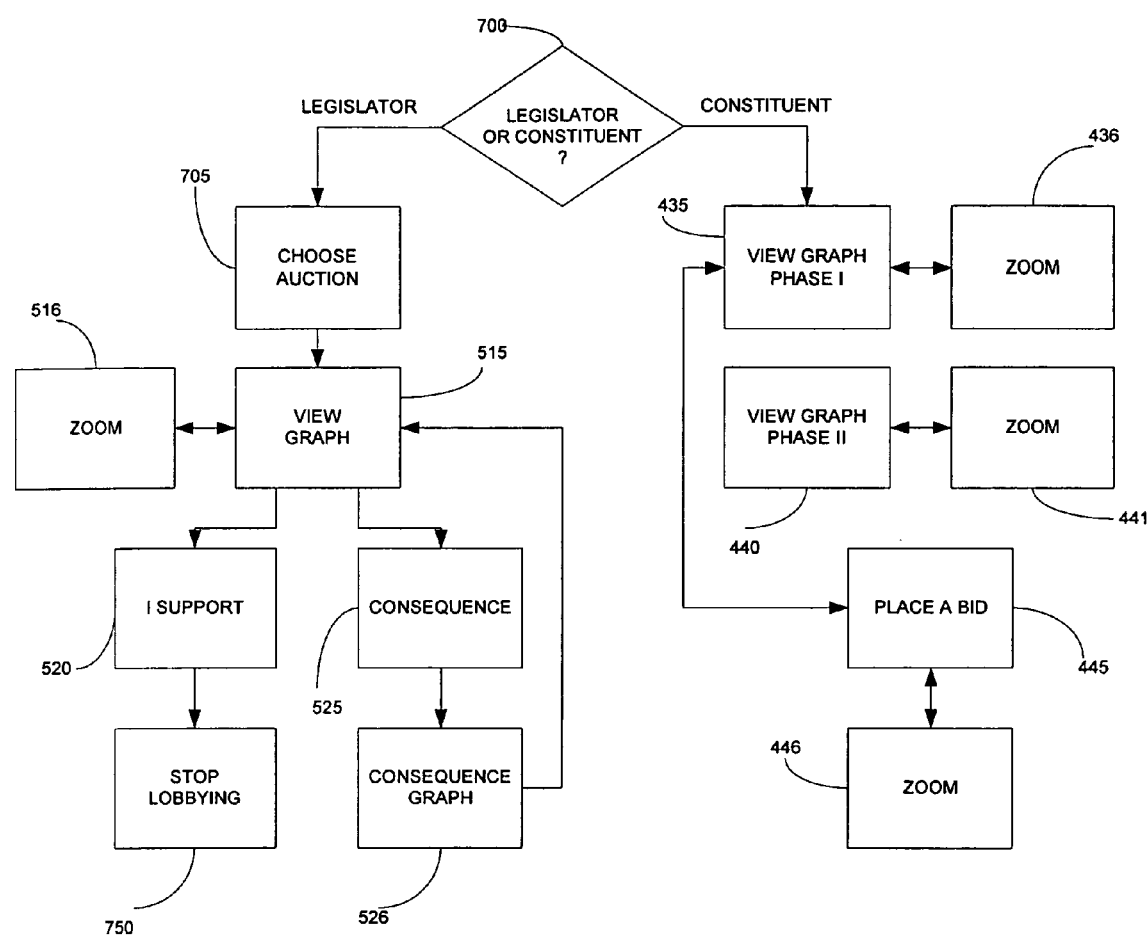
FIG. 12 is a chart depicting the graph functions of the present invention.

FIG. 12 is a chart depicting the graph functions of the present invention. At 700, a determination is made as to whether the viewer is a legislator or a constituent as legislators and constituents have different interests and are thus provided different views of the auction process. At 705, the legislator views a list of active auctions in which he or she has a vote in the policy, and selects a specific auction. At 515, the legislator views the graph of constituent placement, as described above in FIG. 11. The legislator may select the "I Support" button at 520 to show his or her support for the auctioned policy, as described above in FIG. 11. The legislator may also select the "Consequence" button at 525 to view the Consequence graph at 526. After viewing the consequences, the legislator may return to the constituent placement graph at 515. Once the legislator clicks on the "I Support" button, the lobbying stops and the attributes of the graph, such as the colors of the bars or legislator's names, change to reflect the lobbying is completed.

If the viewer is a constituent, at 435, the viewing constituent, views the graph for Phase I as described above at FIG. 10. The bars in the bar graph represent the total bids of a legislator's constituents in a house or committee. The ranking of constituents for a legislator is by the size of their bids. The bar for each legislator will represent the sum of the bids of that legislator's constituents. The ranking of equally ranked constituents of different legislators shall be the sum of the individual bids of the equally ranked constituents and each constituent's lower ranking constituents. If two of these sums are equal, then the date and time at which the legislator contacts the "I Support" button determines the winner. If two legislators contact the support button at identical times or the legislators of two equally ranked constituents fail to contact their "I Support" button, but vote for the legislation, then earliest date and time of the bid of the highest of the constituents in the low bidding pool will determine the winner. Each bar has three colors and each bar graph has four colors. The bar of the viewing and bidding constituent has a specific bright colored area representing the viewing bidder's bid. The color below the constituent's bright colored area represents the total of lower bidding constituents for the viewing bidder's legislator. The color above the constituent's bright colored area represents the total of higher bidding constituents for the viewing bidder's legislator. The bids of the bidders of equal rank of legislators, who are not constituents of the viewing bidder's legislator, have a separate bright color.

All of the bids of lower ranking constituent bidders of different legislators from viewing constituent, who have lower bids than the respective equally ranked bidders (i.e. ranked equally to the viewing bidder) of other legislators, will have the same color as the lower ranking bidders of the viewing constituent's legislator, who have bids below the viewing bidder, i.e. all of bidders of lower rank than the viewing bidder get the same color. All of the bids of higher ranking bidders, who have higher bids than the equally ranked bidders (ranked equally to the viewing bidder) of their legislator, will have the same color as the bidders of the viewing constituent's legislator, who have bids above the viewing bidder, i.e. bidders of higher rank than the viewing bidder get the same color. As constituents bid and their ranks for their legislator change, their bar may change ranks and positions with other bars on the bar graph. At 436, the constituent viewer may elect to zoom in on certain portions of the Phase I graph. At 440, the viewing constituent views the graph for Phase II as described above at FIG. 10. In the lobbying phase II, the bid for the viewing constituent in the bar of the constituent's legislator has its own bright color, for example, red. The lower portion of each legislator's bar represents the amount of bid of the constituent, who is lobbying the legislator, and total amount of the bids of the constituents, who are in the pool of rejected constituents, who failed to successfully encourage their legislator to click the support button within their time limit. The lower portion of the bar of the viewing legislator or viewing constituent have a separate color. The lower portions of the legislators, who are not the viewing legislator or the legislator of the viewing constituent, have the same unique color, but a different color from the lower portion of the viewing legislator or viewing constituent. The constituents, who are not in pools, have same unique color, such as gray, in the upper portion of each bar to represent the high bidders, who are not in pools and who are not lobbying. The bars are ranked by the sum of the bids of the constituents, who are the currently lobbying bidder and who are the bidders in respective pools of rejected constituents, i.e. the program ranks the sum of the bids represented by the color in the lower portion of the legislator's bar on the graph to determine the rank of each legislator's bar. As the total of the bids, represented by the color in the lower portion of the legislators' bars, change, the ranks of the bars may change. If the ranks change, the bars will change positions on the bar graph. At 441, the constituent viewer may elect to zoom in on certain portions of the Phase II graph. At 445, the viewing constituent places a bid as described above at FIG. 10 and may zoom in on the bid at 446 and/or return to view the graph of Phase I at 435. The viewing constituent may repeat these steps at 435 and 445 as often as he or she wishes within the pre-assigned limits of the auction.

Figure 13:
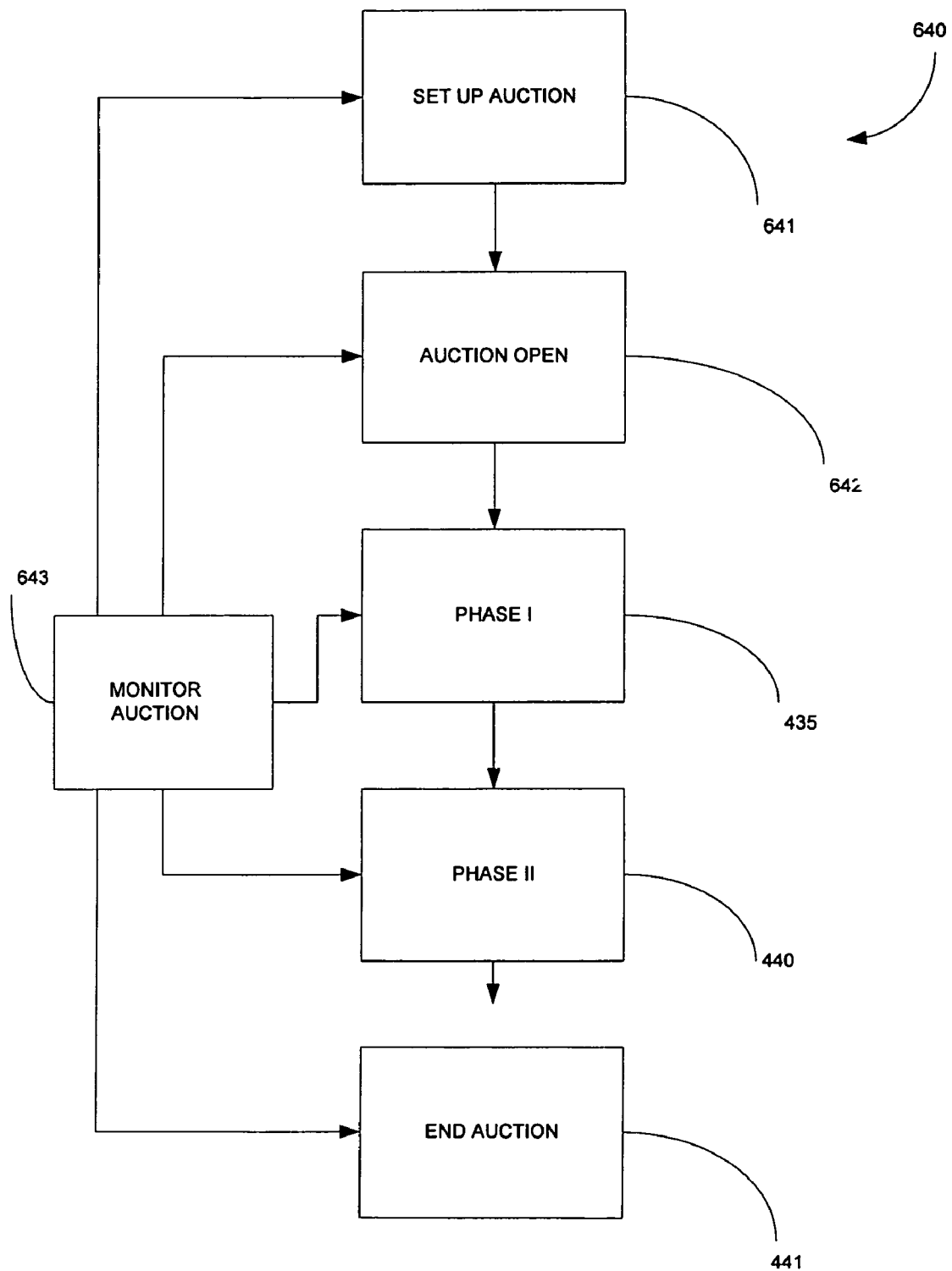
FIG. 13 is a high level chart depicting the auction functions of the present invention.

FIG. 13 is a high level chart depicting the auction functions 640 of the present invention. FIGS. 14-18 show the details of the auction functions summarized in FIG. 13. At 641, the system administrator performs the steps to set up the auction, such as assigning the appropriate governments, and setting schedules or assigning the category, e.g., sponsorship, a committee or a floor vote; or a primary, general election or session level auctions. At 642, the system administrator opens the auction for bidding. At 643, the system administrator monitors the auction during Phase I, the bidding phase at 435 and Phase II, the lobbying phase at 440, until completion of the auction at 441.

Figure 14:
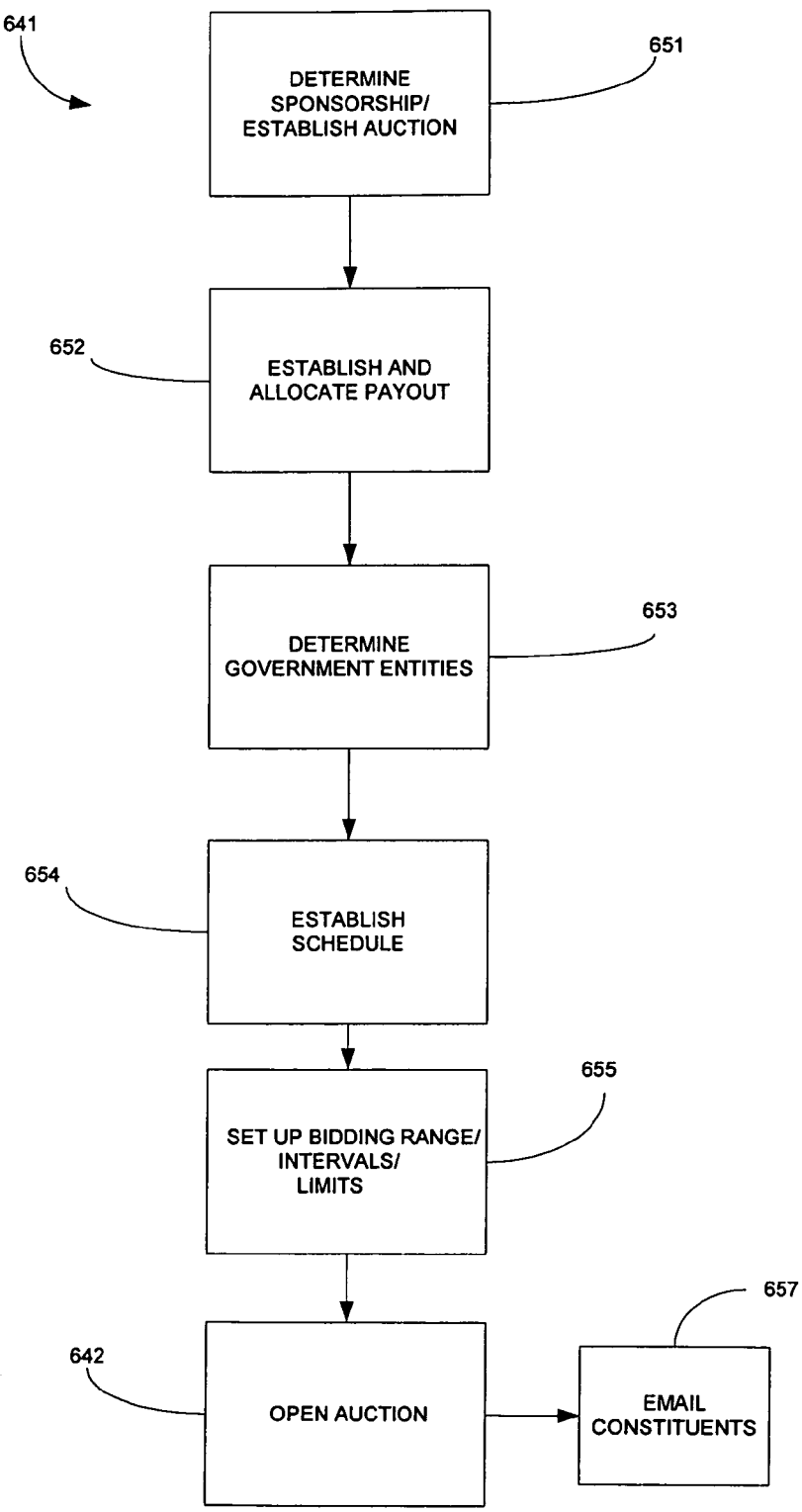
FIGS. 14-18 are charts depicting the individual auction functions of FIG. 8 of the present invention.

FIG. 14 shows the steps necessary for the system administrator to set up auctions 641. At 651, the administrator determines the policy promoter and establishes the auction. The administrator enters the policy name and description, the originator of the policy and/or the legislators who are sponsoring the policy. One type of promoter is a private individual or company, or a special interest group. Another type of promoter is an innovator. A third type of promoter is a legislator who initially sponsored the bill in their house. If the sponsor is a legislator, the auction is flagged as such so that the sponsor (legislator) does not receive any payout. At 652, the administrator establishes and allocates the payout. The administrator determines the total payout and divides the payout into different houses/committees as appropriate. At 653, the administrator selects the appropriate committees, legislatures and governments involved in a policy for an auction. At 654, the administrator establishes the schedule for the auction. Start and stop dates are set for each committee or house for both Phase I and Phase II. The administrator may end phase I of an auction. The administrator will see a preview of the schedule for all legislators and can then create the schedule. This allows the actual time slots for Phase II to be created. The administrator may adjust the start and end dates and times of the schedule. At 655, the administrator sets up high and low bidding ranges, and monetary intervals between bids, and any limitations on amount of reward as required by law. At 642, the administrator opens the auction (specific to legislature and committee) either manually or automatically by a pre-set date. At 657, constituents are notified of the open auction and the schedule.

Figure 15:
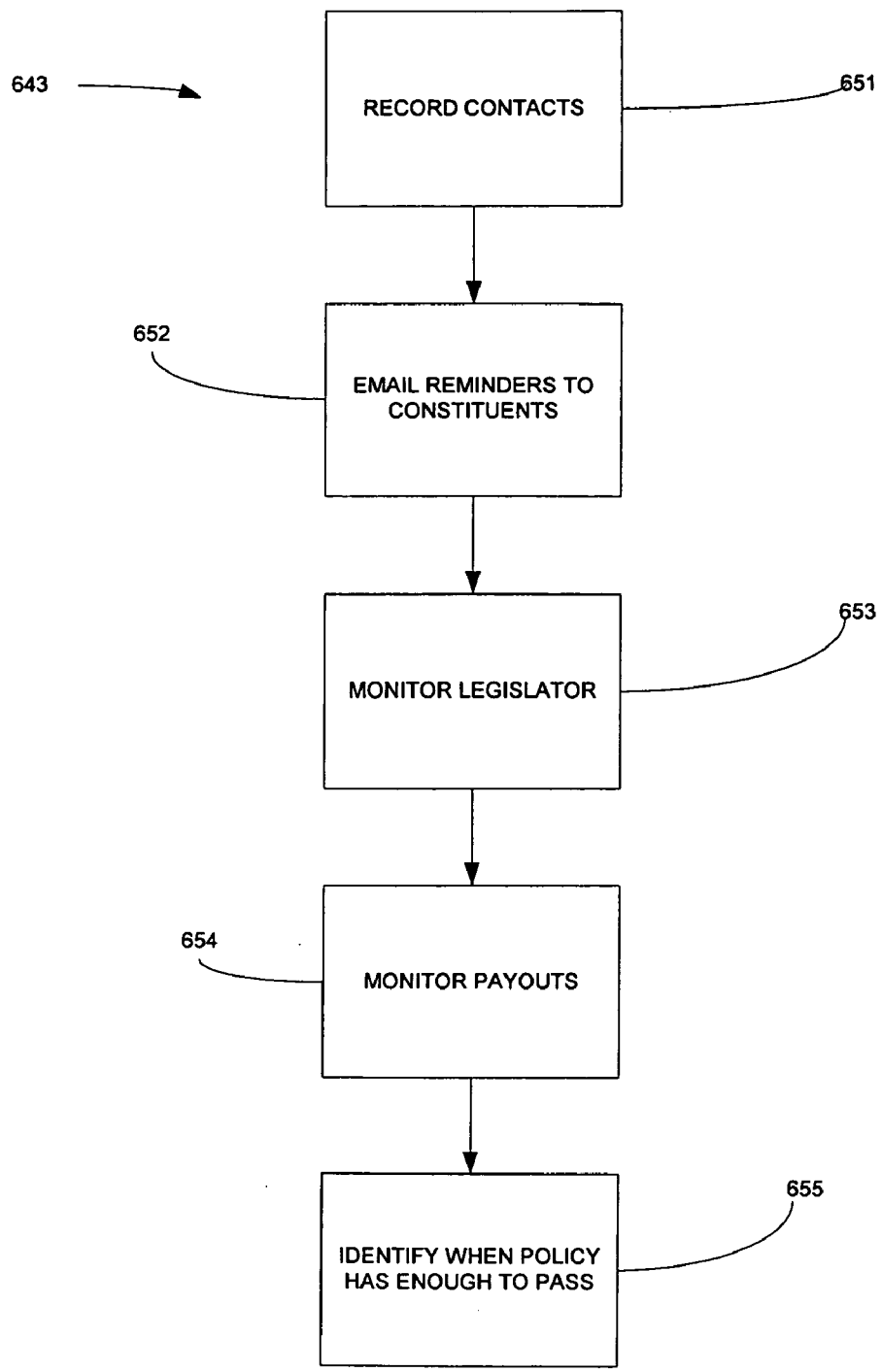

FIG. 15 shows the steps necessary for the system administrator to monitor the progress of the auction 643. At 651, the administrator records initial contacts of legislators and results for the policy. At 652, the administrator emails reminder notices to the constituents involved in a particular auction. These reminders include schedules and reminders that the constituent's lobbying time is due. Emails are sent to all participants reminding them of their scheduled times the day or several days before their scheduled time. A reminder email is also sent to the administrator when the Phase I is scheduled to end. At 653, the administrator monitors the legislator based on the schedule for the purpose of determining the winner of the auction. The system determines which constituent convinced a legislator based on the timing of the individual constituent's lobbying and the time the legislator clicked "I Support". At 654, the administrator monitors the payouts and applies the payout formula. The winners would include those constituents, whose legislators voted for the legislation and who were in the low bidding pools for their legislator, who were in a pool that ranked amongst the total bids of pools at or below the same number as the number of legislators necessary to pass the bill in the house or committee with a committee or house auction, or the same number necessary to obtain the necessary sponsors for a sponsorship auction. If a constituent is lobbying their legislator, when their legislator contacts the "I Support" button, or is the last constituent to lobby their legislator at the end of the auction, that constituent will be in the pool. If the available funds from the savings resulting from the supported legislation are greater than the total of winning bids from the sponsorship, committee and house auctions for all houses in a legislature, and if there were recorded votes, then all of the winners receive their bids. If the total of winning bids exceeds available funds, then the program will make a series of calculations until it solves the problem to the best fit. The program will rank all of the winning bidders from the sponsorship, committee and house auctions for all houses in a legislature. It will identify the lowest winning bid in the auction and will identify that bid as b1. For this round, n will equal 1 and n will equal the number of the round. It will identify the total number of bids in the auction and will identify that number as z. It subtracts n or 1 from z, (z−n), and multiply the result by $b_1$, $[(z-n)b_1]$ or $[(z-n)b_n]$, to obtained the total of the adjusted bids. It will add the total of the adjusted bids to the to $b_1$ or $b_n$, $\{[(z-n) b_1], +b_1\}$ or $\{[(z-n) b_n], +b_n\}$ and compare this sum to the total funds available, to determine if the available funds are adequate. If $[(z-1)b_1]+b_1$ or $[(z-n)b_n]+b_n$ is greater than the available funds ($\{[(z-1) b1], +b_1\}>A$) or ($\{[(z-n)b_n], +b_n\}>A$), then the program will divide the amount available equally amongst the bidders (A/z=winnings). If $[(z-1)b_1]$, $+b_1$ is less than the available funds ($\{[(z-1)b_1], +b_1\}<A$), then the program will move on the next round and the next highest bid will be called $b_n$, the lowest bid will be $b_1$, and n will be 2. It subtracts n or 2 from z, (z−n), and multiply the result by $b_2$, $[(z-2)b_2]$, to obtained the total of the total of the adjusted bids. It will add the total of the adjusted bids to the to b2 and b1 ($b_2[(z-2)b_2]$, $+b_2+b_1$) to obtain the total funds needs in this round and compare this sum to the total funds available, to determine if the available funds are adequate. If $[(z-2) b_2]$, $+b_2+b_1$ is greater than the available funds ($\{[(z-2)b_2], +b_2+b_1\}>A$), then the program will subtract b1 from the available funds and divide the remaining available funds, $(A-b_1)$, by z−1, $((A-b_1)/(z-1))$. It will give money equal to b1 to the lowest winning bidder and $[(A-b_1)/(z-1)]$ to the remaining higher bidders. If ($[(z-2)b_2]$, $+b_2+b_1$) is less than the available funds ($\{[(z-2)b_2], +b_2+b_1\}<A$), the program will go to the next round and repeat this process until ($\{[(z-n) b_n], +b_n+\ldots+b_1\}>A$), it will then give the lowest bidders from ($b_{n-1}$ to $b_1$) their bids, and will divide the remaining amount evenly amongst the remaining bidders $[A-(b_{(n-1)}+\ldots+b_1)]/[z-(n-1)]$. The system compares the lowest bid to the amount available (A). At 655, the administrator identifies when the policy has enough support to pass.

Figure 16:
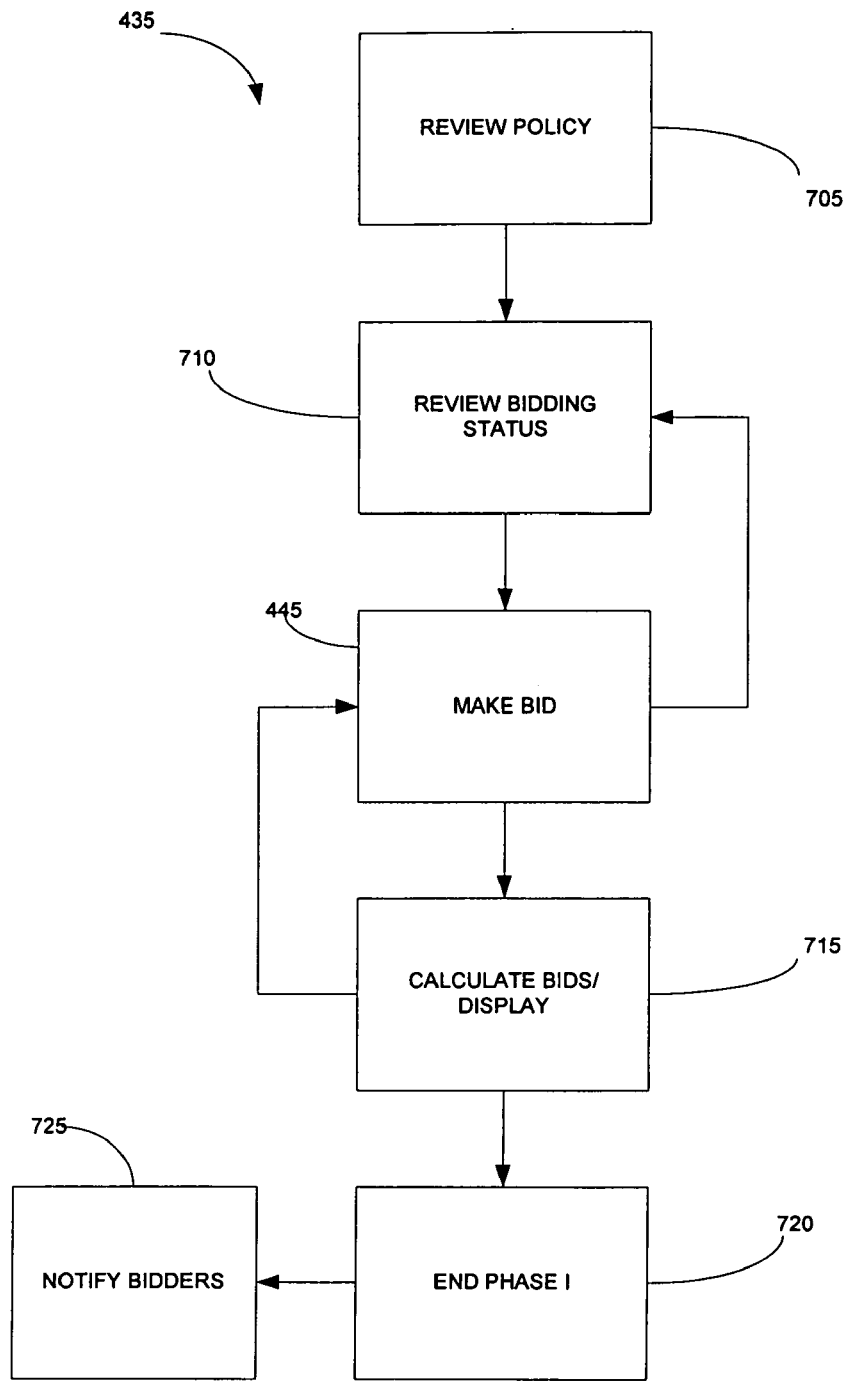

FIG. 16 shows the steps necessary for Phase I, the bidding phase, of an auction 435. At 705, the constituent reviews the active policy for which an auction will take place and for which he or she has registered to participate. At 710, the constituent reviews the status of realtime active bidding activity by viewing the Phase I graph. As bids are made and registered dynamically, the status of the bidding activity changes all the time. Bids may represent outright payments to constituents or payments per year to the participating constituents until the law is rescinded. At 445, the constituent makes a bid and then may return to 435 to review the bidding status. The system determines the lowest total bids of constituents to successfully pass the legislation. To calculate the minimum number of lowest bidding constituents, within pools, needed to pass the legislation, the system first sorts the constituents, who were participating and bidding in the auction, by their legislators (or candidates in the primary and general election auctions). The system then ranks the bids of the constituents for each legislator (or candidate in the primary and general election auctions). The system identifies the rank of the viewing bidder. The system sums the bids of the viewing bidder with all lower bidders for the viewing bidder's legislator. The system then identifies bidders of similar rank to the viewing bidder and sums their bids with the bids of their respective lower ranking bidders. The system ranks the sums and displays the columns of the bids of the constituent of each legislator in the order of the ranked sums. Bids of the viewing bidder are displayed with one color and equally ranked bidders are displayed with another color. Higher ranked bids have one color and lower ranked bids have another. If there was no bidding constituent of similar rank to the viewing constituent, the viewing bidder's bid is shown alone.

The constituent may repeat steps 435 and 445 as often as he or she wishes until Phase I is complete. The highest and lowest bids for the constituent's legislator, as well as the constituent's last bid, are shown. A bid-up button gives the constituent the next highest available bid and a bid-down button gives the constituent the next lowest available bid, either for a legislator's constituents or for the constituents in a legislature. This feature forces all bids to be unique. Bids may be rejected if over certain pre-defined limits. A zoom feature is also provided. The constituent can continue to view the auction and place additional bids until the bidding phase is closed by the administrator. At 715, the bids are calculated and displayed. At 720, Phase I is ended and bidders are notified at 725.

Figure 17:
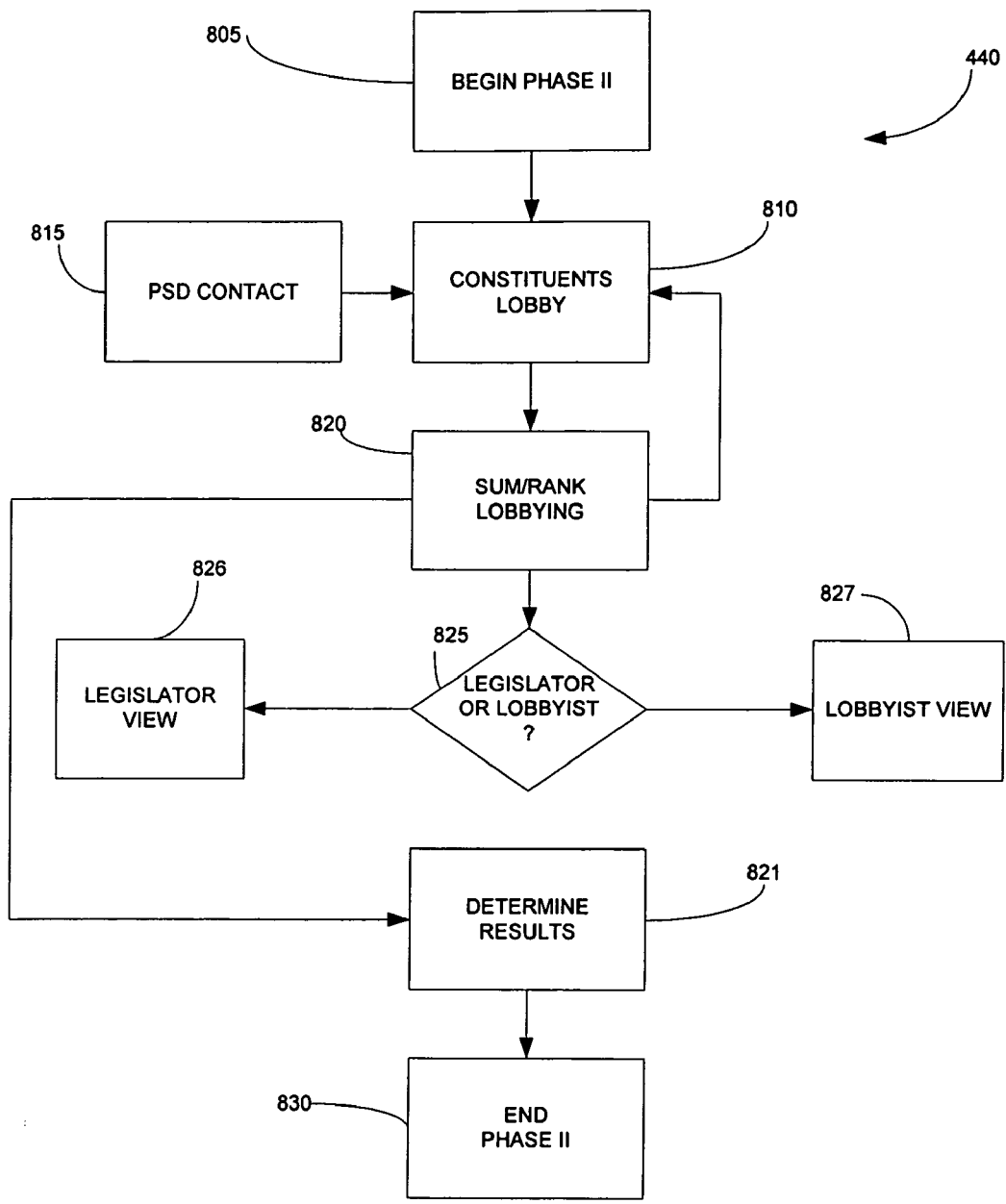

FIG. 17 shows the steps necessary for Phase II, the lobbying phase, of an auction 440. The Phase II process begins at 805 after the conclusion of Phase I, the bidding phase. At 810, operators contact the three lowest bidding constituents for each legislator. The responding constituent with the lowest bid for each legislator lobbies their legislator at 815, who will probably reject the constituent and the constituent drops into the pool of lowest bidding constituents for their legislator. This process continues for each legislator until 1) the legislator has no more constituents in the auction, 2) the legislator supports the support button, or 3) the program administrator ends the auction before the vote. As the various constituent lobbyists are lobbying, being rejected and falling into pools, the size of the pools are summed, ranked and displayed in various bar graphs at 820. At 825, the system determines whether the viewer has logged in as a legislator or a lobbyist. If the viewer is a legislator, the legislator view of the lobbying graph is present to the viewer at 826, otherwise the lobbyist view is presented to the viewer at 827.] If the legislator selects the "I Support" button, the lobbying stops and a graph will be displayed that shows the final results of the lobbying effort at 821. Phase II ends at 830.

Figure 18:
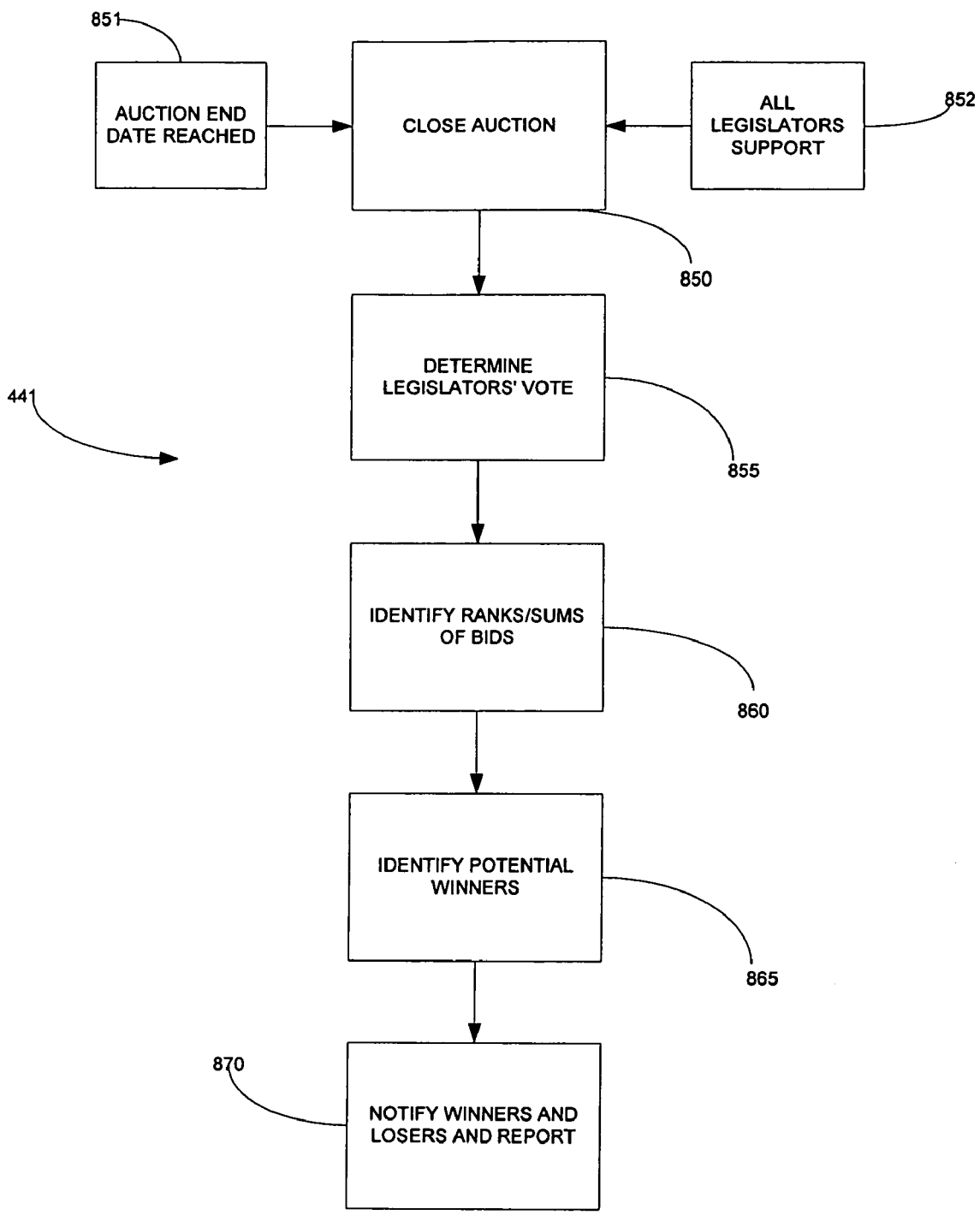

FIG. 18 shows the steps necessary for closing an auction 441. An auction is closed at the end of Phase II at 850, when the auction end date is reached at 851 and/or all legislators have supported the policy at 852. At 855, if the legislation passes and if the votes of the legislators are public information, each individual legislator's vote is recorded and the votes are summed at 865. At 860, the system identifies the ranked sums of bids of pooled rejected constituents, who lobbied for each legislator who voted for the legislation. After the total number of legislators who voted are summed; the total number or percentage of legislators necessary to reach a legal majority are identified, and the program determines the minimum number of legislators necessary to reach a legal majority. The program ranks the sum of the pools of the legislators who voted for the bill. The constituents in the pool with the same or lesser rank as the minimum number of legislators necessary to reach a legal majority will win their bids, if the savings are great enough to cover all bids. If the funds are not sufficient to cover all bids, the constituents in the pool receive a calculated remaining amount at the higher possible bid. For example, if 100 U.S. Senators voted on a bill and 54 voted to support the bill, only the constituents whose bids were in the 51 lowest sums of pools of lobbying constituents would win. At 870, the winners and losers are contacted and the results are reported.

Figure 19:
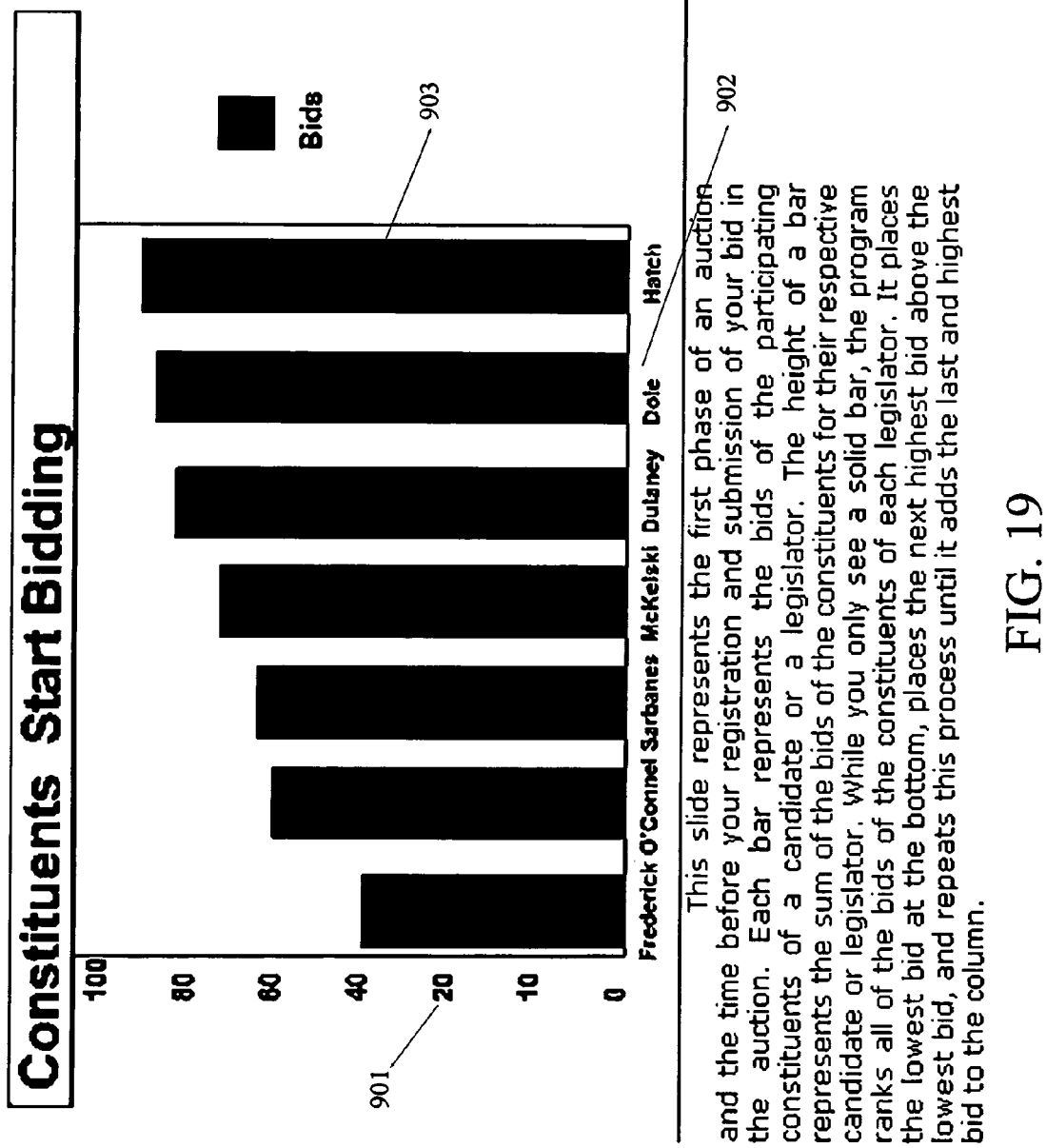

FIGS. 19-29 are exemplary bar graph displays from the online demonstration of the present invention. FIG. 19 shows a bar graph at the beginning of Phase I, the auction phase, where constituents start bidding. This graph view represents the first phase of an auction at the time before a constituent lobbyist's registration and submission of a bid in the auction. The Y axis 901 shows the cumulative bids in dollars and the X axis 902 shows the individual legislators. Each bar 903 represents the bids of the participating constituents of a candidate or legislator. The height of a bar represents the sum of the bids of the constituents for their respective candidate or legislator. The lowest bid is placed at the bottom, the next highest bid above the lowest bid, and this process is repeated until the last and highest bid is added to the column.

FIG. 20 shows a constituent's view of a bar graph from Phase I, the bidding phase, after he or she has registered, chosen the auction, and submitted a first (or later) bid in the auction. Again, each bar represents the participating constituents of a candidate or a legislator and the height of a bar represents the sum of the ranked bids of the constituent for the candidate or legislator represented by that bar. The black portion of the fourth bar 905 represents the viewer's bid and its position represents the viewing constituent's rank for his or her legislator. As a result, the green portion of the bar 906 represents the sum of the constituents, who have higher bids than the viewing constituent's bid, and the blue portion of the bar 906 represents the sum of the constituents, who have lower bids than the viewing constituent's bid for his or her candidate or legislator. The white portion of the bars 907 for the other legislators or candidates represent the quantity of the bid for the bids of the same rank as the viewing constituent's bid for the legislator of that bar. The system ranks the bars according to the sum of the bids of the bidders represented by the white areas 907 and blue areas 906.

Figure 21:
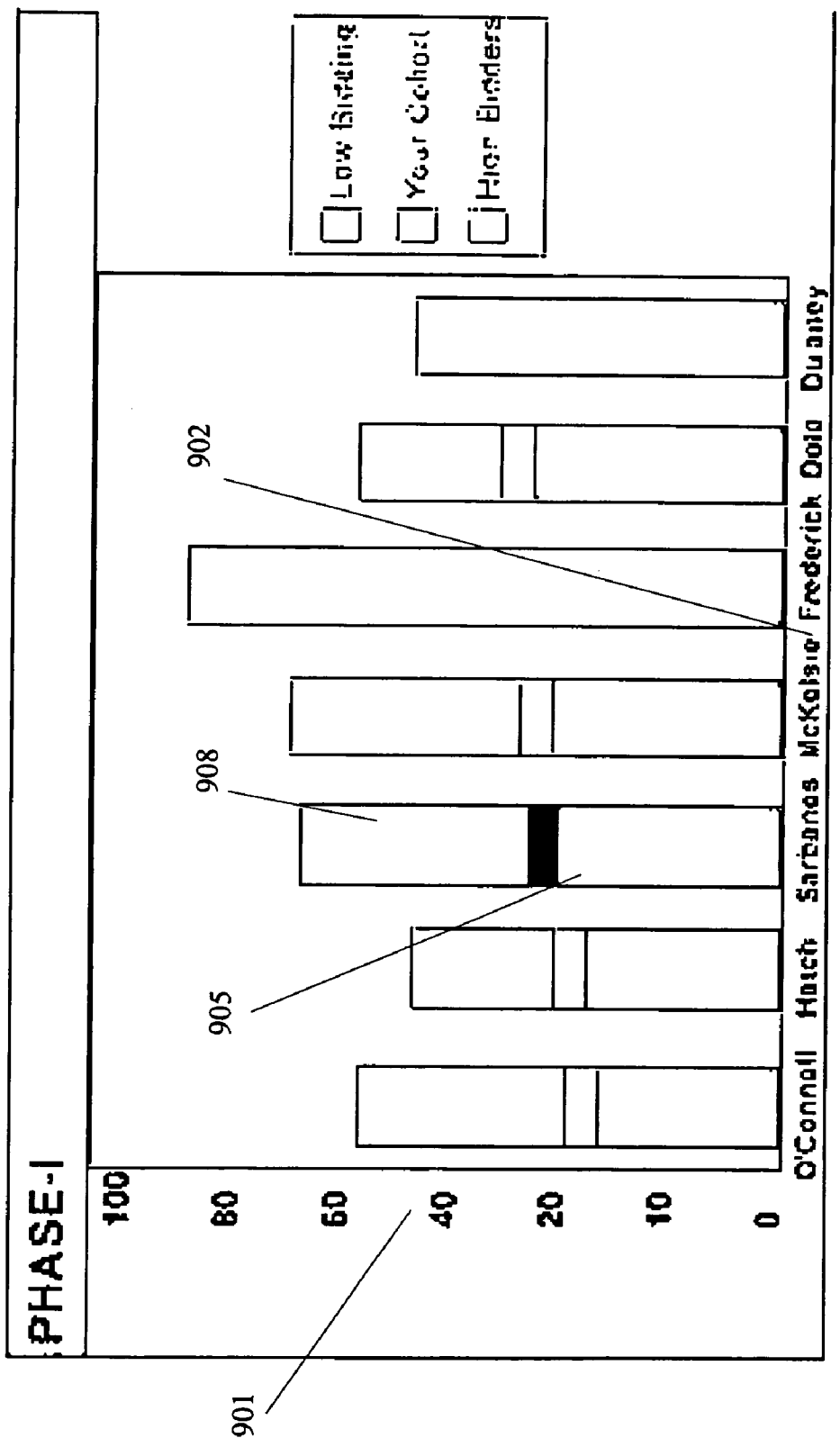

FIG. 21 shows a constituent's view of a bar graph from Phase I, the bidding phase, in which the viewing constituent has bid a little lower than the bid 905 in FIG. 20. As a result, the viewing constituent's rank in his or her column decreases and the rank of the column shifts to the left. The viewing constituent may bid as many times as he or she wishes until the close of the first phase of the auction, and each bid will generate an updated graph showing the viewing constituent's relative placement in the bidding pool.

Figure 22:
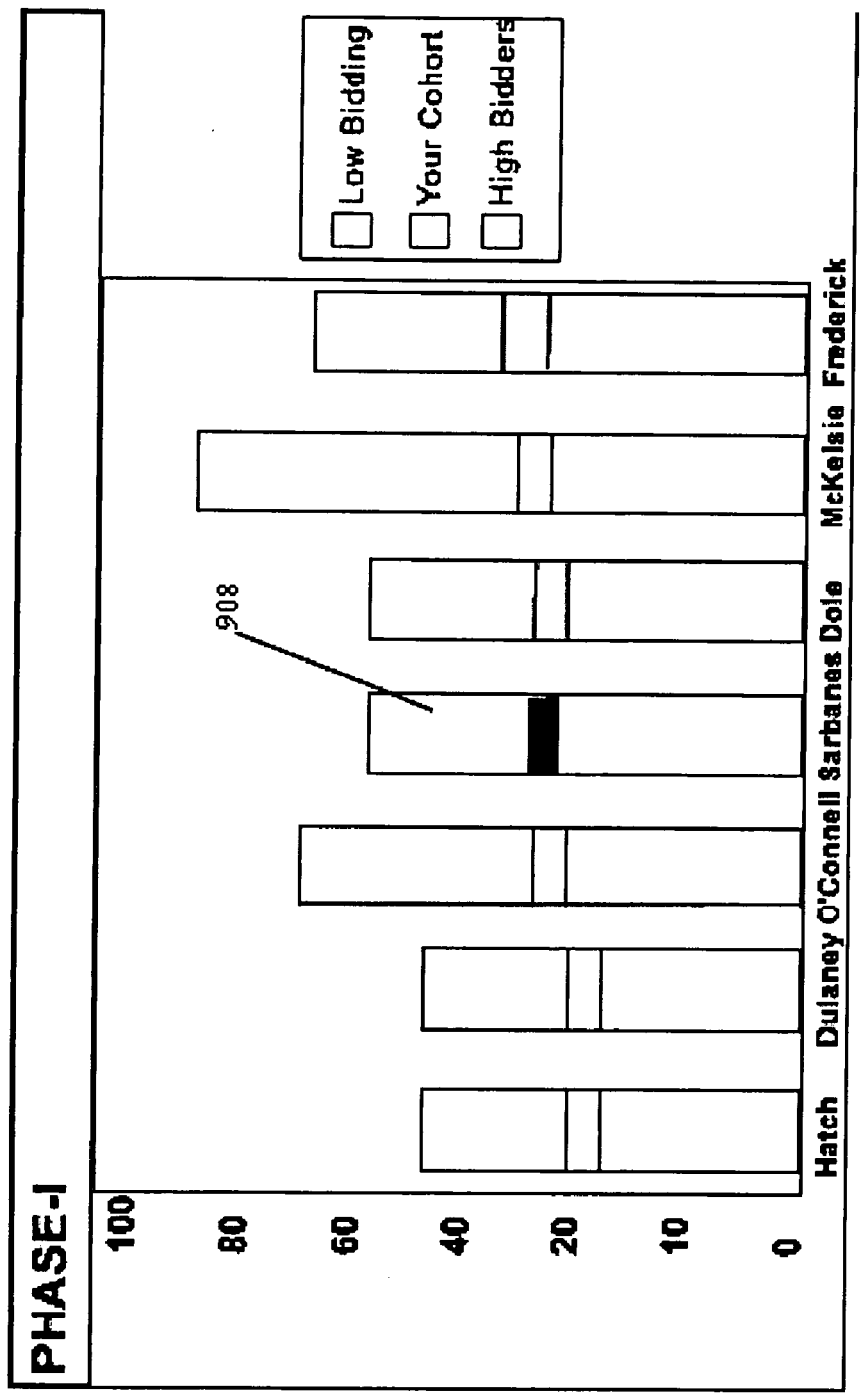

FIG. 22 shows a constituent's view of a bar graph from Phase I, the bidding phase, in which a competitor of another legislator bid down a little. As a result, the rank of the viewing constituent's column 908 shifts to the right. The first phase should close with enough time to run the second phase of the auction before a legislative vote. When Phase I closes, all bids are frozen.

Figure 23:
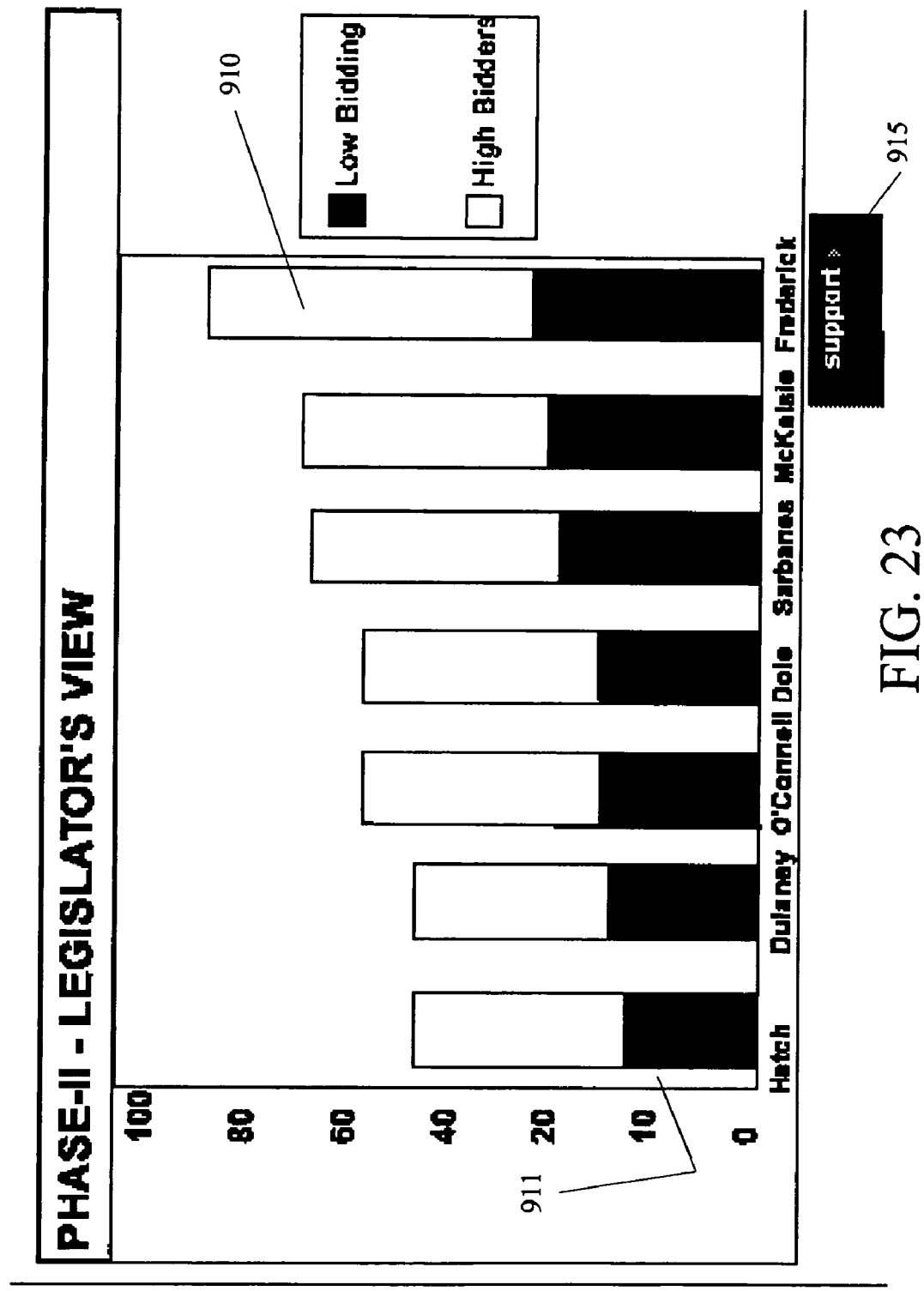

FIG. 23 shows a legislator's view of the second phase of the auction. The green areas 910 represent constituents, who are waiting to lobby and the blue area 911 represents constituents, who are lobbying or who have lobbied. During this phase, lowest bidding constituents (or other serially higher constituents, if the lowest bidding constituent(s) is(are) not available) in the green area 910 of each bar will serially lobby their legislator for legislation by phone, encouraging their legislator to click on the "Support" link 915 at the bottom of his or her screen in the second phase of auction. If the legislator clicks the "Support" button 915, the auction will stop for lobbying constituents and only the constituents represented by the blue areas 911 have a possibility of winning the auction. If a constituent lobbyist fails to gain the support of the legislator within a limited time period, that constituent drops from a green area 910 to a blue area 911 and the new lowest constituent will lobby. This process repeats for the participating constituents of a legislator until 1) the legislator clicks the support button 915, 2) all of the participating constituents for the legislator have lobbied, or 3) the auction ends due to time limitations.

Figure 24:
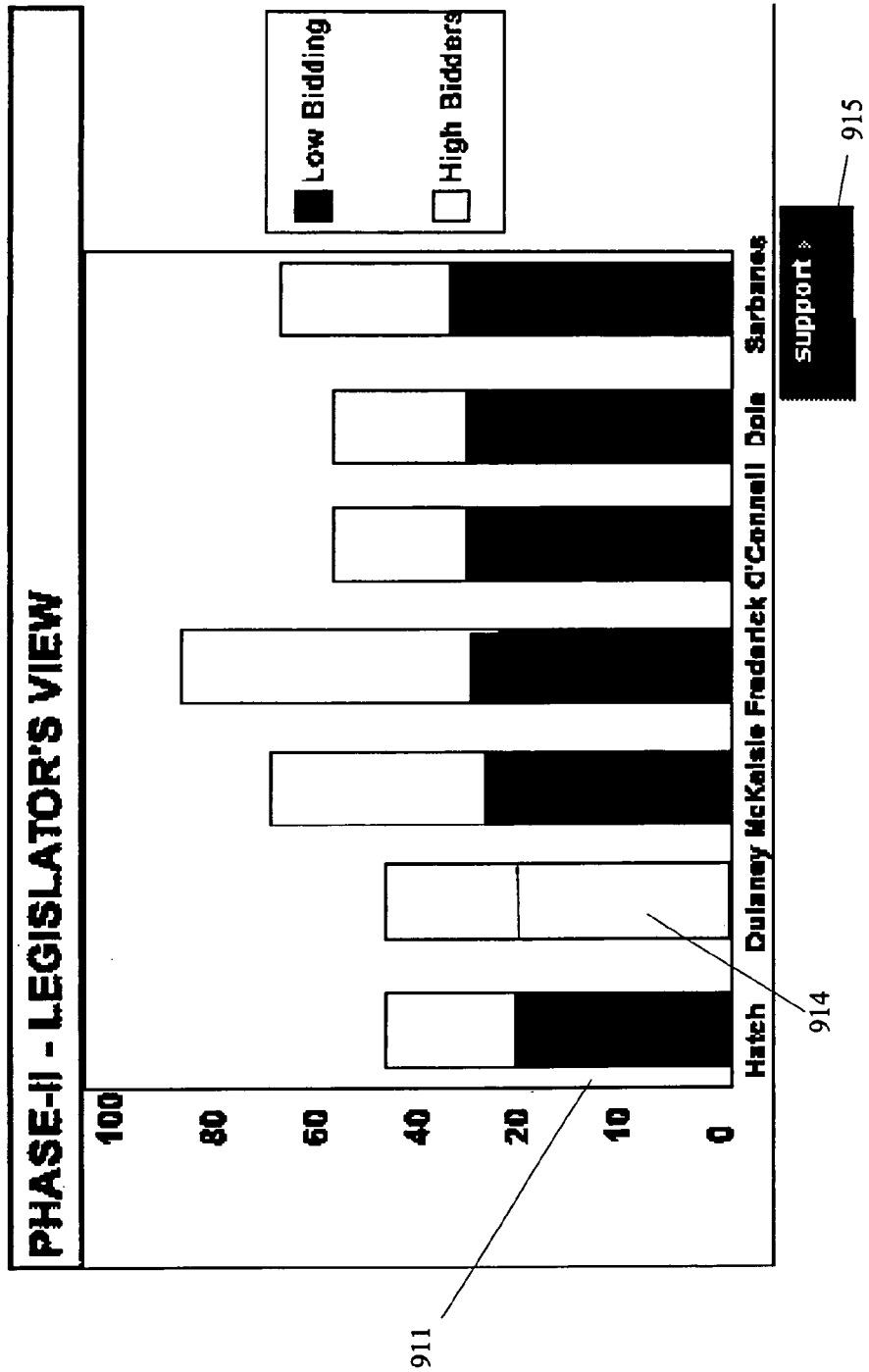

FIG. 24 is a Phase II view that shows that there has been more lobbying and more constituents have been moved to the blue area 911. In addition, the change to yellow in the second column 914 indicates that the legislator for the second bar has clicked the "Support" button 915 and stopped the auction for his or her constituents on his or her bar.

Figure 25:
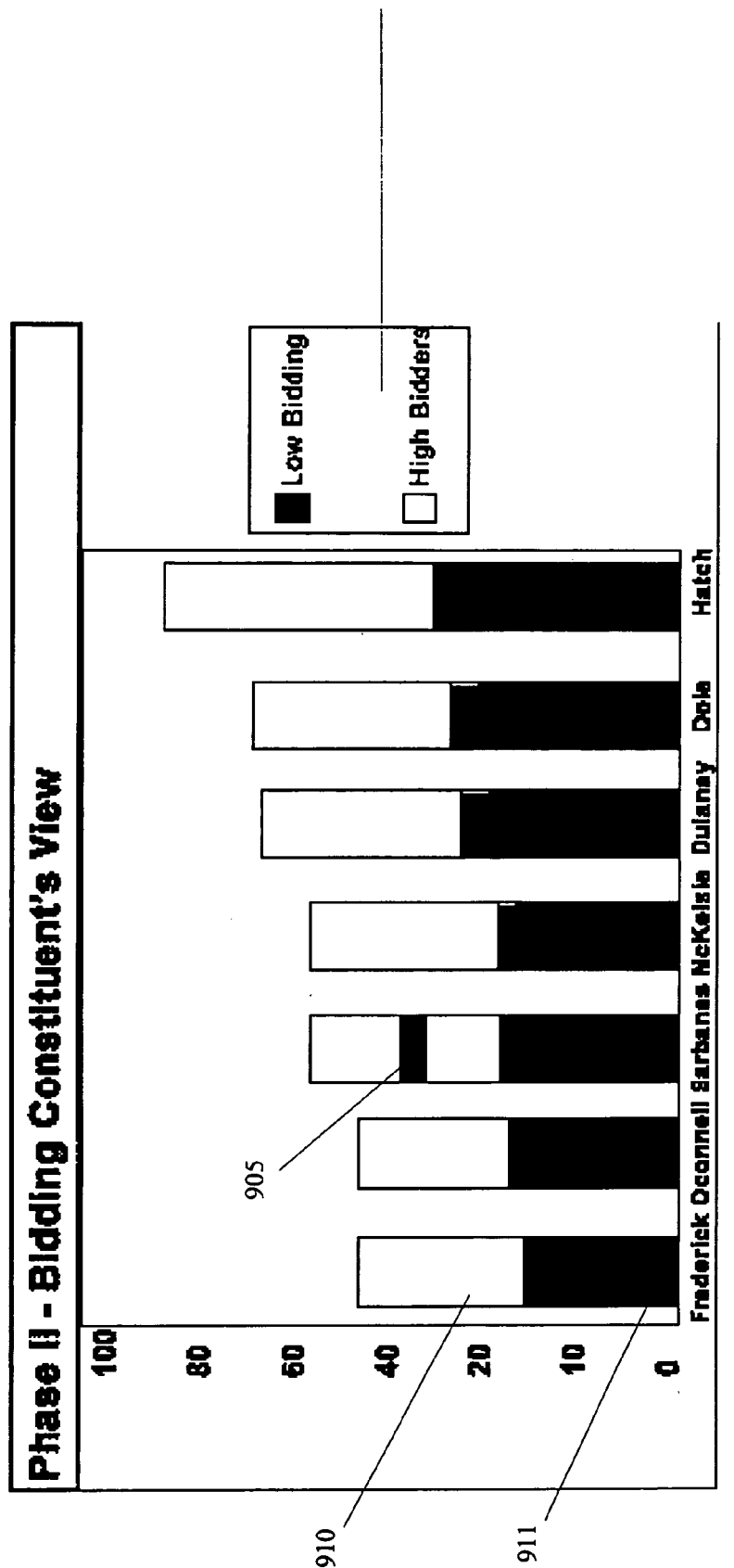

FIG. 25 shows a constituent's view of the second phase of the auction. At this time, the viewing constituent has not lobbied his or her legislator, because the black area 905 is in the green area 910. If your legislator contacted the "Support" button now, the viewing constituent would receive nothing from this auction.

Figure 26:
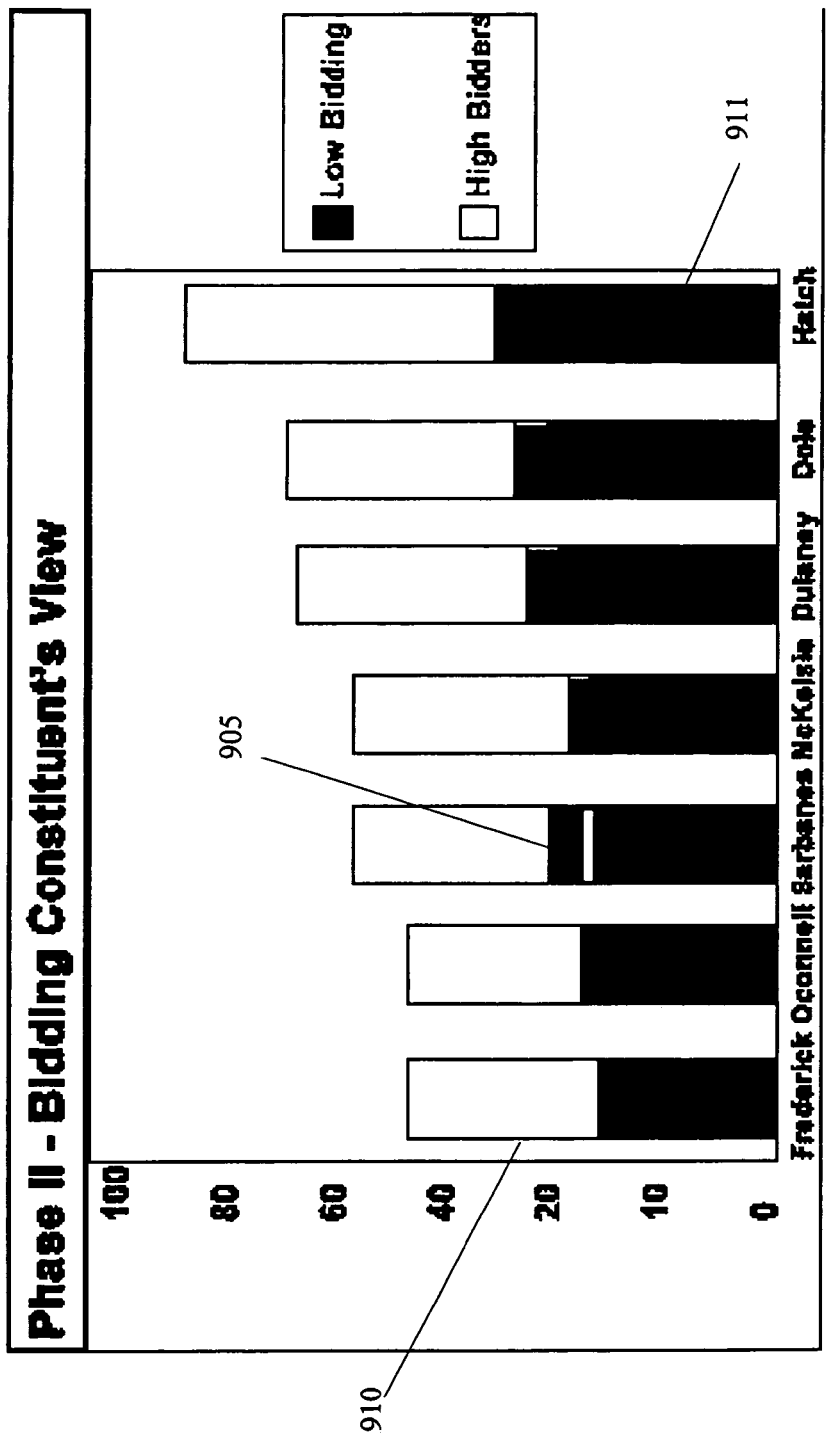

FIG. 26 shows a bidding constituent's view in Phase II, and is similar to FIG. 25, except that it shows that it is the viewing constituent's turn to lobby, because his or her black area 905 is between the green area 910 and blue area 911, indicating that the viewing constituent is the lowest of the bidding constituents who has not yet lobbied unsuccessfully. If the viewing constituent's legislator selects the "Support" button, while the viewing constituent is lobbying, he or she might be among the winners FIG. 27 shows another possible viewing constituent view of the second phase of the auction at a later time than FIG. 26. At this time, the viewing constituent has lobbied and failed to gain the support of the legislator and has become part of the blue area 911 of the bar as shown by the black portion of the bar 905. Other higher bidders for the viewing constituent's legislator have also failed and are represented by the blue area 920 above your black space 905. In addition, there is a change in color from blue to yellow 914 for the second legislator, indicating that the legislator for that bar clicked on his or her 'Support' button.

Figure 28:
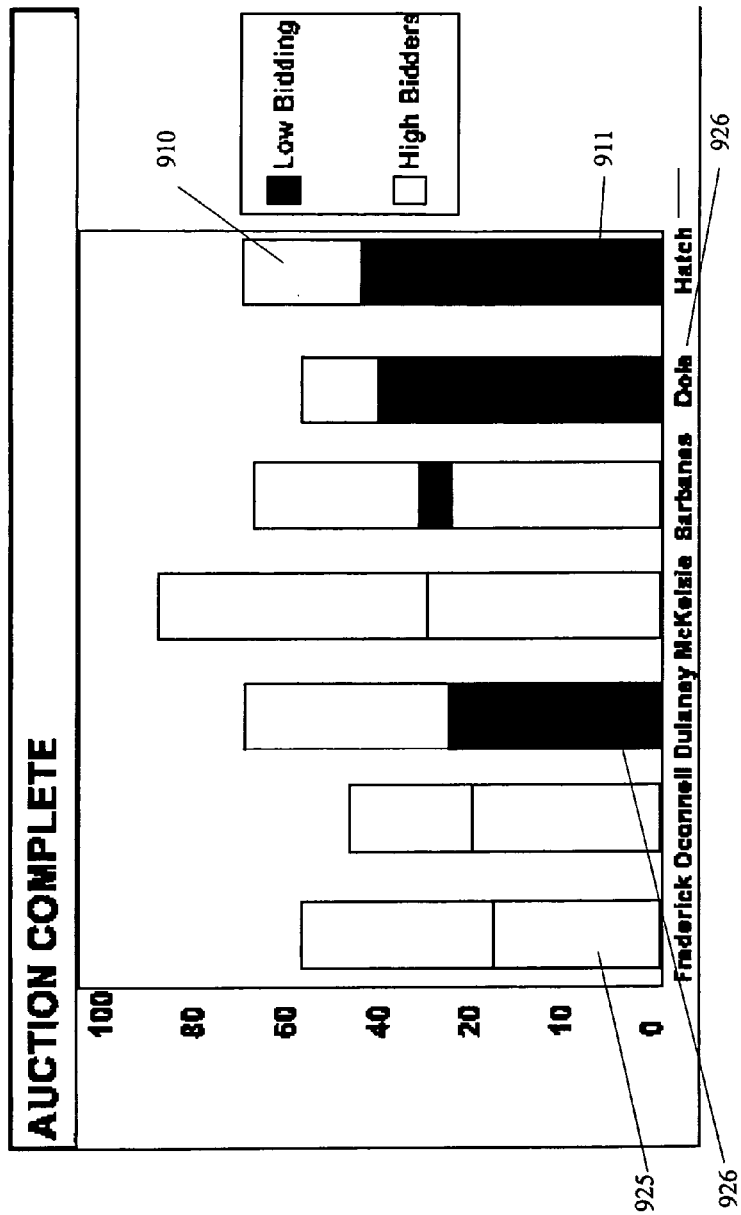

FIG. 28 shows a constituent's view at the end of the auction. The gray lines 925 represent the bidders, who will win their bids or a portion of their bids after the executive branch supports it and after the exchange and the government entity agree on an estimate of the savings for consumers according to the system of appreciative negotiation or punitive arbitration. The third bar 926 has no gray area, because the legislator for that line did not vote for the legislation. The sixth and seventh bars have no gray 926, because their constituents bid too high or because their legislators failed to vote for the legislation. As a result, the constituents represented by the green area 910 or blue area 911 get nothing. The black area 905 represents the viewing constituent's bid, who is among the potential winners, once the above conditions are met.

Figure 29:
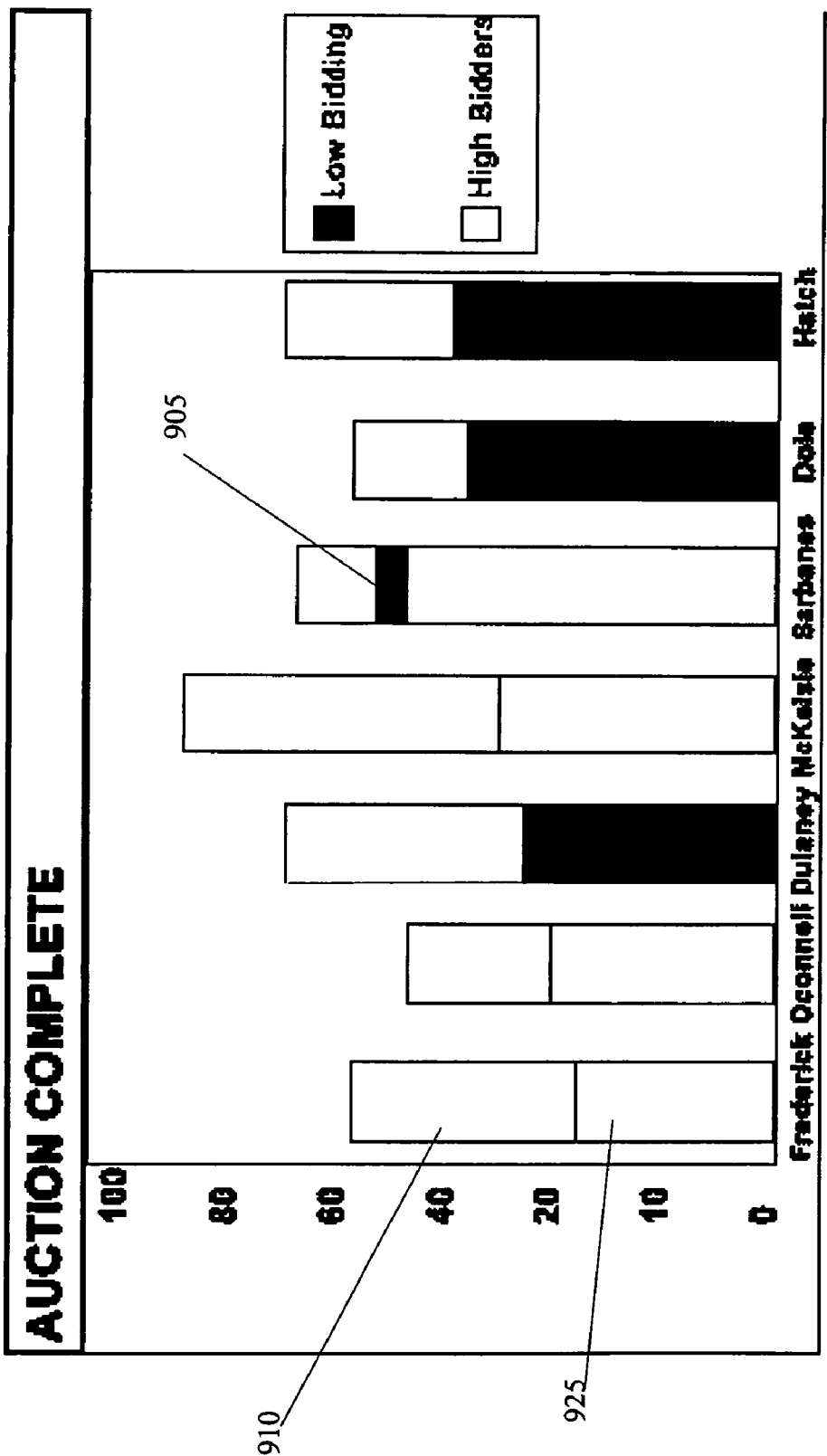

FIG. 29 shows a constituent's view at the end of the auction, and is like FIG. 28, except that the viewing constituent's bid was too high and he or she will not be among the winners.

Figure 30:
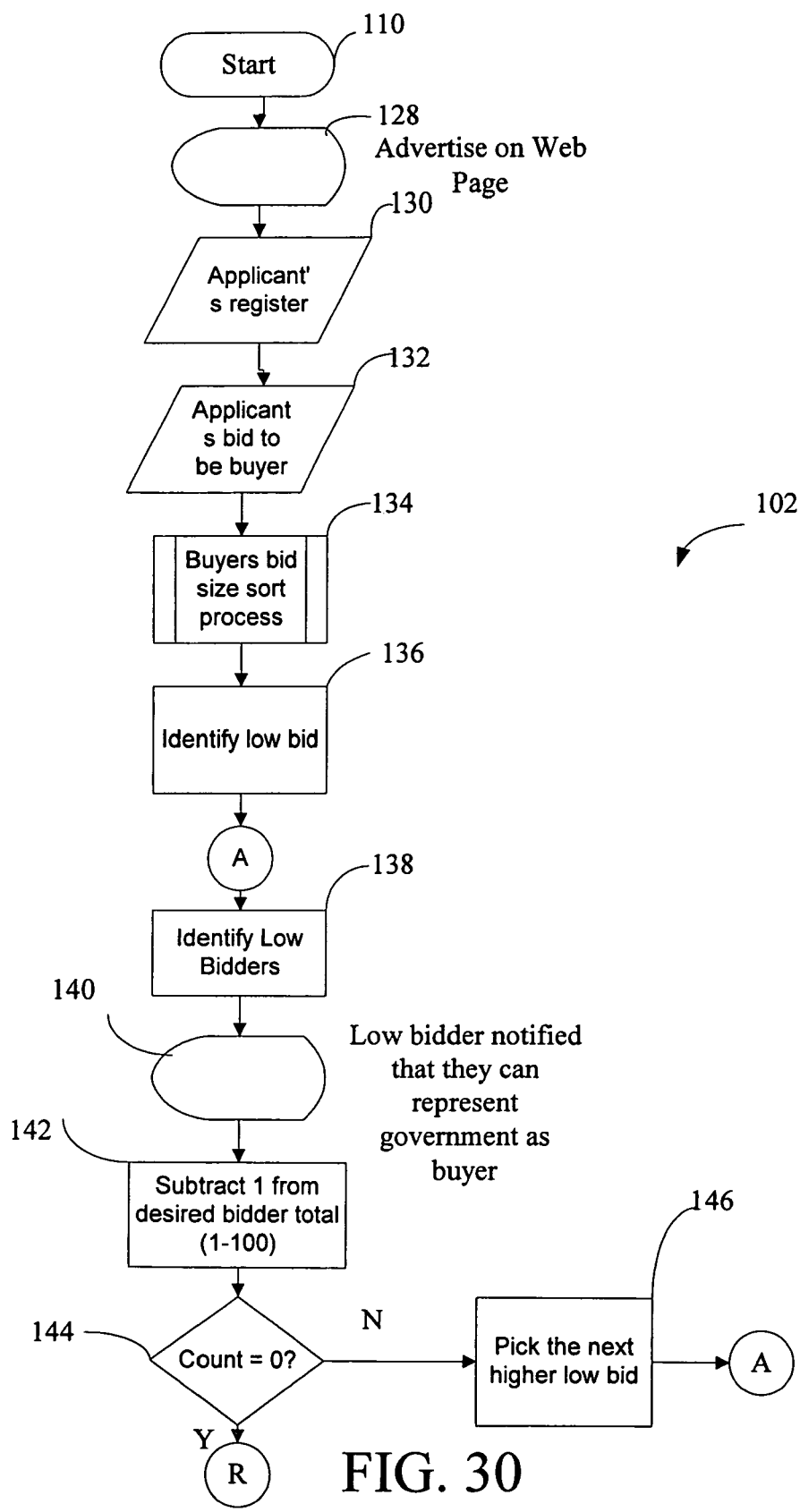
FIGS. 30-37 are flow diagrams for some program source code of the present invention.

FIGS. 30 through 56 are flow diagrams that illustrate functions of the source code in the present invention. Referring to FIG. 30, applicants encounter the buyer auction method 102 at the start of the front end client in step 126. The applicants advertise in step 128, register in step 130, and bid to be the buyer in the innovator auction in step 132. The bids of the buyers are sorted in step 134, the lowest bid is identified in step 136, and the lowest bidder in step 138. The low bidder is notified in step 140 that entry into the innovator auction has been granted. This process is repeated in steps 142, 144, and 146 until the desired number of buyers gain entry into the innovator auction at step 168. The lowest bidding buyers up to the desired number (e.g., 2 to 100) may be selected through a counting process.

FIGS. 31 through 37 chart the innovator auction method 100, that innovators gain entry to from the entry interval negotiation method 101, and buyers from the buyer auction method 102 as seen in FIG. 30.

Figure 31:
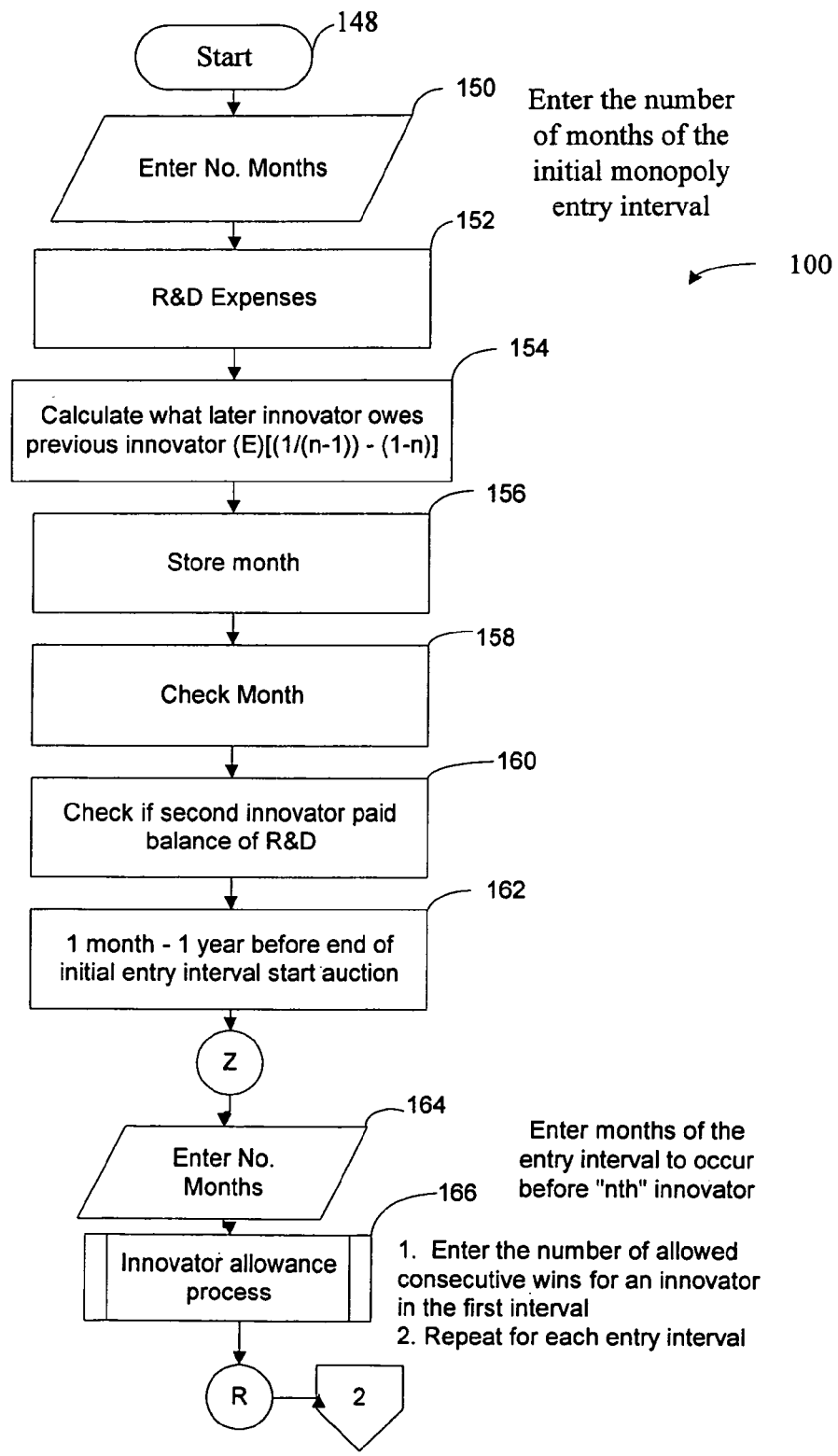

Specifically, as shown in FIG. 31, the innovator auction method 100 is initiated in step 148 by an exchange employee (an employee of the company running the program) prior to the entry of innovators or buyers. The initial entry interval is entered in step 150 and research and development expenses for the interval are calculated in step 152. Later entering innovators owe earlier innovators a portion of those expenses which are calculated in step 154. The month is stored in step 156 and checked in step 158. The later innovator's payment is verified in step 160, and the process pauses until one month to one year before the end of the entry interval auction method in step 162. In step 164 the entry interval is entered and in step 166, an innovator allowance process is conducted.

Figure 32:
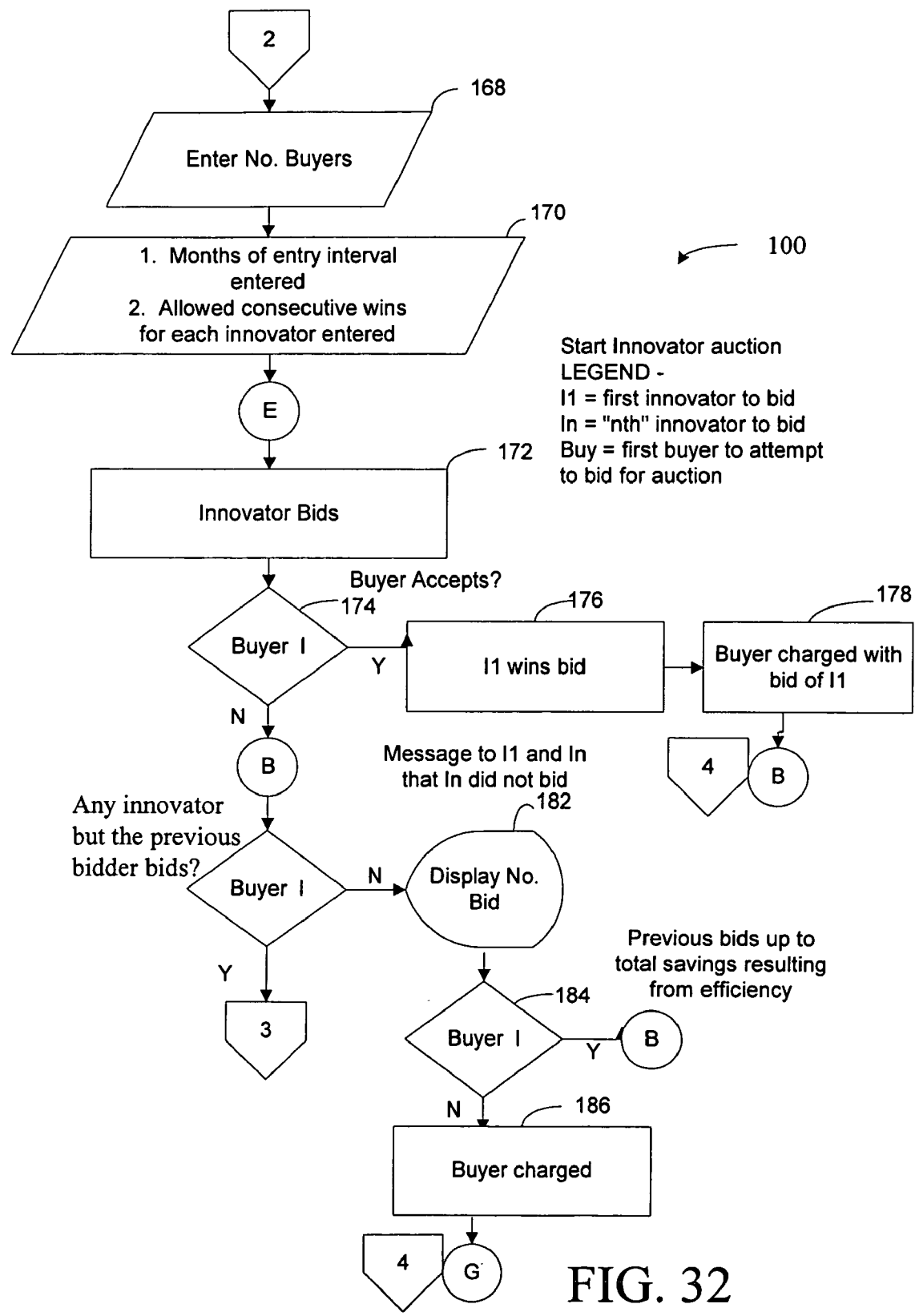
Figure 33:
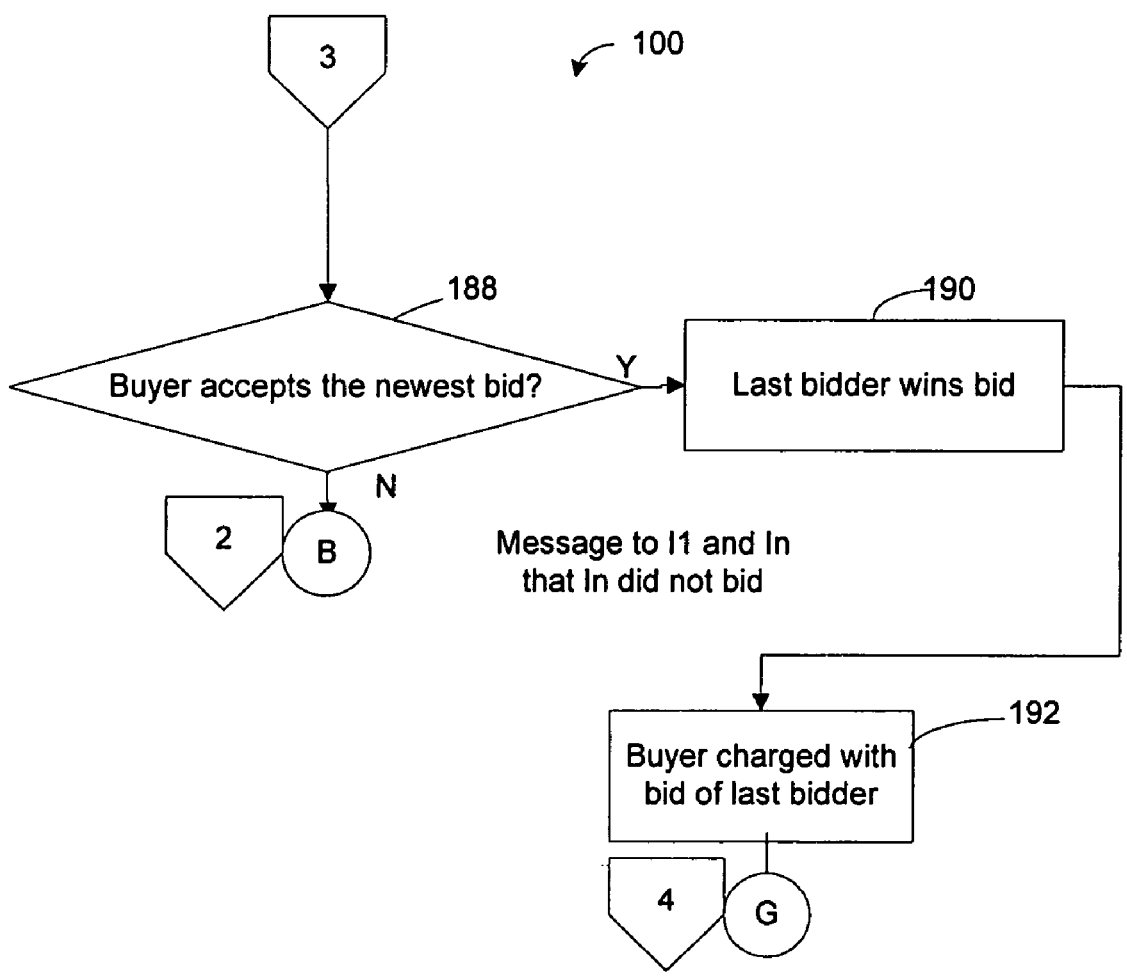

In FIG. 32, the preselected number of buyers is entered in step 168, and the entry interval and allowed consecutive winning bids is entered before the next new innovator would enter in step 170. The heart of the innovator auction method 100 then begins when the first innovator bids in step 172. If the first buyer accepts this bid in step 174, said innovator wins in step 176, and said buyer is charged in step 178 before moving forward in the method to step 194. If said first buyer does not accept, and if no other bid is found in step 180, the resultant no bid state is published in step 182. If after the no bid state the previous bids do not exceed the total savings of the policy in step 184, the buyer is charged with the total savings in step 186 before moving forward to step 194. Referring now to FIG. 33, if there is another bid in step 180, and if the buyers accept this new bid in step 188, the last bidder wins in step 190, and the buyer is charged with the bid of the last bidder in step 192.

Figure 34:
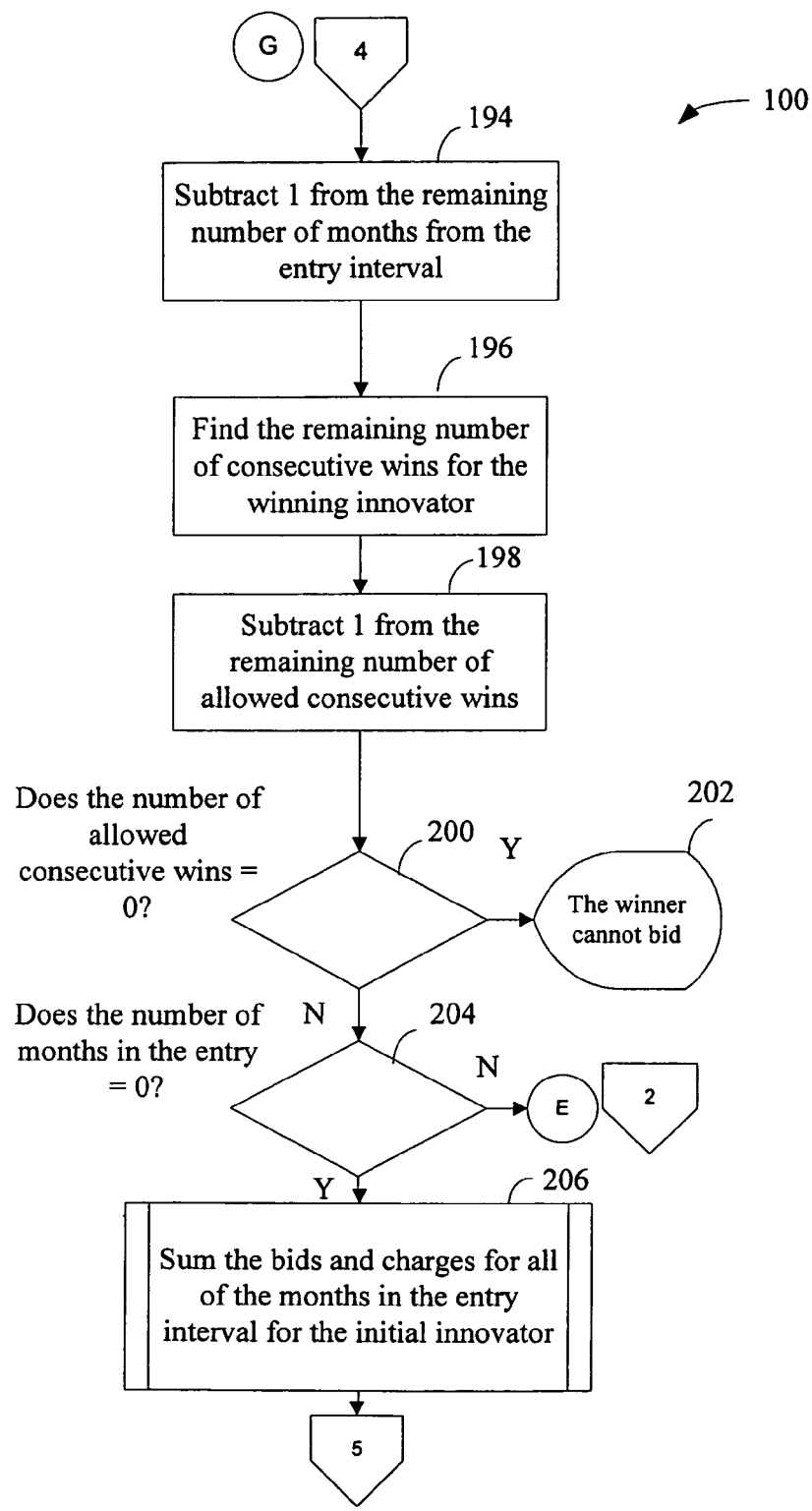

In FIG. 34, after the winning buyer is charged with the bid of the winning bidder, one time period (e.g., a month) is subtracted from the entry interval in step 194, and the remaining number of consecutive wins for the winning innovator is found in step 196 and reduced in step 198. Each buyer is allowed a selected number of consecutive wins. If there are no more consecutive wins permitted in step 200, the winner is informed that no more bids will be allowed in step 202. If in step 204 there are remaining months in the interval, the bidding process begins again at step 172. If not, the bids and charges for all of the months in the entry interval for the initial innovator are totaled in step 206.

Figure 35:
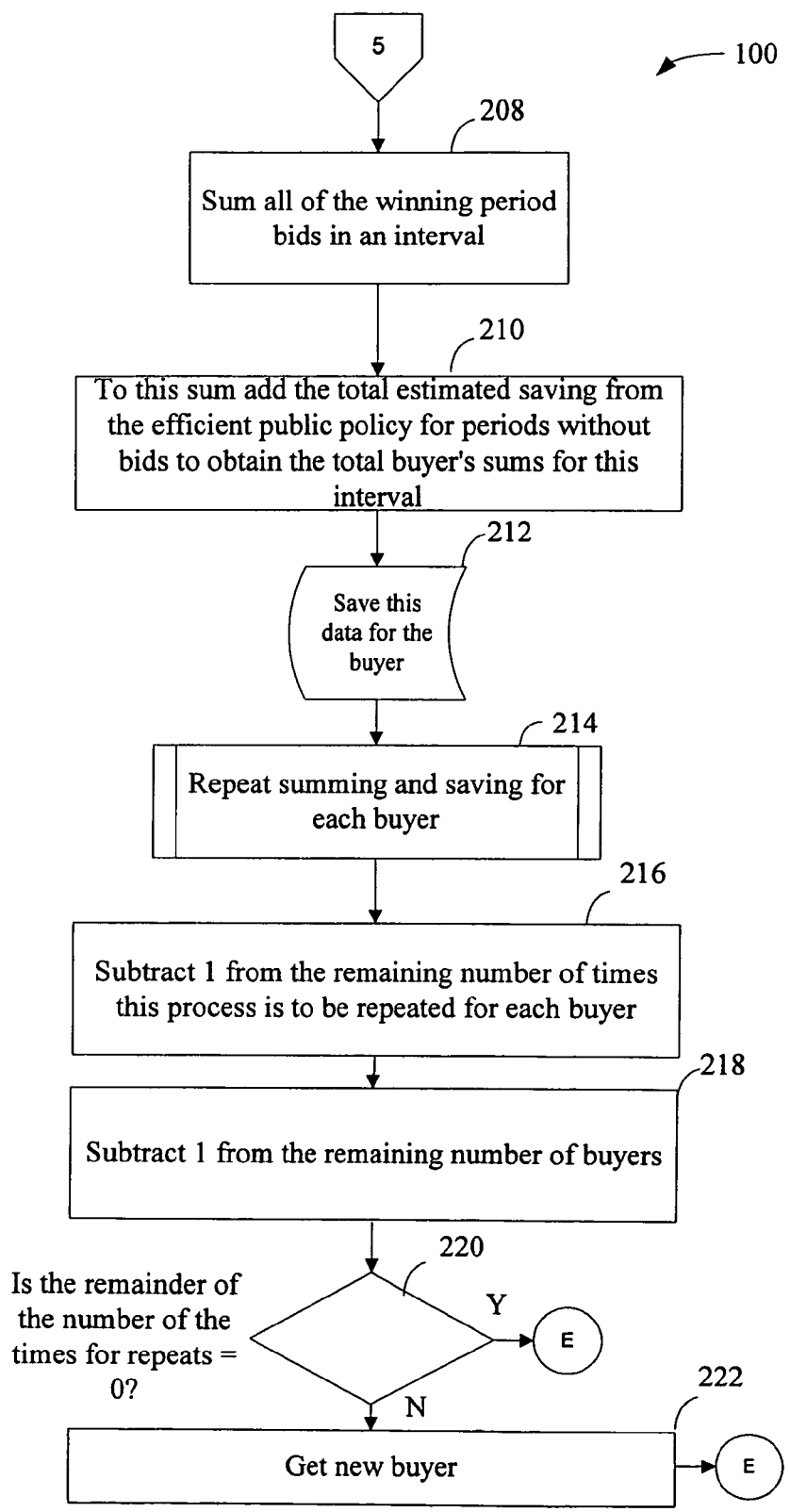

In FIG. 35, all the totals for all the winning bids in the interval in step 208 are added to the total estimated savings from the efficient public policies without bids in step 210. This information is stored for each buyer in steps 212 and 214. The number of processes remaining is reduced in step 216 and the remaining number of buyers is reduced in step 218. If there are more processes to be conducted in step 220, the process repeats after a new buyer is retrieved in step 222, before returning to the process at step 172.

Figure 36:
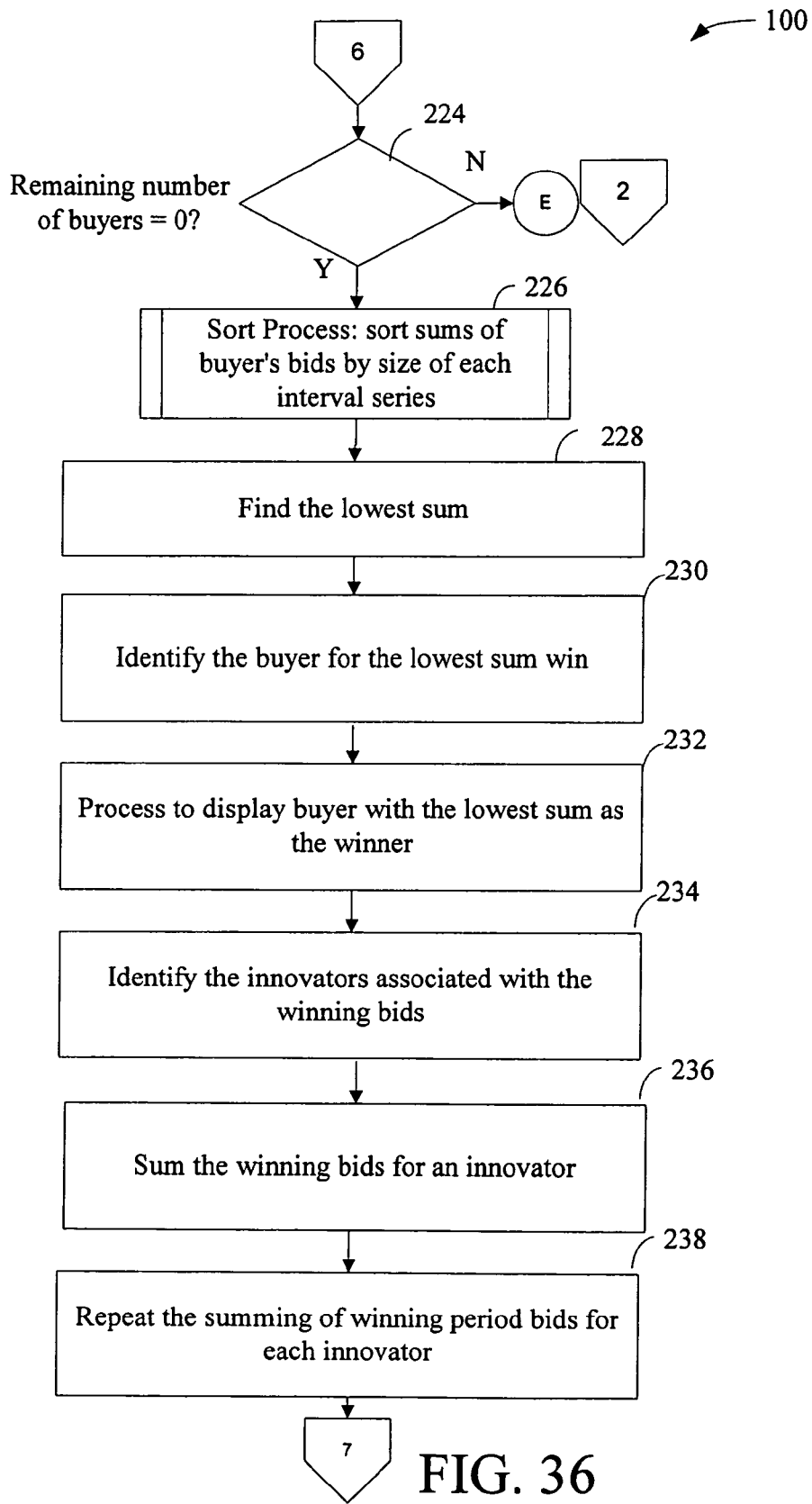

In FIG. 36, where there are more buyers at step 224, the process begins again at step 172. Otherwise, the bids of all buyers are sorted in step 226 and the lowest sum is found in step 228. The corresponding buyer is found in step 230 and displayed in step 232. The innovators associated with the winning bids are identified in step 234 and the winning bids for each innovator are summed in steps 236 and 238.

Figure 37:
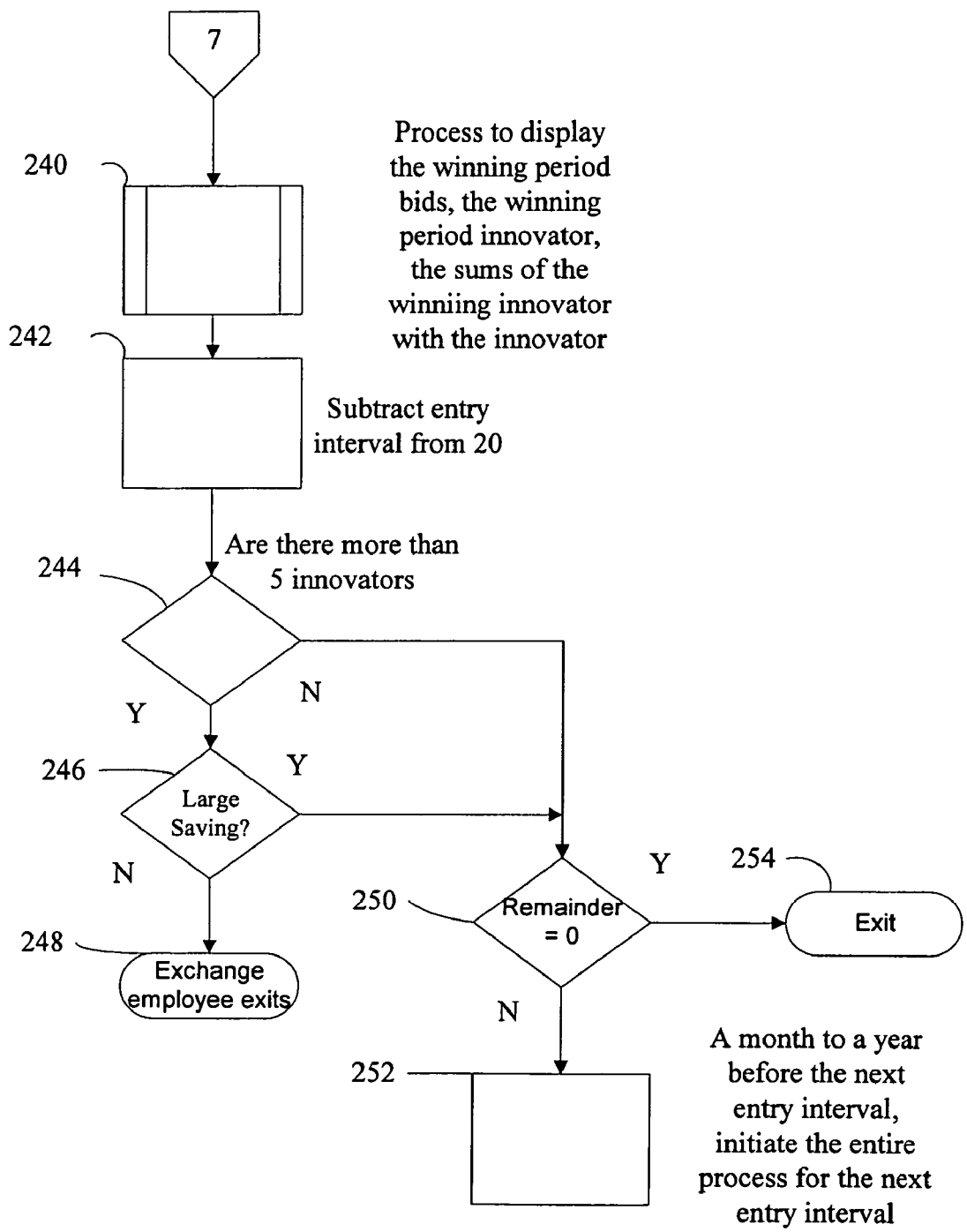

Referring now to FIG. 37, the winning period bids, winning period innovator, and the sums of winning innovator bids are published in step 240. The number of entry intervals is reduced in step 242. If there are 5 or less innovators at step 244, or there are large savings in the proposed public policy innovations at step 246, and if there are no remaining intervals at step 250, the process is completed at step 254. Otherwise, the entire process is initiated again in step 252.

Figure 39:
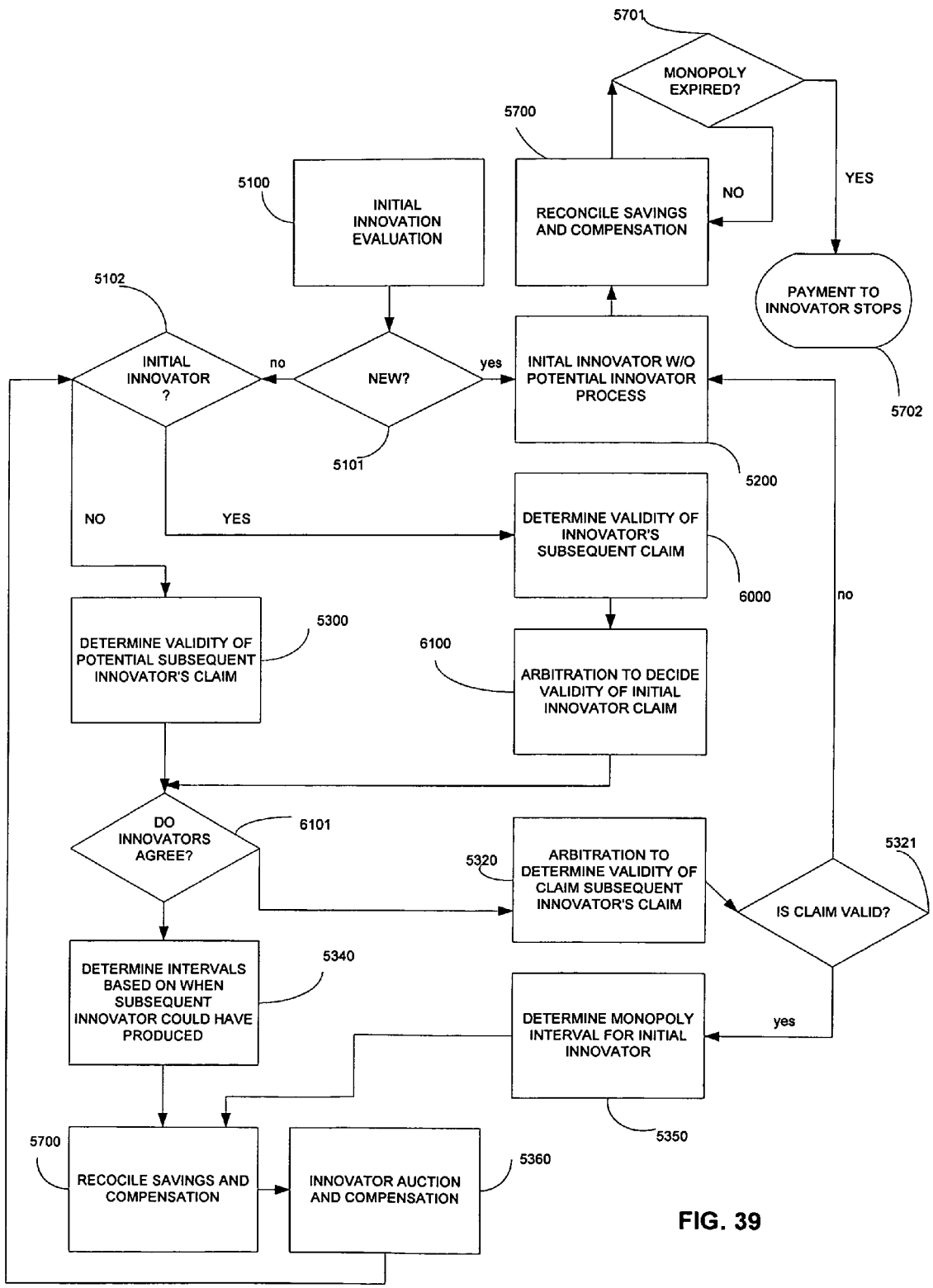
FIG. 39 is a chart that shows the high-level process to determine the marginal revenue product for innovators

FIGS. 39 and 39A-39I are charts that show the high level and detail processes, respectively, to determine the marginal revenue product for innovators. FIG. 39 is a condensed complete view of the process to determine the marginal revenue product for innovators. There are essentially two paths to develop the payments for innovators, i.e., with and without potential subsequent innovators. If only one innovator could have produced the innovation, then the innovator will have a monopoly and will either negotiate his or her compensation, which is embedded in the legislation, or write the legislation and use the system to attempt to encourage the legislature to adopt the system. If the innovator has potential subsequent innovator(s), then the system requires the usage of the innovator auction after an initial monopoly interval for the initial innovator to determine compensation for the potential subsequent innovators. Step 5100 is the initial innovation evaluation process. When a potential subsequent innovator has copyrighted material that describes progress that could have lead to the invention, the potential subsequent innovator notifies the system administrator who controls the evaluation process. Once the initial evaluation process is complete, at 5101 a decision is made as to whether the claim is new or has potential innovators. If the claim is new, Step 5200, the process for initial innovator without potential innovators, is performed. Step 5200 is described in detail in FIG. 39A. Next, Step 5700 the process to reconcile the amount of savings and compensation is performed, which is described in detail in FIG. 39G. At 5701, a determination is made as to whether the duration of the monopoly is expired. If the monopoly duration has expired, payment to the innovator stops at 5702. If the monopoly duration has not expired, Step 5700 is repeated.

If, on the other hand, the claim has potential innovators at 5101, a determination is made at 5102 as to whether the innovator is the initial or subsequent innovator. If the innovator is the initial innovator, at Step 6000 the process to determine the validity of an innovator's subsequent claim is performed. Next, at Step 6100, an arbitration process is performed to determine the validity of an innovator's claim. Step 6100 is described in detail in FIG. 39I. If, on the other hand, AT 5102, the innovator is the subsequent innovator, the process, described in detail in FIG. 39B, to determine the validity of the potential subsequent innovator 5300 is performed.

Next, at 6101, it is determined whether the initial and potential subsequent innovators agree whether the potential subsequent innovator's claim is valid. If the parties do not agree, at Step 5320, further described in FIG. 39C, an arbitration process to determine the validity of the claim is performed. If, at 5321, arbitration determines that the claim is not valid, the process returns to Step 5200, the process for initial innovator without potential innovators. If, at 5321, arbitration decides the claim is valid, at Step 5350, further described in FIG. 39D, a process to determine the monopolistic or oligopolistic interval for the initial innovator is performed. If, at 6101, the parties do agree that the potential subsequent innovator's claim is valid, at Step 5340, further described in FIG. 39E, the process to determine the monopolistic or oligopolistic intervals, based on when the potential subsequent innovator could have produced the innovation, is performed.

Figure 39A:
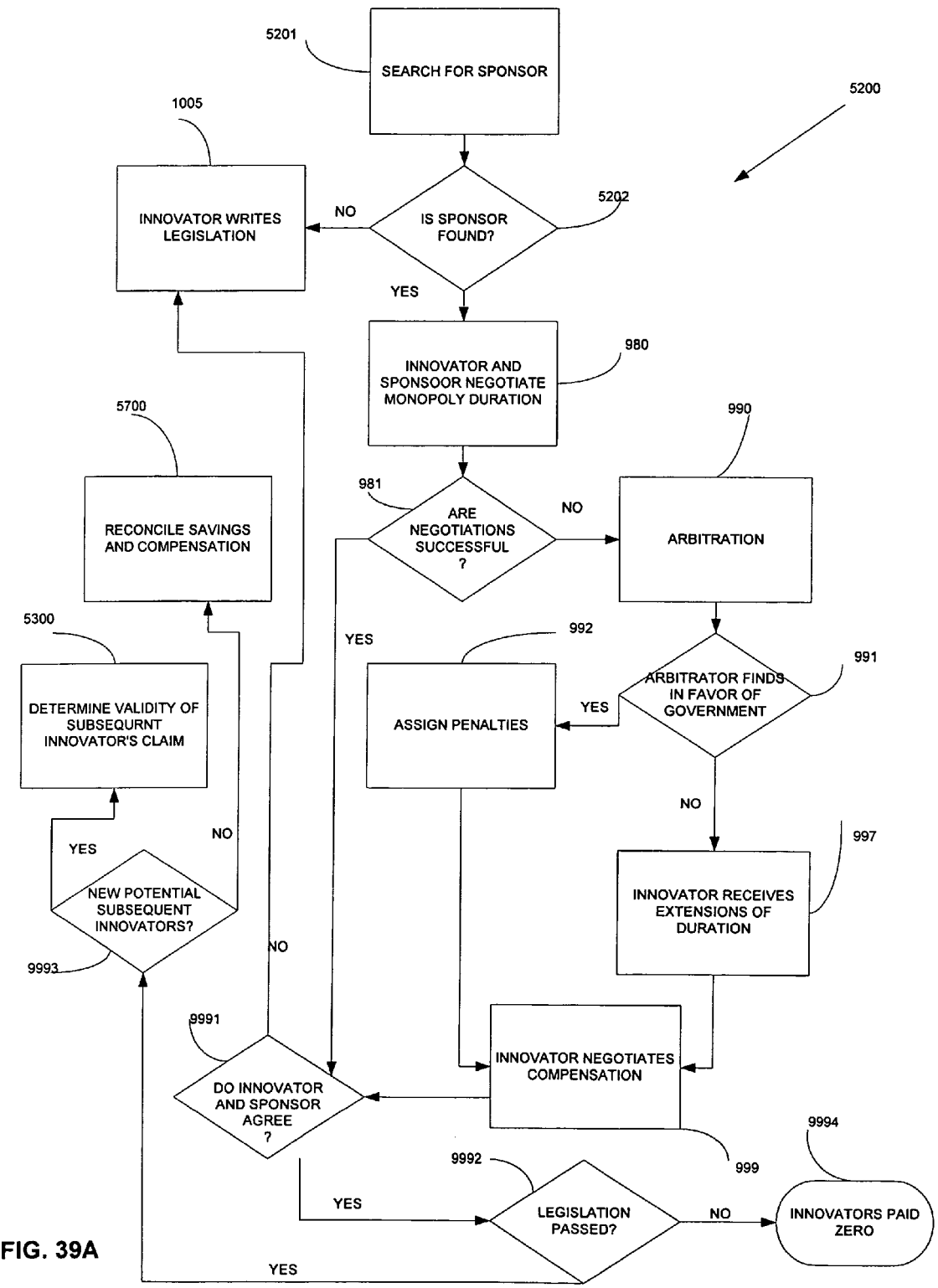
FIG. 39A-39H are charts that show a series of processes to determine the marginal revenue product for innovators of FIG. 39.
Figure 39B:
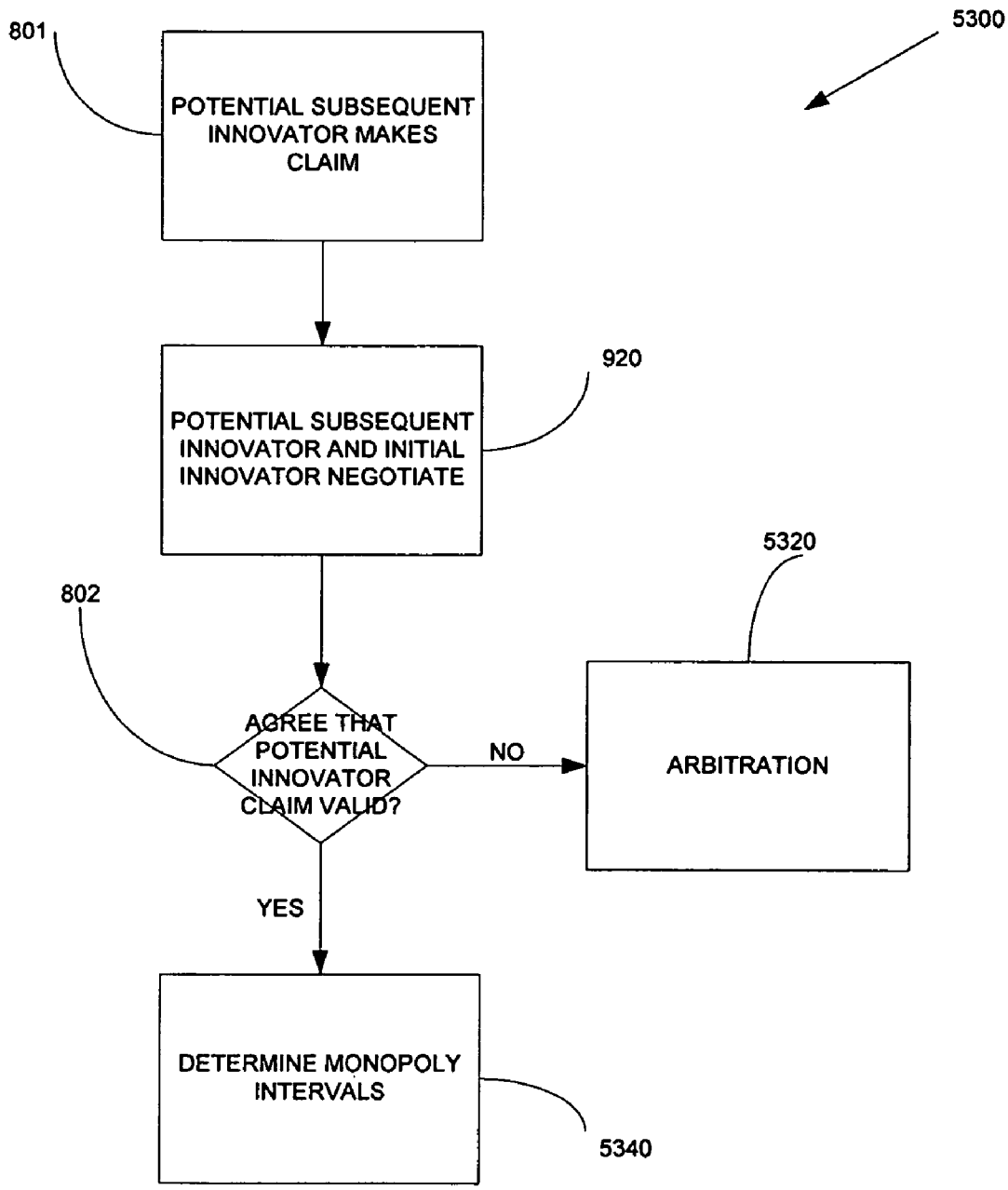
Figure 39C:
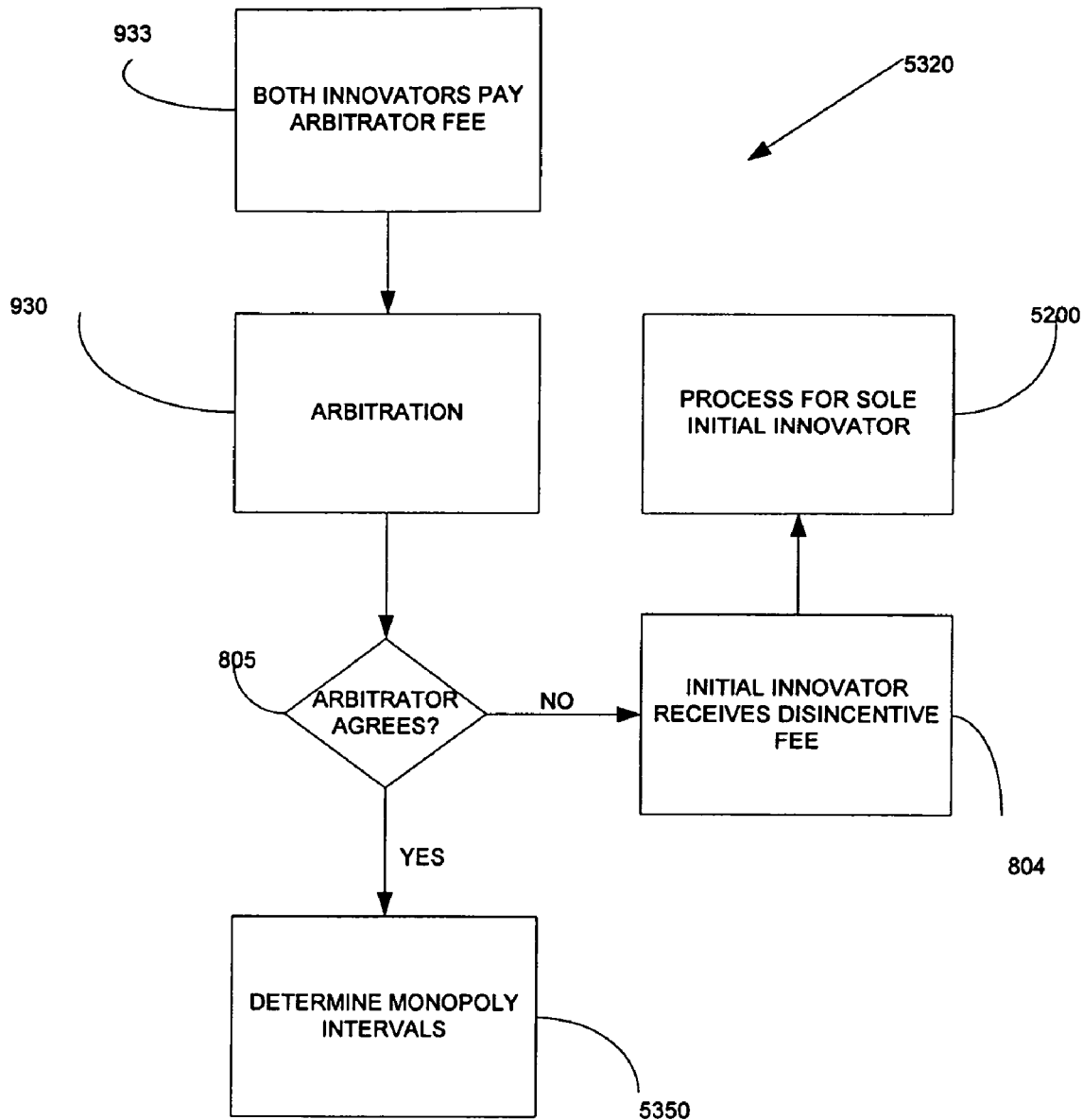
Figure 39D:
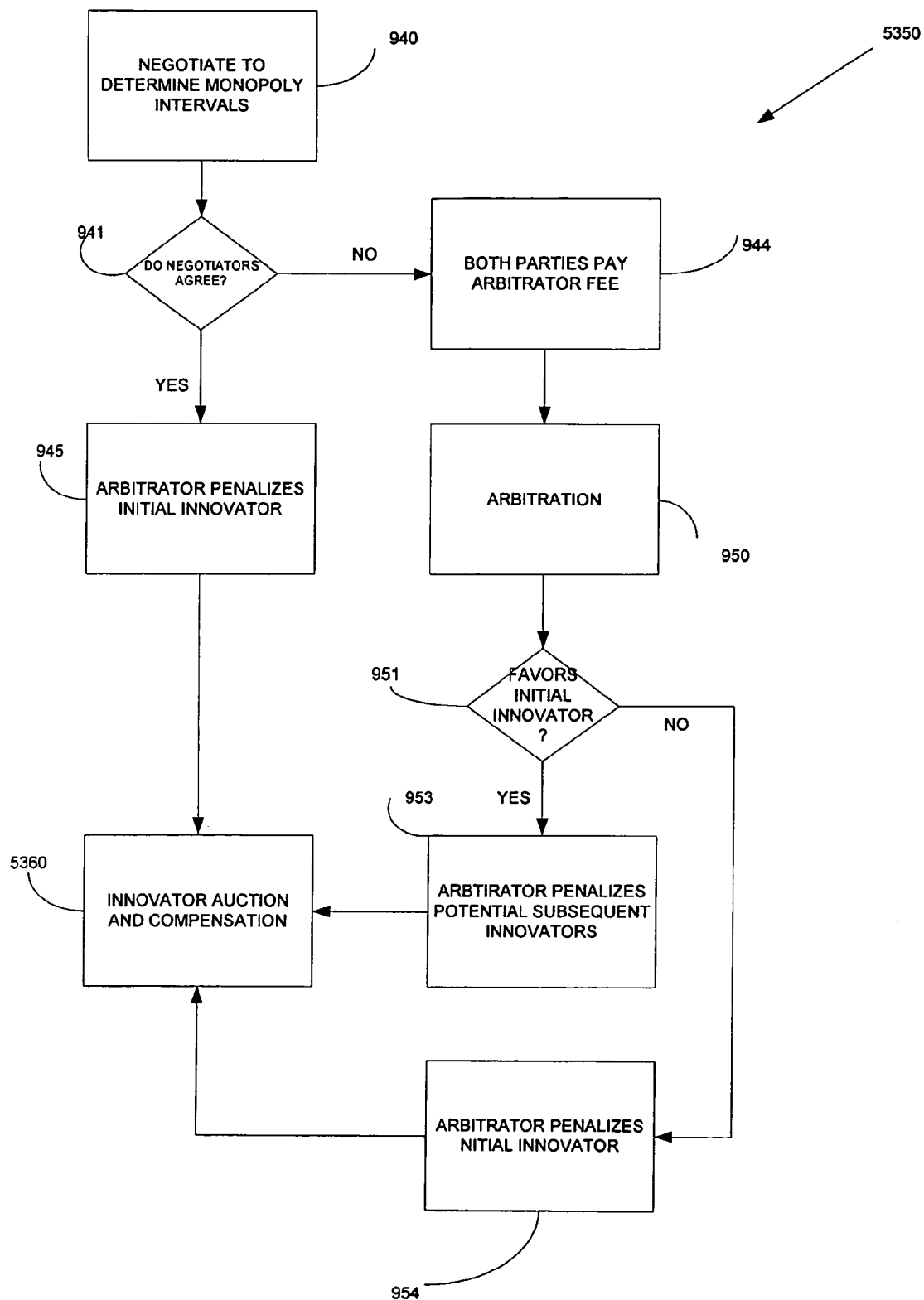
Figure 39E:
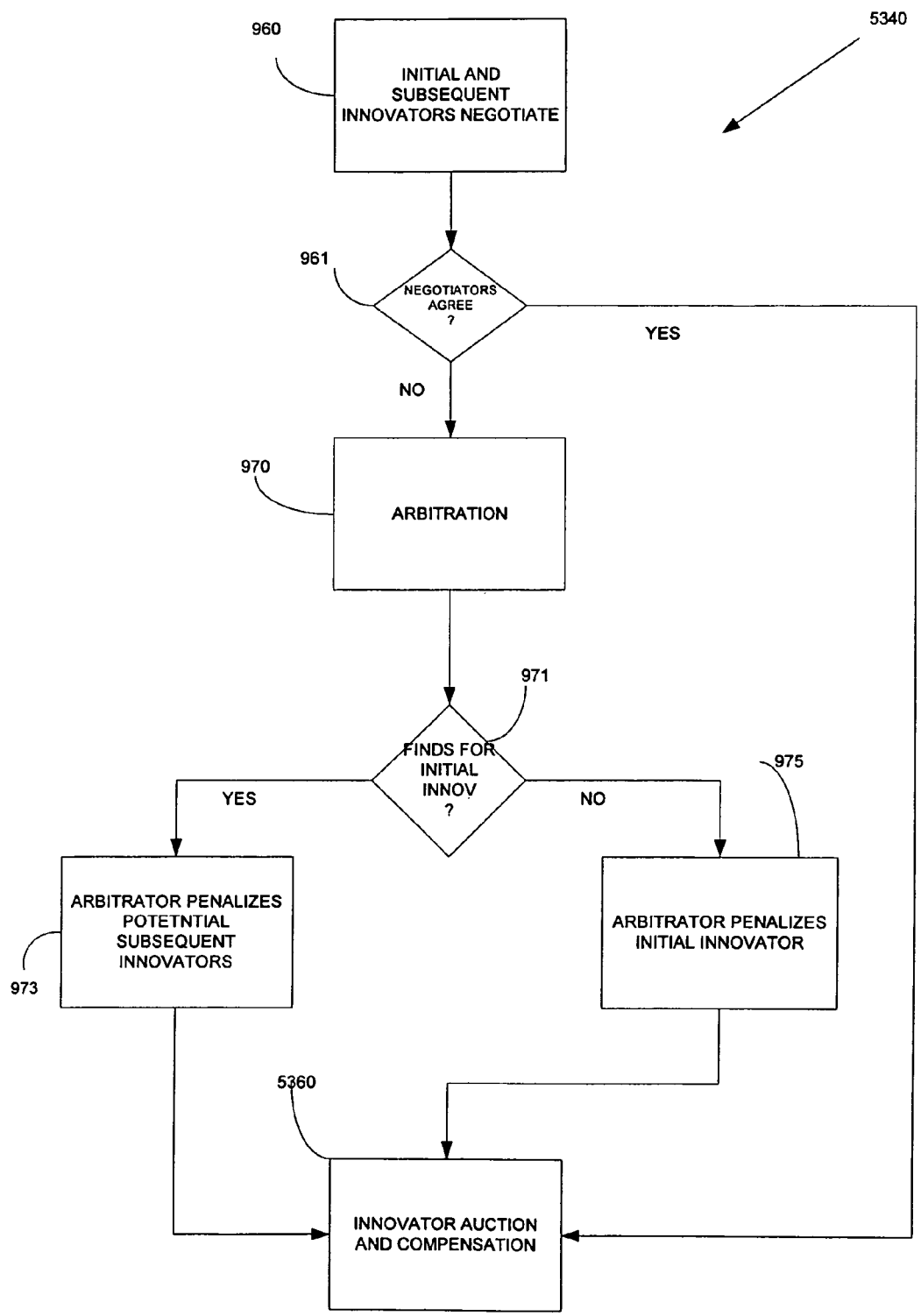
Figure 39F:
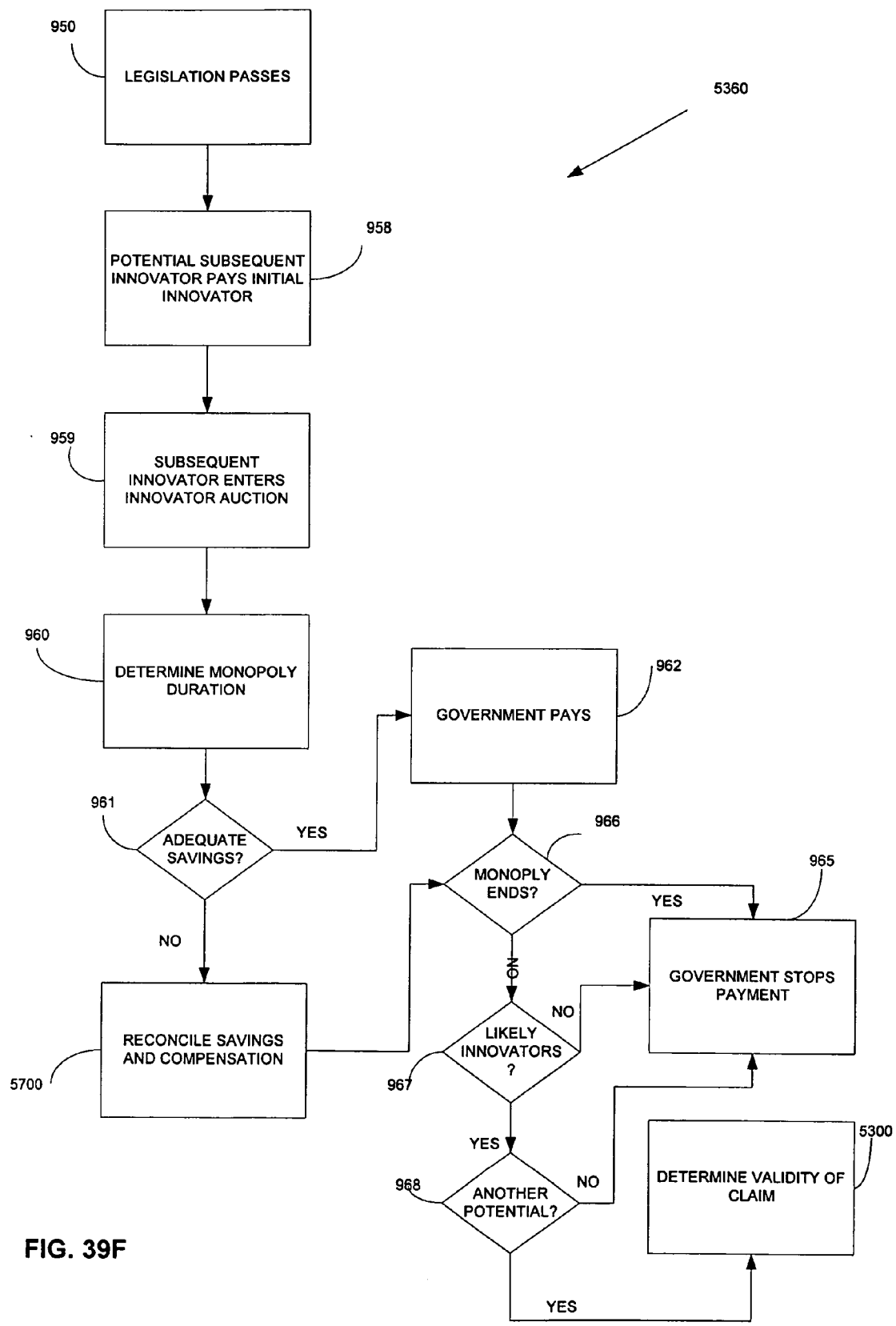
Figure 39G:
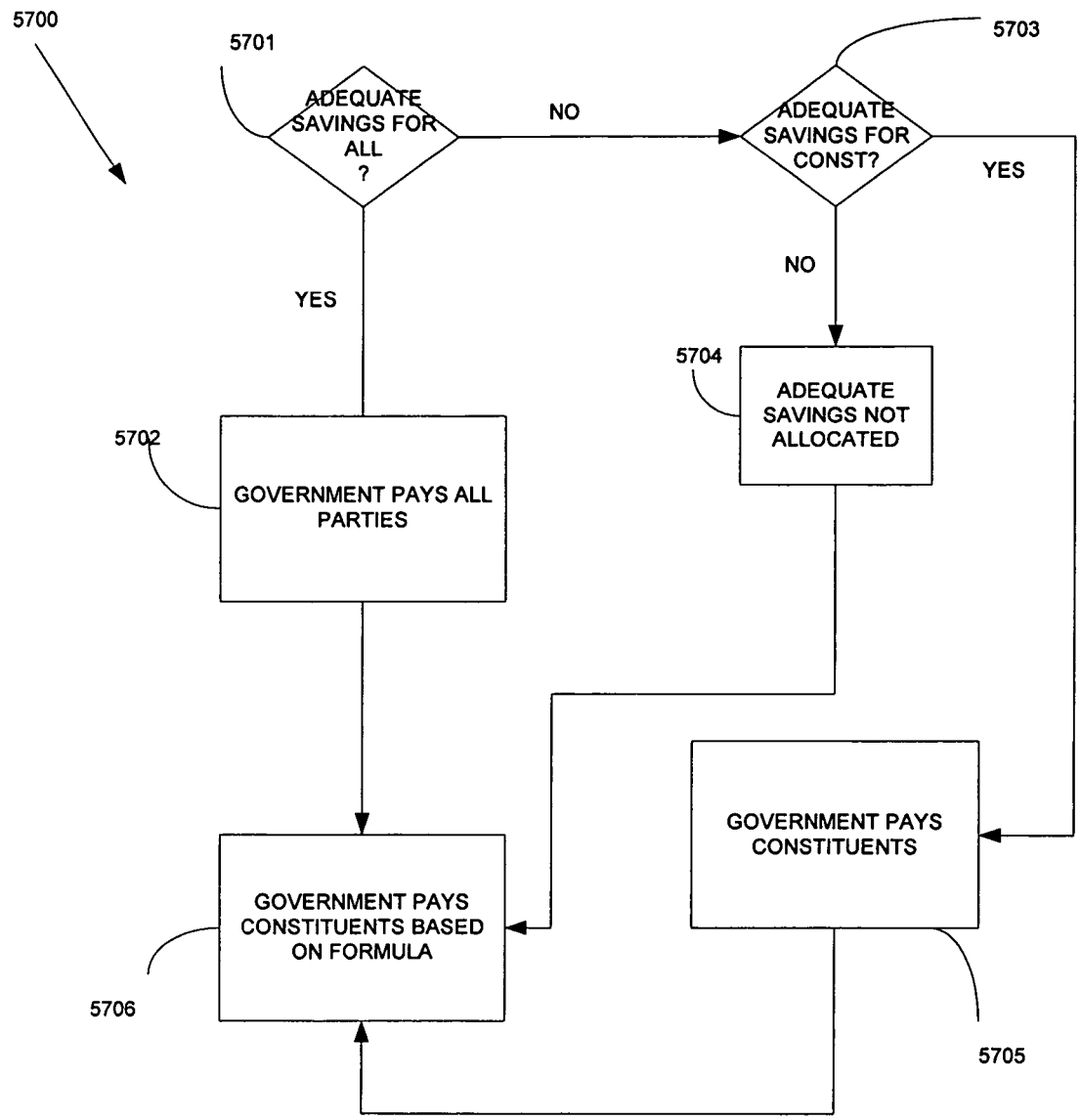

At Step 5700, further described in FIG. 39G, the process to reconcile the amount of savings and compensation is performed. At Step 360, further described in FIG. 39F, the process for innovator auction and compensation is performed and the process returns to 5102.

This process to find the marginal revenue product of an innovator addresses the problem of uncertainty when a subsequent innovator appears, In addition, intervals are established between when the initial innovator(s) invented the policy innovation and when the potential subsequent innovator(s) would have invented the public policy innovation based on copyrighted disclosure of the potential subsequent innovator that predate the copyright of the initial innovator's copyrighted disclosure.

FIG. 39A describes the process for an initial innovator without potential subsequent innovators. If the innovator has no potential subsequent innovator, the initial innovator searches for a sponsor at Step 5201. At 5202, a determination is made as to whether a sponsor is found. If a sponsor is not found, the innovator may write legislation with savings that are politically feasible and use the system to drive the legislation through the legislature at Step 1005.

If a sponsor is found, then at Step 980, the innovator and sponsor negotiate the monopoly duration (for example, 10, 20 or 30 years), i.e., when the next innovator might have discovered the innovation. If, at 981, it is determined that the negotiations 980 are successful, then the innovator receives intellectual property rights for the innovation for the agreed monopoly period. If the negotiations are unsuccessful, the government and the initial innovator(s) would enter into arbitration at Step 990. At 991, the arbitrator finds in favor of one party of the other. If the arbitrator finds in favor of the government and not in favor of the innovator, at Step 992, penalties are assigned, resulting in reductions of the duration of monopoly protection for the innovator. Penalties are derived from the government's most reasonable estimate chosen by the arbitrator. If the arbitrator found in favor of the innovator, at Step 997, the innovator receives extensions of the duration of monopoly protection beyond the standard duration (of, for example, 10, 20 or 30 years), based on the innovator's most reasonable estimate.

At Step 999, the initial innovator negotiates compensation with the sponsor for the monopoly interval. At 9991, a determination is made as to whether the innovator and the sponsor agree. If the innovator and the sponsor do not agree on compensation for the innovator, the innovator can write legislation to try to obtain savings that are politically feasible and use the system to drive the legislation through the legislature at Step 1005. If the initial innovator(s) and the sponsor agree on the interval and the compensation, they try to use the system to pass the legislation. At 9992, a determination is made as to whether the legislation passes. If the legislation does not pass, the innovators are paid nothing at Step 9994. If the legislation passes, there may be new potential subsequent innovators, which is determined at 9993. If there are new potential subsequent innovators, the system uses the process to determine the validity of the potential subsequent innovator's claim at Step 5300, which is described in detail in FIG. 39B. If there are no new potential subsequent innovators, the system proceeds to the process to reconcile the amount of savings and compensation at Step 5700, which is described in detail in FIG. 39G.

FIG. 39B describes the process to determine the validity of a potential subsequent innovator's claim. At 801, a potential subsequent innovator makes a claim to have been able to produce the innovation, based on previously copyrighted document(s) that he or she authored. At Step 920, the potential subsequent innovator and the initial innovator(s) then negotiate to determine whether or not the potential subsequent innovator probably could have produced the public policy innovation. At 802, a determination is made as to whether the negotiators agree that the potential subsequent innovator would have been able to discover the innovation. If both the initial innovator(s) and the potential subsequent innovator agree that the potential subsequent innovator probably could have produced the innovation, the system proceeds to the process to determine the monopolistic or oligopolistic intervals at Step 5340, which is described in detail in FIG. 39E. If both the initial innovator(s) and the potential subsequent innovator fail to agree that the potential subsequent innovator probably could have produced the innovation, then the system proceeds to the arbitration process to determine validity of claim at Step 5320, which is described in detail in FIG. 39C.

FIG. 39C describes the process to determine the monopolistic or oligopolistic intervals. At Step 933, both innovators pay the arbitrator(s)' fee and the potential subsequent innovators pay a disincentive fee to be deposited into an escrow account. At Step 930, arbitration is conducted between the initial innovator and the potential subsequent innovator to determine when the potential subsequent innovator could have produced the policy innovation. At 805, a determination is made as to whether the arbitrator agrees that the potential subsequent innovator could have discovered the innovation. If the arbitrator agrees that the potential subsequent innovator would not have been able to discover the policy innovation, the initial innovator receives the disincentive fee paid at Step 933. Then, the system continues to wherever the initial innovator was in process for the sole innovator 5200 in FIG. 39A. If the arbitrator finds that the evidence implies that the potential subsequent innovators would have probably (>50%) successfully produced the policy innovation, the system proceeds to the process to determine the monopolistic or oligopolistic intervals, when negotiators agree that the potential subsequent innovator would have been able to discover the policy innovation 5350 on FIG. 39D. This conclusion is based on information from the copyrighted descriptions of the potential subsequent innovator that predate the copyright of the initial innovator(s).

FIG. 39D describes the process to determine the monopolistic or oligopolistic intervals 5350 for the initial innovator to the subsequent innovator when the initial innovator incorrectly maintains the subsequent innovator's claim is invalid. At Step 940, the initial innovator(s) and the potential subsequent innovator negotiate to determine the monopolistic or oligopolistic intervals for initial innovator to this subsequent innovator. At 941, a determination is made as to whether the negotiators agree. If the initial innovator(s) and the potential subsequent innovator agree on the monopolistic or oligopolistic intervals for the initial innovator(s) to this subsequent innovator(s), at Step 945, the arbitrator penalizes the initial innovator and allows an earlier date of entry into the innovator auction for the potential subsequent innovator, because the initial innovator(s) were unreasonable about the possibility that the potential subsequent innovator would create the innovation. The system then proceeds to the process for innovator auction and compensation 5360 in FIG. 39F.

If, at 941, the negotiations to determine whether or not the potential subsequent innovator could have produced the policy innovation were unsuccessful, then, the initial innovator(s) and the potential subsequent innovator choose an arbitrator and, at Step 944, the arbitrator requires both the initial innovator(s) and the potential subsequent innovator to pay 50% of the arbitrators fee. At Step 950, arbitration is performed.

At 951, the arbitrator either finds in favor of the initial innovator or the potential subsequent innovator. If the arbitrator choose the initial innovator's(s') date, at Step 953, the arbitrator penalizes the potential subsequent innovators and extends the duration of protection to the initial innovator when the potential subsequent innovator may not compete and enter the innovator auction. This extended duration is calculated as some portion or multiple of the difference between the two dates (the initial innovator and the subsequent innovator's date). The arbitrator then reduces this calculated duration of protection, because the initial innovator(s) were unreasonable about whether or not the potential subsequent innovator could have produced the innovation. The system then proceeds to the process for innovator auction and compensation 5360 in FIG. 39F.

If, on the other hand, at 951, the arbitrator finds in favor of the potential subsequent innovator, at Step 954, the arbitrator penalizes the initial innovator(s) and shortens the interval between the initial innovator(s)'s discovery and the potential subsequent innovator's discovery. This penalty is applied twice, once for being unreasonable about the probability that the potential subsequent innovator could have produced the innovation and once for being unreasonable about the duration of protection for the initial or earlier innovator(s). The system then proceeds to the process for innovator auction and compensation 5360 in FIG. 39F.

FIG. 39E describes the process to determine the monopolistic or oligopolistic intervals 5340 when the negotiators for the initial innovators and the potential subsequent innovator(s) agree that the potential subsequent innovators would have successfully produced the policy innovation. At Step 960, the initial innovator(s) and the subsequent innovators negotiate the interval between when the initial innovator(s) invented the policy innovation and when the potential subsequent innovators would have invented the public policy innovation, based on information from the copyrighted descriptions of the potential subsequent innovator that predate the copyright of the initial innovator(s). At 961, a determination is made as to whether the negotiators agree. If the negotiations are successful and the negotiators agree, the innovators follow the process for innovator auction and compensation 5360 FIG. 39F. If the negotiations are unsuccessful, the initial innovator(s) and the subsequent innovators enter into arbitration at Step 970. At 971, the arbitrator either finds in favor of the initial innovator or the potential subsequent innovator. If the arbitrator finds that the initial innovator's estimate of the interval is most reasonable, at Step 973, the arbitrator penalizes the potential subsequent innovators and delays his or her entry into the innovator auction and extends the duration of protection to the initial innovator when the potential subsequent innovator may not compete and enter the innovator auction. This extended duration is calculated as some portion or multiple of the difference between the two dates (the initial innovator and the subsequent innovator's date). If, on the other hand, at 971, the arbitrator finds that the potential subsequent innovators'(s') estimate of the interval is most reasonable, at Step 975, the arbitrator penalizes the initial innovator and shortens the interval between the initial innovator(s)'s discovery and the potential subsequent innovator's discovery. Once the entry date for compensation is determined, the system proceeds to the process for innovator auction and compensation 5360 (described in detail in FIG. 39F.

FIG. 39F describes the process for innovator auction and compensation 5360. At Step 950, the legislation passes. If the legislation does not pass, the remaining steps are not performed. At Step 958, the potential subsequent innovator pays the initial innovator the subsequent innovator's share of the initial innovator's research and development costs and become a subsequent innovator. Then, at Step 959, the subsequent innovator enters the innovator auction. After the monopoly interval of the initial innovator or the oligopoly interval of the prior innovators, the new subsequent innovator can receive compensation according to the bid in the innovator auction.

If no competing innovators can show, with copyrighted disclosures of their research that they would have probably invented the innovation, the initial innovator(s) and the government try to negotiate whether the initial innovator(s) should have a 10, 20 or 30 year intellectual property on the policy innovation, based on copyrighted disclosures of all pertinent researchers, the number of researchers, the quality of the research and the duration that the problem has gone unsolved.

For example, the concepts that drive this innovation or surrogate with innovation auction, for which we are requesting a patent, are several discoveries beyond the unique auction system. These discoveries concerning rationality in economics and the economics of intellectual property and fighting corruption. First, while many economists had debated rationality for centuries and while some had better descriptions than other, none grasped that the controversy was the result of a logical fallacy in the definition. While there has been significant controversy over intellectual property for over a century with many papers, no one recognized the importance of the marginal revenue product of the last unit as a standard of fairness in markets and then to intellectual property. No one considered the possibility for a public policy auction. No one combined all three or understood the economic of fighting corruption.

If only one potential subsequent innovator is successful and that one is more than two years out, the two innovators get 10 years of oligopolistic protection, starting when the duration of the initial innovator's monopoly ends. During the oligopoly period, the compensation for the innovators is determined through the innovator auction. At Step 960, the years of monopoly or oligopoly are determined. At 961, a determination is made as to whether the legislation provides adequate savings. If the legislation does not provide adequate savings, the system proceeds to the process to reconcile the amount of savings and compensation at Step 5700 (described in detail in FIG. 39G. If, at 961, the government provides adequate savings, at Step 962, the government pays the bid of the lobbying constituent and compensation for the innovators determined by the innovator auction. If, at 966, the duration of the monopoly and/or oligopoly ends, the system proceeds to Step 965 and the government stops payment. After 10 years, enough innovators would have invented the public policy innovation so that there would have been enough competition to eliminate most of the marginal revenue product due to innovation of any innovation open to all competitors. As a result, compensation ends at Step 965.

If, at 967, four or five potential subsequent innovators appear likely within 5 years, then the government may limit protection of these innovators to 5 years. During those 5 years, subsequent potential subsequent innovators may enter into oligopolistic competition, at 968, according to their negotiated dates that they would have discovered the innovation. The innovators who would have made the discovery enter into an increasingly larger group of innovators of the public policy innovation, whose compensation would be established through the innovator auction. After 5 years, compensation would end for the innovators because there would be enough to reduce the marginal revenue product of innovation to trivial amounts. If, at 968 it is determined that there is another potential subsequent innovator, the system proceeds to Step 5300 to determine the validity of the potential subsequent innovator's claim.

When the monopolistic or oligopolistic interval expires, at Step 965, the government stops payment to the innovators because the marginal revenue product is diminished.

FIG. 39G describes the process to reconcile the amount of savings and compensation 5700. This process only occurs if the legislation passes. At 5701, a determination is made as to whether the legislation provides adequate savings to pay constituents, innovators and administrative fees. If the legislation provides adequate savings to cover the bids of the lobbying constituents and the innovator and administrative fees, at 5702, the government pays them their respective appropriate compensation. If, at 5701, the legislation does not provide adequate savings to pay innovators, constituents and administrative fees, a determination is made at 5703 as to whether the legislation provides adequate savings to pay constituents. If the legislation provides adequate saving to cover the bids of the lobbying constituents, at Step 5705, the government pays lobbying constituents their fees and the balance goes to the innovator and administrative fees. At 5704, the legislation does not provide adequate savings to pay constituents. If the legislation provides inadequate saving to cover the bids of the lobbying constituents, the government pays only the lobbying constituents and the innovator and administrative fees may not be paid. At Step 5706, the government pays the constituents according to a formula that pays the lower bidders their fees and the higher bidders and equal payment.

The system administrator may obligate innovators to notify it of the innovator's innovation. If the innovator fails to notify the system administrator of the innovation, then the first individual or other entity to bring the innovation to the attention of the system administrator may be considered the initial innovator, until the initial innovator can establish his or her claim. The initial applicant will have rights of the initial innovator for an interval after initial passage of the law equal to the interval between when the initial applicant describes the innovation and when the true initial innovator can prove that he or she notified the system administrator.

Figure 39H:
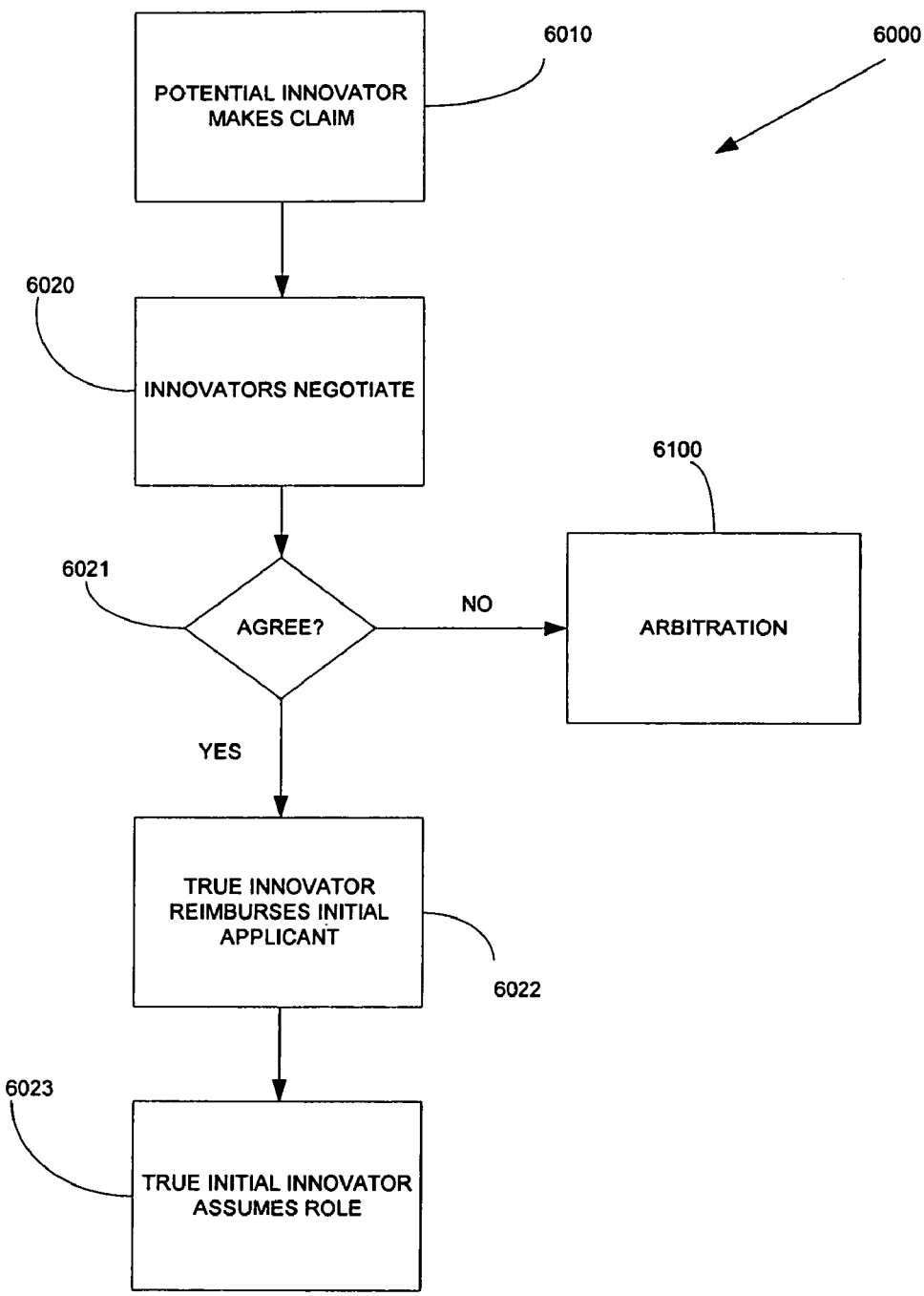

FIG. 39H describes the process to determine validity of an innovator's subsequent claim 6000 At Step 6010, a potential initial innovator makes a claim to have produced the innovation, based on previously copyrighted document(s) authored by the innovator. At Step 6020, the initial applicant and the potential initial innovator negotiate to determine who was the actual initial innovator. At 6021, a determination is made as to whether the negotiators agree. If they agree that the potential initial innovator was the true initial innovator, then, at Step 6022, the true initial innovator reimburses the initial applicant for research, development, marketing, etc. costs. At Step 6023, the true initial innovator assumes the role of the initial innovator in the same place in the appropriate process as the initial applicant, who was acting as the initial innovator. The initial applicant receives the initial innovator's benefits for the duration of an interval after the enforcement of the legislation for the length of the interval from the initial applicant's provable notification of the system administrator to the initial innovator's notification of the system owner.

If, at 6021, the initial applicant and the potential initial innovator fail to agree, at Step 6100, the system uses the arbitration process to determine validity of a potential initial innovator's claim.

The arbitration process to determines the validity of a potential initial innovator's claim. The initial applicant and the potential initial innovator pay their share of the arbitrator's fee. The arbitrator sets a disincentive fee for inappropriate potential claim and the potential initial innovator pays it. Then, the arbitrator arbitrates between the initial innovator(s) and the potential subsequent innovator to determine if the potential initial innovator was the true initial innovator. A determination is made as to the arbitrator's decision. If the arbitrator agrees that the potential initial innovator is the true innovator, the true initial innovator assumes the role of the initial innovator in the same place in the appropriate process as the initial applicant, who was acting as the initial innovator. The initial applicant receives the initial innovator's benefits for the duration of an interval after the enforcement of the legislation for the length of the interval from the initial applicant's provable notification of the system administrator to the initial innovator's(s') notification of the system administrator.

If the arbitrator agrees that the initial applicant is the true innovator, the initial applicant is considered the true innovator and receives the disincentive fee funds in the escrow account. The potential initial innovator receives nothing.

When negotiating with a new government, the senior type of government does the negotiating for inferior governments and evidence from the previous government may be entered as evidence.

Although the present invention has been disclosed in terms of preferred embodiments, it will be understood that numerous variations and modifications could be made without departing from the scope of the invention as set forth in the following claims. For example, the enterprise under which the present invention can be practiced can be a corporate governance or association governance instead of a political one. In this manner, any enterprise can serve as the governmental entity, and any elected or appointed officer can serve as the politician. By way of further example, the communications medium connecting the computer clients of innovators, special interest groups, politicians, and governmental enterprises can be a dedicated network or Intranet, instead of the Internet. It is to be understood, therefore, that the invention may be practiced otherwise than as specifically set forth in the appended claims.

What is claimed is:

1. A distributed computer system for creating a market for efficient public policies, comprising:
    a central computer for registering a plurality of accounts for innovators of new public policies and potential subscribers thereto, and for maintaining a database record stored therein;
    a plurality of innovator terminals connected to said central computer;
    a plurality of politician terminals connected to said central computer;
    a plurality of subscriber terminals connected to said central computer;
    a policy auction software program for facilitating an auction by which a plurality of registered subscribers can bid over said subscriber terminals for adoption of said public policies, said software program including source code for registration of each new public policy, source code for implementing valuation of each new public policy based on forecasted savings generated by legislative adoption, and source code for implementing a series of hierarchical auctions for a right to receive a portion of savings generated from legislative adoption of said public policy;
    whereby when a subscriber selects a winning bid said bid is charged to said subscriber's account.

2. A computer implemented method for providing an incentive for the development and legislative adoption of efficient public policies, comprising the steps of:
    providing a central computer system that is in communication with at least one terminal over a data communication system, said central computer system having a relational database managed by database management software resident on said central computer system and having operative software providing a graphical user interface accessible via the data communication system;
    registering the policies of a plurality of innovators of public policies by storing policy and innovator information in said relational database using said graphical user interface;
    estimating the relative approximate savings of the public policies of said innovators,
    allocating relative shares of a distribution of the relative approximate savings of the policies of said innovators;
    auctioning off the relative shares of the distribution of the relative approximate savings of the policies of said innovators over said data communication system, said auctioning off comprising a bidding phase and a lobbying phase;
    whereby said method creates a free market for savings gained by more efficient public policies, the market giving an incentive for the research and development of new efficient public policies and allowing the innovators to share in the savings resulting from said policies.

3. The computer implemented method for providing an incentive for the development and legislative adoption of efficient public policies according to claim 2, wherein said step of estimating the relative approximate savings of the efficient policies of said innovators further comprises the steps of calculating an amount of savings to be gained from said efficient public policy if adopted.

4. The computer implemented method for providing an incentive for the development and legislative adoption of efficient public policies according to claim 3, wherein said auctioning off the relative shares of the distribution of the relative approximate savings comprises a plurality of auctions conducted over the data communication system for the right to receive a portion of the savings generated from the improved efficiency of said public policy.

5. The computer implemented method for providing an incentive for the development and legislative adoption of efficient public policies according to claim 4, wherein said plurality of auctions includes a constituent auction of a percentage of said savings to constituents whose legislators reach the minimum number to pass the public policy.

6. The computer implemented method for providing an incentive for the development and legislative adoption of efficient public policies according to claim 5 wherein said constituent auction is conducted to a group of constituents defined by political voting district, legislative seat, or individual legislator.

7. The computer implemented method for providing an incentive for the development and legislative adoption of efficient public policies according to claim 4, wherein said plurality of auctions further comprises a hierarchical series of auctions beginning with an innovator auction in which innovators bid for a right to receive a portion of the savings generated from their improved public policy, followed by an active auction in which constituents bid for a right to receive a portion of the savings generated from said public policy.

8. The computer implemented method for providing an incentive for the development and legislative adoption of efficient public policies according to claim 4, further comprising the step conducting an auction over the data communication system of said policy to subscribers who are represented by a minimum number of legislators sufficient to pass the public policy.

9. The computer implemented method for providing an incentive for the development and legislative adoption of efficient public policies according to claim 8, wherein said auction of said policy to subscribers is conducted to a group of subscribers selected in accordance with political voting district, legislative seat, or individual legislator.

10. The computer implemented method for providing an incentive for the development and legislative adoption of efficient and other public policies according to claim 4, wherein said a plurality of auctions includes a series of session-level auctions to all constituents, said session-level auctions only occur during a legislative session.

11. The computer implemented method for providing an incentive for the development and legislative adoption of efficient public policies according to claim 10, wherein there is one bidding phase for all legislation in a session-level auction.

12. The computer implemented method for providing an incentive for the development and legislative adoption of efficient public policies according to claim 4, wherein said plurality of auctions includes an auction to a group of constituents who have contributed to a candidate during primary election season and another auction to a second group of constituents who have contributed to a candidate between the primary election and the general election.

13. The method for providing an incentive for the development and legislative adoption of efficient public policies according to claim 12, wherein any bids made during the bidding phase of the primary and general election auctions to contributing constituents apply to the lobbying phase of any auction for any legislation for the term of the elected candidate.

14. The computer implemented method for providing an incentive for the development and legislative adoption of efficient public policies according to claim 2, further comprising the step of according to claim 2, further comprising the step of negotiating with conciliation or arbitrating with penalties to determine the relative contribution of said innovators and how soon the innovators can attain compensation for their relative contribution.

15. The computer implemented method for providing an incentive for the development and legislative adoption of efficient public policies according to claim 2, further comprising the step of:
registering legislators by storing legislator information in said relational database using said graphical user interface.

16. The computer implemented method for providing an incentive for the development and legislative adoption of efficient public policies according to claim 2, further comprising the step of monitoring said auctioning off by creating computerized dynamic graphical views of the bidding process.

17. The computer implemented method for providing an incentive for the development and legislative adoption of efficient public policies according to claim 2, further comprising the step of monitoring the lobbying activity of said auction participants during the lobbying phase by creating computerized dynamic graphical views.

18. The computer implemented method for providing an incentive for the development and legislative adoption of efficient public policies according to claim 2, further comprising the step of closing said auctioning off by stopping the bidding by the constituents of legislators by that respective legislator.

19. The computer implemented method for providing an incentive for the development and legislative adoption of efficient public policies according to claim 2, further comprising a step of calculating auction winners and losers by calculating the distribution of funds according to bids and negotiated obligations.

20. The computer implemented method for providing an incentive for the development and legislative adoption of efficient public policies according to claim 2, further comprising a step of calculating auction winners and losers by calculating the distribution of fund when the funds are inadequate to cover all of the bids of the lobbying constituents, in which the lower winning bidders receive compensation equal to their bids and the higher winning bidders receive a higher, but equal payment, such that the sum of the payments to auction participant equals the available funds or are less than savings generated by the policy.

21. A method for providing an incentive for the development and legislative adoption of public policies, comprising the steps of:
providing a central computer system that is in communication with at least one terminal over a data communication system, said central computer system having a relational database managed by database management software resident on said central computer system and having operative software providing a graphical user interface accessible via the data communication system;
registering the policies of a plurality of constituents by storing policy and innovator information in said relational database using said graphical user interface;
auctioning off the relative shares of a pool of funds provided by said constituents over said data communication system, said auctioning off comprising a bidding phase and a lobbying phase, and auction participants are constituent lobbyists paid by special interest groups, individuals and corporations.

22. The method for providing an incentive for the development and legislative adoption of efficient public policies according to claim 21, wherein said auctioning is conducted with a group of constituent lobbyists defined by political voting district, legislative seat, or individual legislator.

* * * * *